United States Patent
Rewerts et al.

(10) Patent No.: US 11,873,115 B2
(45) Date of Patent: *Jan. 16, 2024

(54) SYSTEMS AND METHODS FOR HOMOGENEOUS CARGO OR PAYLOAD SPACE RESERVATION WITH HETEROGENEOUS CARGOS AND PAYLOADS

(71) Applicant: ZSM HOLDINGS LLC, Dover, DE (US)

(72) Inventors: Scott David Rewerts, Summerfield, NC (US); Etan D. Karni, Boulder, CO (US); Nicholas James Jenkins, Broomfield, CO (US); Jason C. Bell, Frederick, CO (US); Avram E. Rosenfeld, Atlanta, GA (US); Ravi Singh, Denver, CO (US)

(73) Assignee: ZSM Holdings LLC, Dover, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/862,324

(22) Filed: Jul. 11, 2022

(65) Prior Publication Data

US 2022/0340279 A1 Oct. 27, 2022

Related U.S. Application Data

(63) Continuation of application No. 17/410,660, filed on Aug. 24, 2021, now Pat. No. 11,383,836, which is a
(Continued)

(51) Int. Cl.
*B64D 9/00* (2006.01)
*B64C 1/22* (2006.01)
(Continued)

(52) U.S. Cl.
CPC ............... *B64D 9/00* (2013.01); *B64C 1/22* (2013.01); *B64F 1/32* (2013.01); *G06Q 10/02* (2013.01); *G01M 1/125* (2013.01)

(58) Field of Classification Search
CPC .... B64D 9/00; B64C 1/22; B64F 1/32; G06Q 10/02; G06Q 10/043; G01M 1/125; Y02T 50/80; F03D 13/40
See application file for complete search history.

(56) References Cited

U.S. PATENT DOCUMENTS 2,134,260 A 10/1938 Nickerson
2,998,948 A 9/1961 Sisk
(Continued)

FOREIGN PATENT DOCUMENTS

CN 102712429 A 10/2012
CN 102774498 B 11/2015
(Continued)

OTHER PUBLICATIONS

International Search Report and Written Opinion for Application No. PCT/US20/49787, dated Nov. 30, 2020 (20 pages).
(Continued)

*Primary Examiner* — Donald J Wallace
*Assistant Examiner* — Jalal C Coduroglu
(74) *Attorney, Agent, or Firm* — Barnes & Thornburg LLP

(57) ABSTRACT

Methods of determining a final space reservation for a new aircraft are disclosed. The methods include using parametric definitions of potential payloads to generate a population of representative payloads for use in creating an initial space reservation. The methods include accounting for and applying a variety of margins on each potential payload and taking the union of potential payloads. Alternatively, the union can be taken first and then the margins applied. A homogenous
(Continued)

space reservation can be determined based upon a variety of differently shaped or sized payloads, including a margin build-up to mitigate risk of unknowns associated with future changes in specific payload shapes and sizes, build tolerances, environmental conditions, and/or loading and unloading motions and clearances. Once this space reservation is known, it is possible to design an external shape of a carrying vehicle by staying outside of this space reservation.

29 Claims, 36 Drawing Sheets

Related U.S. Application Data continuation of application No. PCT/US2020/061883, filed on Nov. 23, 2020.

(60) Provisional application No. 62/939,348, filed on Nov. 22, 2019.

(51) Int. Cl.
| | | |
|---|---|---|
| *B64F 1/32* | (2006.01) | |
| *G06Q 10/02* | (2012.01) | |
| *G01M 1/12* | (2006.01) | |

(56) References Cited

U.S. PATENT DOCUMENTS

| | | | |
|---|---|---|---|
| 3,374,972 A | 3/1968 | Webb, Sr. | |
| 3,796,404 A * | 3/1974 | Shields | B60P 7/0807 410/55 |
| 8,121,786 B2 | 2/2012 | Morbey et al. | |
| 10,740,796 B2 | 8/2020 | Brubaker | |
| 11,383,836 B2 | 7/2022 | Rewerts et al. | |
| 2004/0109001 A1 | 6/2004 | Grandine et al. | |
| 2004/0200930 A1* | 10/2004 | Bays-Muchmore | B64C 25/00 244/109 |
| 2009/0152392 A1* | 6/2009 | Hogan | B64C 39/10 244/36 |
| 2009/0173824 A1* | 7/2009 | Perez-Sanchez | B64C 1/1446 244/129.4 |
| 2010/0043677 A1* | 2/2010 | Reynard | B65D 88/129 108/55.1 |
| 2010/0252682 A1* | 10/2010 | Pahl | B64C 1/22 244/129.5 |
| 2011/0042524 A1 | 2/2011 | Hemmelgarn et al. | |
| 2011/0155025 A1* | 6/2011 | Reynard | B65D 88/129 108/55.1 |
| 2011/0196655 A1* | 8/2011 | Sharma | G06F 30/15 703/1 |
| 2012/0255835 A1* | 10/2012 | Date | B65G 41/005 198/588 |
| 2015/0183519 A1* | 7/2015 | Llamas Sandin | B64C 1/1415 244/13 |
| 2016/0311512 A1* | 10/2016 | Sankrithi | B64C 1/061 |
| 2017/0057602 A1* | 3/2017 | Cooper | B63B 35/00 |
| 2018/0068567 A1* | 3/2018 | Gong | G08G 5/0039 |
| 2020/0207475 A1* | 7/2020 | Dobberfuhl | B65G 67/00 |
| 2021/0380245 A1 | 12/2021 | Rewerts et al. | |
| 2022/0340279 A1 | 10/2022 | Rewerts et al. | |

FOREIGN PATENT DOCUMENTS

| | | |
|---|---|---|
| CN | 207120845 U | 3/2018 |
| WO | 2004094228 A1 | 11/2004 |
| WO | 2009023114 A2 | 2/2009 |
| WO | 2009137143 A1 | 11/2009 |
| WO | 2016014966 A2 | 1/2016 |

OTHER PUBLICATIONS

International Search Report and Written Opinion for Application No. PCT/US20/61883, dated Feb. 24, 2021 (14 pages).
International Search Report and Written Opinion for Application No. PCT/US2021/021792, dated May 20, 2021 (12 pages).

* cited by examiner

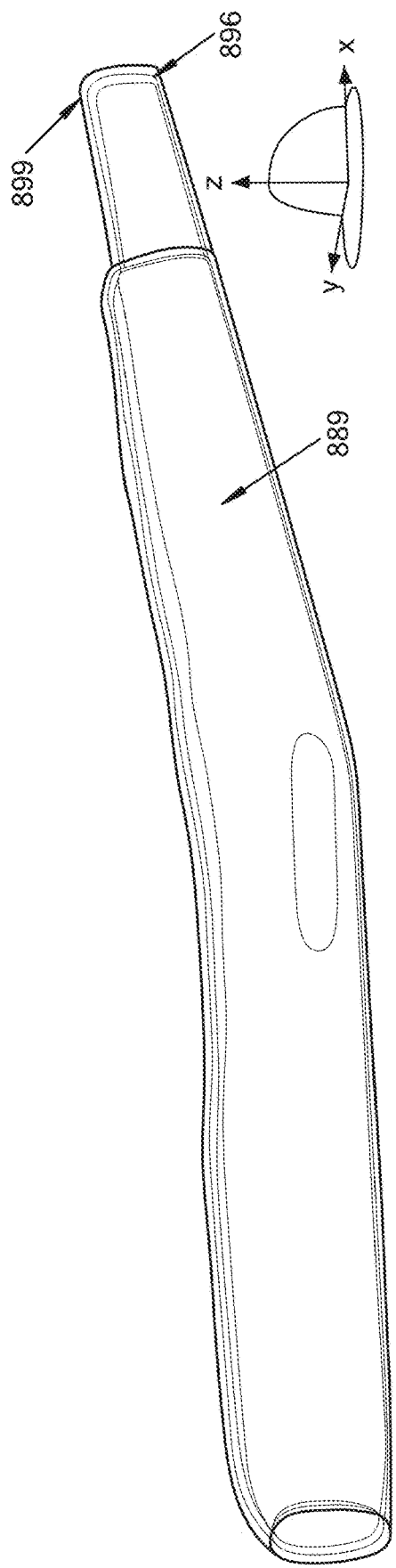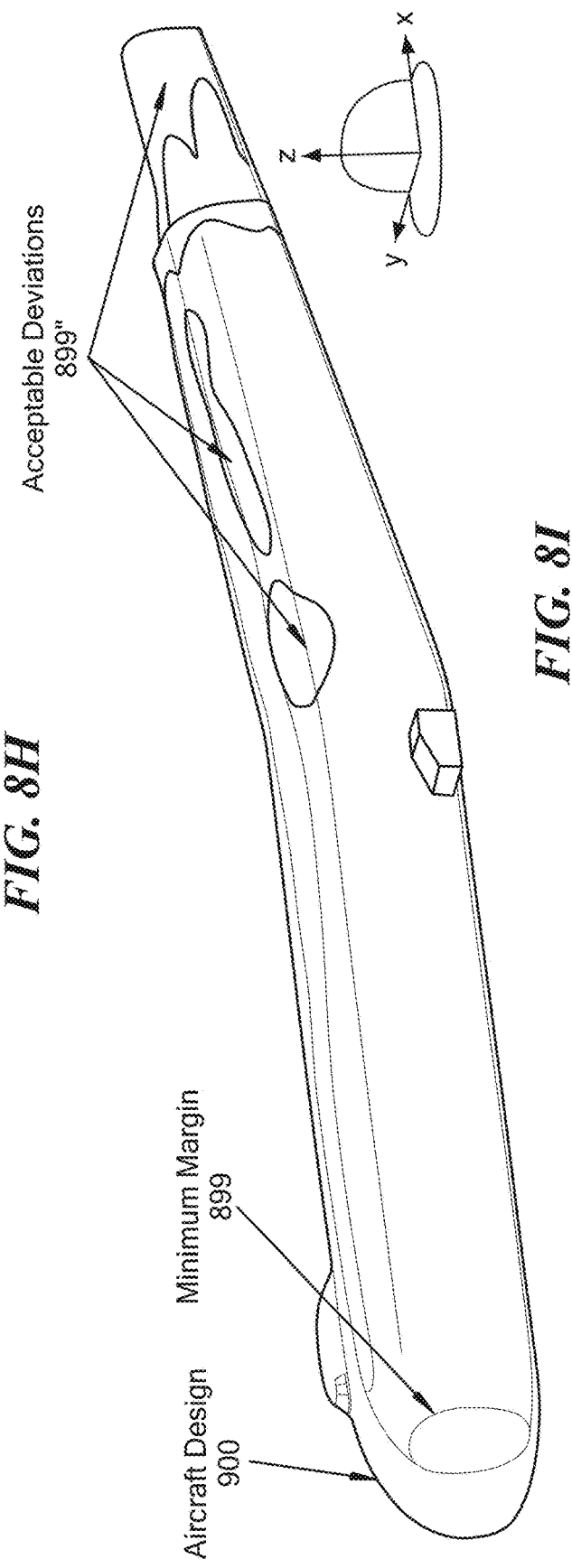
FIG. 8H
FIG. 8I

SYSTEMS AND METHODS FOR HOMOGENEOUS CARGO OR PAYLOAD SPACE RESERVATION WITH HETEROGENEOUS CARGOS AND PAYLOADS

CROSS-REFERENCE TO RELATED APPLICATIONS

This application is a continuation of U.S. patent application Ser. No. 17/410,660, filed Aug. 24, 2021, which is a U.S. national stage filing from International Application Number PCT/US2020/061883, filed Nov. 23, 2020, which claims priority to and the benefit of U.S. Provisional Application Ser. No. 62/939,348, filed Nov. 22, 2019, the contents of each which is incorporated by reference herein in its entirety.

FIELD

The present disclosure relates to systems and methods for optimally sizing transport-category aircraft and interior cargo bays of transport-category aircraft capable of moving oversized and multi-object cargo, although the disclosures can be applied to most any size aircraft.

BACKGROUND

Renewable energy remains an increasingly important resource year-over-year. While there are many forms of renewable energy, wind energy has increased an average of about 19 percent annually since 2007. The increase in global demand in recent years for more wind energy has catalyzed drastic advances in wind turbine technology, including the development of larger, better-performing wind turbines. Better-performing wind turbines can at least sometimes mean larger turbines, as generally turbines with larger rotor diameters can capture more wind energy. As turbines continue to improve in performance and efficiency, more and more wind farm sites become viable both onshore and offshore. These sites may be existing sites, where older turbines need replacement by better-performing, more efficient turbines, and new sites.

A limiting factor to allow for the revitalization of old sites and development of new sites is transporting the wind turbines, and related equipment, to the sites. Wind turbine blades are difficult to transport long distances due to the terrestrial limitations of existing air vehicles and roadway infrastructures. Onshore transportation has traditionally required truck or rail transportation on existing infrastructure. Both are limited by height and width of tunnels and bridges. Road transport has additional complications of lane width, road curvature, and the need to pass through urban areas that may require additional permitting and logistics, among other complications. Offshore transportation by ship is equally, if not more so, limiting. For example, delivery of parts can be limited to how accessible the offshore location is by ship due to various barriers (e.g., sand bars, coral reefs) and the like in the water and surrounding areas, as well as the availability of ships capable of handling such large structures.

Whether onshore or offshore, the road vehicle or ship options for transporting such equipment has become more limited, particularly as the size of wind turbines increase. Delivery is thus limited by the availability of vehicles and ships capable of handling such large structures. The very long lengths of wind turbine blades (some are presently 90 meters long, 100 meters long, or even longer) make conventional transportation by train, truck, or ship very difficult and complicated. Unfortunately, the solution is not as simple as making transportation vehicles longer and/or larger. There are a variety of complications that present themselves as vehicles are made longer and/or larger, including but not limited to complications of: load balancing of the vehicle; load balancing the equipment being transported; load balancing the two with respect to each other; handling, maneuverability, and control of the vehicle; and other complications that would be apparent to those skilled in the art.

Further, whether onshore or offshore, delivery of parts can be slow and severely limited by the accessibility of the site. Whether the site being developed is old or new, the sites can often be remote, and thus not near suitable transportation infrastructure. The sites may be far away from suitable roads and rails (or other means by which cargo may be transported) to allow for easy delivery of cargo for use in building the turbines at the site and/or other equipment used in developing the site. New sites are often in areas without any existing transportation infrastructure at all, thus requiring new construction and special equipment. Ultimately, transportation logistics become cost prohibitive, resulting in a literal and figurative roadblock to further advancing the use of wind energy on a global scale.

A critical consideration for air vehicle is the required amount of cargo space to reserve for payload. This is true regardless of whether the vehicle carries its cargo internally or externally. If the air vehicle carries cargo internally, then for any particular nondimensional shape of the air vehicle, increasing the dimensional size of cargo will result in a required increase in the size of the air vehicle, which causes increases in aerodynamic drag, structural weight, and additional drag/weight/cost to meet additional requirements for the enclosed volume (e.g., environmental control, ventilation, cargo restraint, crashworthiness, and the like). A nondimensional shape is a term often used in aerospace in which a shape has all spatial dimensions and defining coordinates divided out by a scaling constant that is characteristic of the shape. For example, airfoils are often examined non-dimensionally by considering their shape divided by the chord length. Simply stated, larger cargo requires an increase in the size of the aircraft.

Furthermore, if two or more cargo objects, such as wind turbine blades, are not packaged optimally for transportation, a larger than necessary cargo aircraft will be required for transportation. This results in increased weight of the aircraft, greater cost to build the aircraft, greater fuel consumption, greater airport restrictions, and the like. Therefore, during the design phase, it is highly desirable to minimize air vehicle drag, weight, and cost, and to improve air vehicle balance, stability, and controllability by minimizing vehicle dimensions, and by extension, packaged payload dimensions.

The space set aside to carry a cargo or payload is called a space reservation. If many different types of cargos or payloads are being considered, the final space reservation for all possible combinations of these cargos and payloads can be considered a final homogenous space reservation. Since vehicles and their potential payloads might have a variety of complex shapes and sizes, it is nontrivial to determine the space reservation for all combinations of sizes and shapes of desired payloads and cargos as a starting point for vehicle design. Additionally, the process of earning a fixed-wing aircraft type certificate is an extremely time-consuming and costly process, generally taking several years and billions of U.S. dollars after finalization of a design. By the time an aircraft is designed, prototyped, tested, certified, and produced, significant changes often occur within products outside of the aircraft industry. These changes may cause the products developed in the interim to not fit into aircraft that were originally developed to carry these products. This risk is likely to exist even for vehicles that are not aircraft subject to the type certification process. Once vehicle dimensions are set, a smaller loaded payload package offers a higher likelihood of fitting into the vehicle, plus faster loading and unloading, more clearance to reduce the likelihood of collisions and related damage, and greater accessibility in the loaded cargo bay.

Accordingly, there is a need for ways to calculate the space reservation for multiple prospective combinations of sizes and shapes of desired payloads and cargos as a starting point for vehicle design.

SUMMARY

The present disclosure provides systems and methods for calculating a space reservation, also referred to herein a "keep-out zone," based on multiple prospective combinations of sizes and shapes of desired payloads. In some instances, embodiments include generating a parametric model of one or more payload types and generating a representative population of payload shapes to determine a maximally sized envelope suitable to contain all representation population. In some instances, embodiments include determining optimized orientations of multi-object payloads of at least some of the representative population of payload shapes to maximize the packing efficiency before calculating a space reservation. These and other advantages will be apparent from the following detailed description and accompanying figures.

Examples of the present disclosure include a computer-implemented method of generating a space reservation volume for use in sizing a cargo bay of a cargo aircraft. The method includes generating one or more optimized payload orientations of one or more representative payloads to be carried in a cargo bay of a cargo aircraft, generating an initial keep out volume containing the one or more optimized payload orientations, creating a final keep out volume by sequentially adding a plurality of margins to the initial keep out volume, and generating a space reservation volume based on the final keep out volume. The three generating actions, and the creating action, are performed using a processor in at least some instances. The space reservation volume is dimensioned greater than or equal to the final keep out volume such that the space reservation volume is suitable for use in sizing interior dimensions of the cargo bay. Further, the cargo bay is suitable for at least one of loading, unloading, or holding a payload represented by the one or more representative payloads in their respective optimized payload orientations.

The one or more representative payloads can include one or more wind turbine blades. Generating the initial keep out volume can include generating a union of 3D geometries of the one or more optimized payload orientations. In some examples, generating an initial keep out volume can include sweeping a 3D geometry of each of the one or more representative payloads in their respective one or more optimized payload orientations through at least one of a simulated loading movement or a simulated unloading movement to generate a swept 3D geometry of a volume swept through by the one or more representative payloads. It can also include generating a union of the swept 3D geometries of the one or more optimized payload orientations.

The method can further include generating one or more optimized payload orientations of two or more representative payloads by running an optimization routine configured to test a plurality of possible non-intersecting orientations of the two or more representative payloads and calculate at least one cost function for each possible non-intersecting orientation. The optimized payload orientation can include a set of possible non-intersecting orientations that: (1) minimizes the one or more cost functions; and/or (2) minimizes a weighted average of the one or more cost functions. Running the optimization routine to test the plurality of possible non-intersecting orientations of the two or more representative payloads can include keeping a 3D geometry of at least one of the two or more representative payloads fixed in space and sequentially iterating a plurality of degrees of freedom of the 3D geometries of the remaining two or more representative payloads. Further, for each iteration, the at least one cost function that includes at least a minimum clearance between the two or more representative payloads can be calculated.

In some examples, the plurality of margins includes a first set of margins based on 3D geometries of the one or more representative payloads. The first set of margins can include at least one or more of: an additive offset for payload shape uncertainty; an additive offset for payload manufacturing tolerances; an additive offset for payload flexibility; and/or an additive offset for thermal deformation. The plurality of margins can include a second set of margins based on 3D geometries of one or more fixtures configured to hold the one or more representative payloads in the one or more optimized payload orientations. The second set can include an additive offset for the one or more fixtures. In some examples, creating the final keep out volume can include creating an intermediate keep out volume by sweeping the initial keep out volume through at least one of a simulated loading movement or a simulated unloading movement to generate a third set of margins of the plurality of margins based on at least one of the loading or unloading sweeps. The third set can include an additive offset representing the volume swept through by the intermediate keep out volume during the at least one of the simulated loading movement or the simulated unloading movement.

In some examples, the method includes creating the final keep out volume by adding one or more of the first or second set of margins to the initial keep out volume before sweeping the initial keep out volume and subsequently adding the third set of margins. Creating the final keep out volume can include adding one or more of the first, second, or third set of margins to the initial keep out volume after sweeping the initial keep out volume. In some examples, creating the final keep out volume includes adding a fourth set of margins of the plurality of margins, the fourth set including an additive offset representing a minimum clearance margin between the intermediate keep out volume and an inner wall of the cargo bay. The fourth set can include an additive offset representing manufacturing tolerances of the cargo aircraft. In some examples, the fourth set includes an additive offset representing structural elements configured to support the one or more representative payloads in the cargo bay. In some examples, the fourth set can include an additive offset representing equipment configured to move the one or more representative payloads during a loading operation and/or an unloading operation. Generating the space reservation volume can include generating a convex hull based on the final keep out volume.

In some examples, the method further includes, before generating the one or more optimized payload orientations, calculating, for instance using a processor, the one or more representative payloads by generating 3D geometries for a plurality of sample payload shapes when a parameterized nominal payload geometry definition includes a plurality of geometric parameters. Each sample payload shape can have at least one different geometric parameter. The method can further include reducing the plurality of sample payload shapes to the one or more representative payloads using a down-selection process to remove sample payload shapes that do not expand a volume envelope of a combination of all the sample payload shapes.

In some examples, generating 3D geometries for a plurality of sample payload shapes can include using a parametric distribution of one or more of the plurality of geometric parameters. The parameterized nominal payload geometry can include a parameterized nominal wind turbine geometry.

The plurality of geometric parameters can include one or more of the following: a blade twist angle, an airfoil shape, a blade span length, a root diameter, a cylindrical root length, a root transition length, a maximum chord length, a location of the maximum chord length, a thickness at the location of the maximum chord length, a pre-bend tip deflection, or a pre-sweep tip deflection.

In some examples, the method can include generating a plurality of dimensions for use in sizing a cargo bay structure to contain the space reservation volume. In some examples, the method can include generating a plurality of dimensions for use in sizing a cargo aircraft fuselage structure to contain, load, and/or unload the space reservation volume.

Another example of the present disclosure is a computer system that includes an optimization module, a generating module, a margining module, and a designing module. The optimization module is configured to generate one or more optimized payload orientations of one or more representative payloads to be carried in a cargo bay of a cargo aircraft. The generating module is configured to generate an initial keep out volume containing the one or more optimized payload orientations. The margining module is configured to create a final keep out volume by sequentially adding a plurality of margins to the initial keep out volume. The designing module is configured to generate a space reservation volume based on the final keep out volume. The space reservation volume is dimensioned greater than or equal to the final keep out volume such that the space reservation volume is suitable for use in sizing interior dimensions of the cargo bay and the cargo bay is suitable for at least one of loading, unloading, or holding a payload represented by the one or more representative payloads in their respective optimized payload orientations.

The one or more representative payloads can include one or more wind turbine blades. The generating module can be further configured to generate the initial keep out volume by generating a union of 3D geometries of the one or more optimized payload orientations. The generating module can be further configured to generate an initial keep out volume by sweeping a 3D geometry of each of the one or more representative payloads in their respective one or more optimized payload orientations through at least one of a simulated loading movement or a simulated unloading movement to generate a swept 3D geometry of a volume swept through by the one or more representative payloads. Further, the module can be configured to generate a union of the swept 3D geometries of the one or more optimized payload orientations.

The optimization module can be further configured to generate one or more optimized payload orientations of two or more representative payloads by running an optimization routine configured to test a plurality of possible non-intersecting orientations of the two or more representative payloads and calculate at least one cost function for each possible non-intersecting orientation. The optimized payload orientation can include a set of possible non-intersecting orientations that: (1) minimizes the one or more cost functions; and/or (2) minimizes a weighted average of the one or more cost functions.

In some examples, running the optimization routine to test the plurality of possible non-intersecting orientations of the two or more representative payloads can include keeping a 3D geometry of at least one of the two or more representative payloads fixed in space and sequentially iterating a plurality of degrees of freedom of the 3D geometries of the remaining two or more representative payloads. For each iteration, the routine can include calculating the at least one cost function that includes at least a minimum clearance between the two or more representative payloads. The plurality of margins can include a first set of margins based on 3D geometries of the one or more representative payloads. The first set of margins can include at least one or more of: an additive offset for payload shape uncertainty; an additive offset for payload manufacturing tolerances; an additive offset for payload flexibility; and/or an additive offset for thermal deformation. The plurality of margins can include a second set of margins based on 3D geometries of one or more fixtures configured to hold the one or more representative payloads in the one or more optimized payload orientations. The second set can include an additive offset for the one or more fixtures.

In some examples, the margining module can be further configured to create the final keep out volume by creating an intermediate keep out volume, for instance by sweeping the initial keep out volume through at least one of a simulated loading movement or a simulated unloading movement to generate a third set of margins of the plurality of margins based on at least one of the loading or unloading sweeps. The third set can include an additive offset representing the volume swept through by the intermediate keep out volume during the at least one of the simulated loading movement or the simulated unloading movement.

In some examples, the margining module can be further configured to create the final keep out volume by adding one or more of the first or second set of margins to the initial keep out volume before sweeping the initial keep out volume and subsequently adding the third set of margins. The margining module can be further configured to create the final keep out volume by adding one or more of the first, second, or third set of margins to the initial keep out volume after sweeping the initial keep out volume. The margining module can be further configured to create the final keep out volume by adding a fourth set of margins of the plurality of margins. The fourth set can include an additive offset representing a minimum clearance margin between the intermediate keep out volume and an inner wall of the cargo bay. The fourth set can include an additive offset representing manufacturing tolerances of the cargo aircraft. The fourth set can include an additive offset representing structural elements configured to support the one or more representative payloads in the cargo bay. The fourth set can include an additive offset representing equipment configured to move the one or more representative payloads during a loading operation and/or an unloading operation. In some examples, the designing module can be further configured to the create space reservation volume by generating a convex hull based on the final keep out volume.

Examples of the computer system can include a modeling module. The modeling module can be configured to, before generating the one or more optimized payload orientations, calculate the one or more representative payloads. The modeling module can further be configured to generate 3D geometries for a plurality of sample payload shapes when a parameterized nominal payload geometry definition includes a plurality of geometric parameters Each sample payload shape can have at least one different geometric parameter. The modeling module can be further configured to reduce the plurality of sample payload shapes to the one or more representative payloads using a down-selection process to remove sample payload shapes that do not expand a volume envelope of a combination of all the sample payload shapes.

In some examples, the modeling module can be further configured to generate 3D geometries for a plurality of sample payload shapes by using a parametric distribution of one or more of the plurality of geometric parameters. The parameterized nominal payload geometry can include a parameterized nominal wind turbine geometry.

The plurality of geometric parameters can include one or more of the following: a blade twist angle, an airfoil shape, a blade span length, a root diameter, a cylindrical root length, a root transition length, a maximum chord length, a location of the maximum chord length, a thickness at the location of the maximum chord length, a pre-bend tip deflection, or a pre-sweep tip deflection. The designing module can be further configured to generate a plurality of dimensions for use in sizing a cargo bay structure to contain the space reservation volume. In some examples, the designing module can be further configured to generate a plurality of dimensions for use in sizing a cargo aircraft fuselage structure to contain, load, and/or unload the space reservation volume.

Yet another example of the present disclosure is a computer program product. The computer program product includes a tangible, non-transient computer usable medium having computer readable program code on it. The computer readable program code contains instructions that, when executed by a processor, is configured to: (1) generate one or more optimized payload orientations of one or more representative payloads to be carried in a cargo bay of a cargo aircraft; (2) generate an initial keep out volume containing the one or more optimized payload orientations; (3) create a final keep out volume by sequentially adding a plurality of margins to the initial keep out volume; and (4) generate a space reservation volume based on the final keep out volume. The space reservation volume is dimensioned greater than or equal to the final keep out volume such that the space reservation volume is suitable for use in sizing interior dimensions of the cargo bay and the cargo bay is suitable for at least one of loading, unloading, or holding a payload represented by the one or more representative payloads in their respective optimized payload orientations.

The one or more representative payloads can include one or more wind turbine blades. The instructions to generate the initial keep out volume can include instruction to generate a union of 3D geometries of the one or more optimized payload orientations. The instructions to generate an initial keep out volume can include instructions to sweep a 3D geometry of each of the one or more representative payloads in their respective one or more optimized payload orientations through at least one of a simulated loading movement or a simulated unloading movement to generate a swept 3D geometry of a volume swept through by the one or more representative payloads. The instructions to generate can also include instructions to generate a union of the swept 3D geometries of the one or more optimized payload orientations.

The computer program product, in some examples, can include instructions to generate one or more optimized payload orientations of two or more representative payloads by running an optimization routine configured to test a plurality of possible non-intersecting orientations of the two or more representative payloads and calculate at least one cost function for each possible non-intersecting orientation. The optimized payload orientation including a set of possible non-intersecting orientations that: (1) minimizes the one or more cost functions; and/or (2) minimizes a weighted average of the one or more cost functions.

The computer program product, in some examples, can include instructions to run the optimization routine to test the plurality of possible non-intersecting orientations of the two or more representative payloads includes instructions to keep a 3D geometry of at least one of the two or more representative payloads fixed in space and sequentially iterate a plurality of degrees of freedom of the 3D geometries of the remaining two or more representative payloads. For each iteration, the at least one cost function that includes at least a minimum clearance between the two or more representative payloads can be calculated. The plurality of margins can include a first set of margins based on 3D geometries of the one or more representative payloads. The first set of margins can include at least one or more of: an additive offset for payload shape uncertainty; an additive offset for payload manufacturing tolerances; an additive offset for payload flexibility; and/or an additive offset for thermal deformation. The plurality of margins can include a second set of margins based on a 3D geometries of one or more fixtures configured to hold the one or more representative payloads in the one or more optimized payload orientations. The second set can include an additive offset for the one or more fixtures.

In some examples, the instructions to create the final keep out volume can include instructions to create an intermediate keep out volume by sweeping the initial keep out volume through at least one of a simulated loading movement or a simulated unloading movement to generate a third set of margins of the plurality of margins based on at least one of the loading or unloading sweeps. The third set can include an additive offset representing the volume swept through by the intermediate keep out volume during the at least one of the simulated loading movement or the simulated unloading movement.

The computer program product, in some examples, can include instructions to add one or more of the first or second set of margins to the initial keep out volume before sweeping the initial keep out volume and subsequently adding the third set of margins. The computer program product, in some examples, can include instructions to add one or more of the first, second, or third set of margins to the initial keep out volume after sweeping the initial keep out volume.

The instructions to create the final keep out volume can include instructions to add a fourth set of margins of the plurality of margins. The fourth set can include an additive offset representing a minimum clearance margin between the intermediate keep out volume and an inner wall of the cargo bay. The fourth set can include an additive offset representing manufacturing tolerances of the cargo aircraft. The fourth set can include an additive offset representing structural elements configured to support the one or more representative payloads in the cargo bay. The fourth set can include an additive offset representing equipment configured to move the one or more representative payloads during at least one of a loading operation or an unloading operation.

In some examples, the instructions to generate the space reservation volume can include instructions to generate a convex hull based on the final keep out volume.

In some examples, the computer program product of any of claims can include, before the instructions to generate the one or more optimized payload orientations, instructions to calculate the one or more representative payloads. The instructions can include instructions to generate 3D geometries for a plurality of sample payload shapes when a parameterized nominal payload geometry definition includes a plurality of geometric parameters. Each sample payload shape can have at least one different geometric parameter. Further, instructions to reduce the plurality of sample payload shapes to the one or more representative payloads can use a down-selection process to remove sample payload shapes that do not expand a volume envelope of a combination of all the sample payload shapes.

The instructions to generate 3D geometries for a plurality of sample payload shapes can include instructions to use a parametric distribution of one or more of the plurality of geometric parameters. The parameterized nominal payload geometry can include a parameterized nominal wind turbine geometry. The plurality of geometric parameters can include one or more of the following: a blade twist angle, an airfoil shape, a blade span length, a root diameter, a cylindrical root length, a root transition length, a maximum chord length, a location of the maximum chord length, a thickness at the location of the maximum chord length, a pre-bend tip deflection, or a pre-sweep tip deflection. The computer program product can include instructions to generate a plurality of dimensions for use in sizing a cargo bay structure to contain the space reservation volume. The computer program product can include instructions to generate a plurality of dimensions for use in sizing a cargo aircraft fuselage structure to at least one of contain, load, and/or unload the space reservation volume.

Still another example of the present disclosure is an aircraft that includes a fuselage defining a forward end, an aft end, a cargo bay that spans a majority of a length of the fuselage from the forward end to the aft end the interior cargo bay defining an interior volume of a size and shape. The interior volume size and shape are determined by: generating one or more optimized payload orientations of one or more representative payloads to be carried in the cargo bay, generating an initial keep out volume containing the one or more optimized payload orientations, creating a final keep out volume by sequentially adding a plurality of margins to the initial keep out volume, and generating the interior volume based on the final keep out volume. The size and shape of the interior volume are dimensioned greater than or equal to the final keep out volume such that the interior volume of the cargo bay is suitable for at least one of loading, unloading, or holding a payload represented by the one or more representative payloads in their respective optimized payload orientations.

BRIEF DESCRIPTION OF DRAWINGS

This disclosure will be more fully understood from the following detailed description taken in conjunction with the accompanying drawings, in which:

FIG. 8H is an isometric view of a translucent final keep-out volume showing an intermediate keep-out volume and a solid initial keep-out volume;

FIG. 8I is an isometric view of a solid final keep-out volume disposed inside a translucent exterior loft of an actual aircraft design made using the final keep-out volume;

DETAILED DESCRIPTION

Figure 1A:
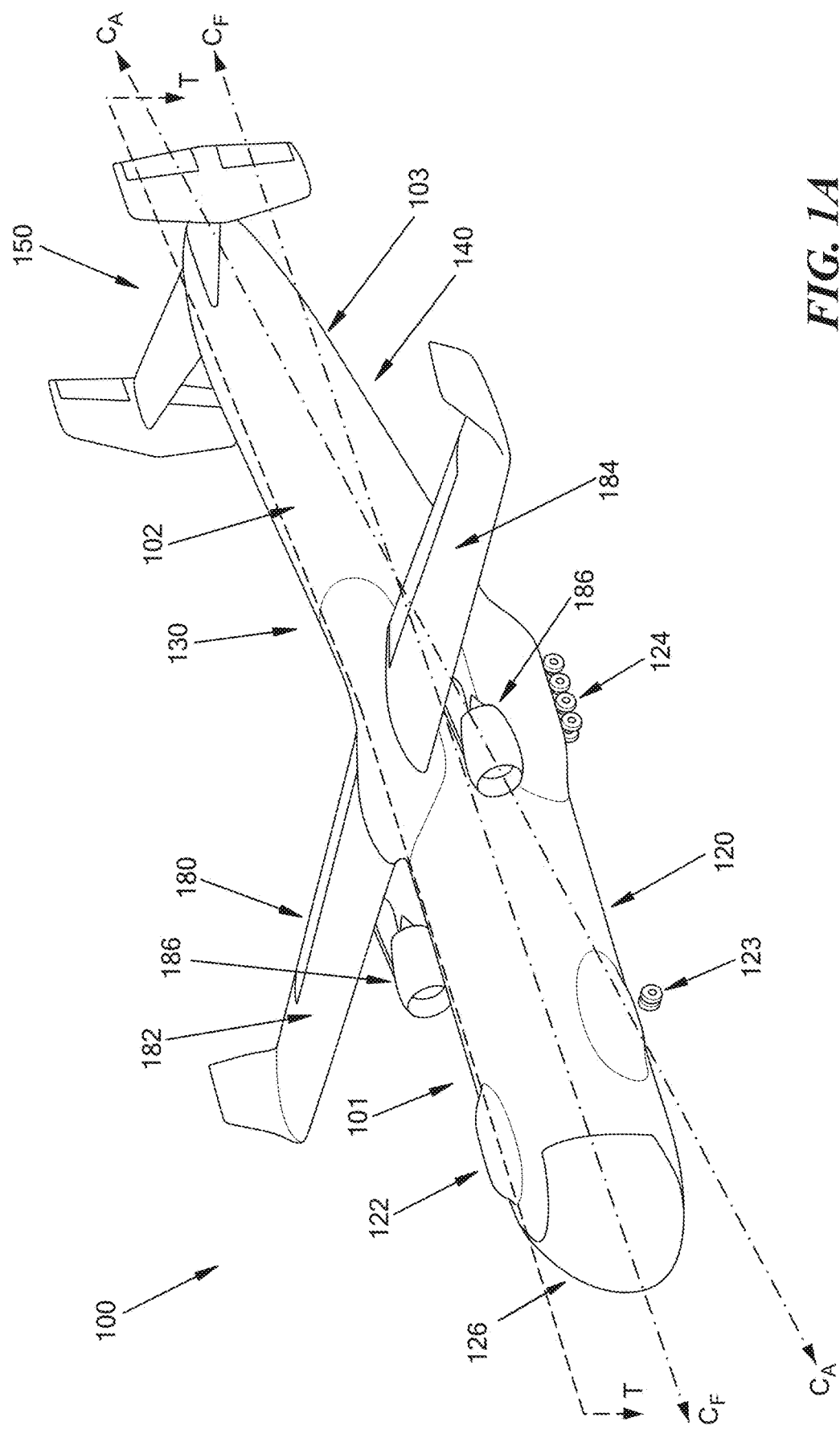
FIG. 1A is an isometric view of one exemplary embodiment of an aircraft.

Certain exemplary embodiments will now be described to provide an overall understanding of the principles of the structure, function, manufacture, and use of the devices, systems, aircraft, and methods disclosed herein. One or more examples of these embodiments are illustrated in the accompanying drawings. Those skilled in the art will understand that the devices, systems, aircraft, components related to or otherwise part of such devices, systems, and aircraft, and methods specifically described herein and illustrated in the accompanying drawings are non-limiting exemplary embodiments and that the scope of the present disclosure is defined solely by the claims. The features illustrated or described in connection with one exemplary embodiment may be combined with the features of other embodiments. Such modifications and variations are intended to be included within the scope of the present disclosure. Some of the embodiments provided for herein may be schematic drawings, including possibly some that are not labeled as such but will be understood by a person skilled in the art to be schematic in nature. They may not be to scale or may be somewhat crude renderings of the disclosed components. A person skilled in the art will understand how to implement these teachings and incorporate them into work systems, methods, aircraft, and components related to each of the same, provided for herein.

To the extent the present disclosure includes various terms for components and/or processes of the disclosed devices, systems, aircraft, methods, and the like, one skilled in the art, in view of the claims, present disclosure, and knowledge of the skilled person, will understand such terms are merely examples of such components and/or processes, and other components, designs, processes, and/or actions are possible. By way of non-limiting example, while the present application describes loading an airplane through a front end of the aircraft, alternatively, or additionally, loading can occur through an aft end of the aircraft and/or from above and/or below the aircraft. In the present disclosure, like-numbered and like-lettered components of various embodiments generally have similar features when those components are of a similar nature and/or serve a similar purpose. To the extent terms such as front, back, top, bottom, forward, aft, proximal, distal, etc. are used to describe a location of various components of the various disclosures, such usage is by no means limiting, and is often used for convenience when describing various possible configurations. The foregoing notwithstanding, a person skilled in the art will recognize the common vernacular used with respect to aircraft, such as the terms "forward" and "aft," and will give terms of those nature their commonly understood meaning. Further in some instances, terms like forward and proximal or aft and distal may be used in a similar fashion.

The present application is directed to systems and methods for calculating a space reservation volume for use in sizing an interior cargo bay of a cargo aircraft to load, unload, and transport a class of new irregular shapes (e.g., unknown shapes corresponding to future wind turbine blades, towers, industrial oil equipment, mining equipment, rockets, military equipment and vehicles, defense hardware, crane segments, aircraft components, space launch rocket boosters, helicopters, generators, hyperloop tubes, and many other pieces of oversized cargo). The space reservation volume can represent a keep out zone (e.g., 3D volume and dimensions) for sizing a cargo aircraft and/or a cargo bay of a cargo aircraft suitable for carrying an entire class of payload objects having a plurality of different shapes and sizes the irregular shapes together to fit as much as possible into a fixed-size interior cargo bay of an existing air vehicle.

The present disclosure is also related to large, transport-category aircraft, capable of moving oversized cargo not traditionally shippable by air. For example, wind turbine blades are irregular in shape and new wind turbine blades are very long (e.g., exceeding 80 meters to 90 meters) to provide greater electrical power generating efficiency. The present disclosure provides systems and methods for creating a population of representative payload shapes using a parametric model as well as optimized orientations of multiples of some or all of the representative payload shapes using an optimization routine. The optimization routine can determine a plurality of packing strategy that can be used as an initial representative payload from which to build out a space reservation volume based on a plurality of additive offsets.

Still further, the present disclosure is related to designing interior cargo bay spaces to best adapt for the optimized packages, thus providing for optimized interior cargo bay space in addition to optimized payload packages. Notably, to the extent the present disclosures are directed to systems and methods for designing cargo bays of aircrafts, such disclosures can be applied to any vehicle, or any object more generally, used in conjunction with holding and/or transporting a volume, such as trucks, containers (e.g., shipping containers), rooms, etc.

Examples of the present disclosure can generate a population of multiple large, irregularly-shaped objects, such as wind turbine blades, based on a parametric model and then determine how they may be optimally oriented in space, subject to multiple constraints and cost functions (e.g., a minimum clearance between objects in a payload). The determinations can be used to generate a plurality of representative payloads, each of which can be swept along a 3D path to simulate a loading and unloading movement to generate a swept payload volume. A union can be taken from the generated swept payload volume to generate an initial keep-out volume. Further, once an initial keep-out volume is determined, a plurality of additive offsets can be added to generate a final keep-out volume that represents the minimum interior cargo bay dimensions necessary to load, unload, and transport any real payload that resembles the representative payloads (among other payloads).

Example Cargo Aircraft for Carrying Large Irregularly-Shaped Objects

Figure 1B:
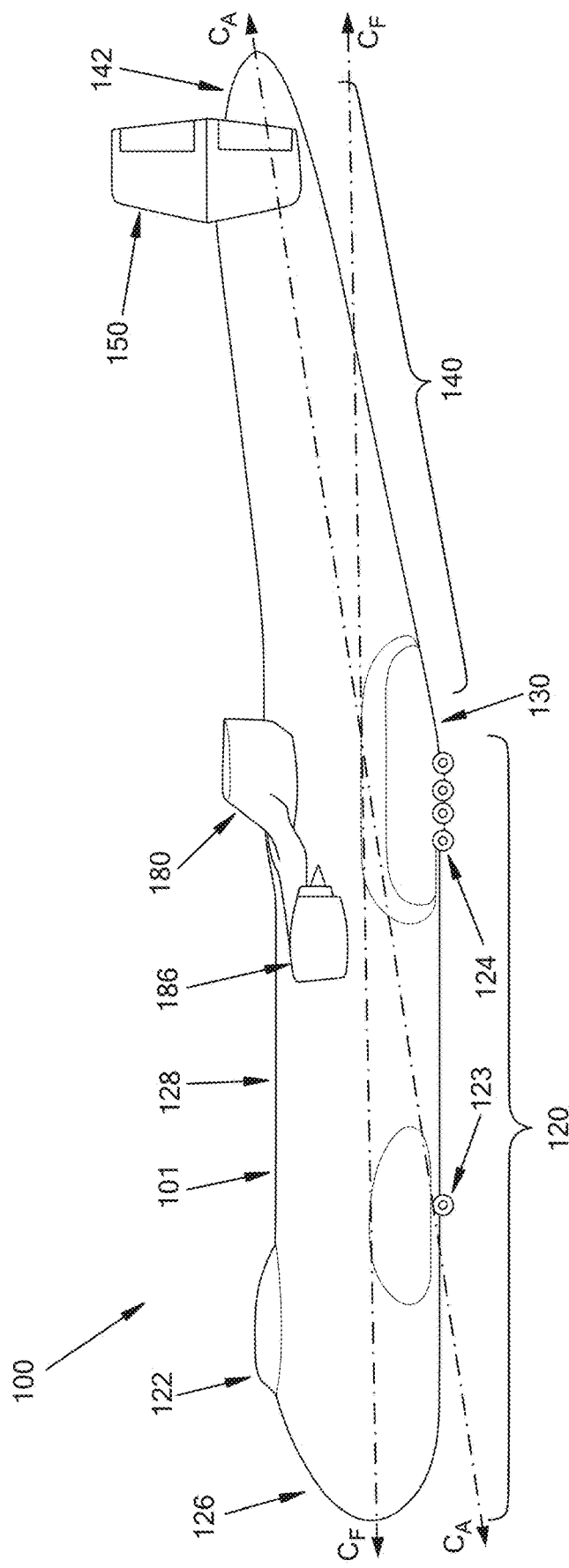
FIG. 1B is a side view of the aircraft of FIG. 1A.

The focus of the present disclosures is described with respect to a large aircraft 100, such as an airplane, illustrated in FIGS. 1A and 1B, along with the loading of a large payload into the aircraft, illustrated at least in FIGS. 2A-2D. Additional details about the aircraft and payload may be described with respect to the other figures of the present disclosure as well. In the illustrated embodiment, a payload 10 is a combination of two wind turbine blades 11A and 11B (FIGS. 2B-2D), although a person skilled in the art will appreciate that other payloads are possible. Such payloads can include other numbers of wind turbine blades (e.g., one, three, four, five, etc., or segments of a single even larger blade), other components of wind turbines (e.g., tower segments, generator, nacelle, gear box, hub, power cables, etc.), or many other large structures and objects whether related to wind turbines or not. The present application can be used in conjunction with most any large payload—large for the present purposes being at least about 57 meters long, or at least about 60 meters long, or at least about 65 meters long, or at least about 75 meters long, or at least about 85 meters long, or at least about 90 meters long, or at least about 100 meters long, or at least about 110 meters long, or at least about 120 meters long—or for smaller payloads if desired. Some non-limiting examples of large payloads that can be used in conjunction with the present disclosures beyond wind turbines include but are not limited to industrial oil equipment, mining equipment, rockets, military equipment and vehicles, defense hardware, commercial aerospace vehicles, crane segments, aircraft components, space launch rocket boosters, helicopters, generators, or hyperloop tubes. In other words, the aircraft 100 can be used with most any size and shape payload, but has particular utility when it comes to large, often heavy, payloads.

As shown, for example in FIGS. 1A-1B and 2A-2D, the aircraft 100, and thus its fuselage 101, includes a forward end 120 and an aft end 140, with a kinked portion 130 connecting the forward end 120 to the aft end 140. The forward end 120 is generally considered any portion of the aircraft 100, and related components, that are forward of the kinked portion 130 and the aft end 140 is considered any portion of the aircraft 100, and related components, that are aft of the kinked portion 130. The kinked portion 130, as described in greater detail below, is a section of the aircraft 130 in which both a top-most outer surface 102 and a bottom-most outer surface 103 of the fuselage 101 become angled (notably, the placement of reference numerals 102 and 103 in the figures do not illustrate location of the "kink" since they more generally refer to the top-most and bottom-most surfaces of the fuselage 101), as illustrated by an aft centerline $C_A$ of the aft end 140 of the fuselage 101 with respect to a forward centerline $C_F$ of the forward end 120 of the fuselage 101.

The forward end 120 can include a cockpit or flight deck 122, and landing gears, as shown a forward or nose landing gear 123 and a rear or main landing gear 124. The illustrated embodiment does not show various components used to couple the landing gears 123, 124 to the fuselage 101, or operate the landing gears (e.g., actuators, braces, shafts, pins, trunnions, pistons, cylinders, braking assemblies, etc.), but a person skilled in the art will appreciate how the landing gears 123, 124 are so connected and operable in conjunction with the aircraft 100. The forward-most end of the forward end 120 includes a nose cone 126. As illustrated more clearly in FIG. 2A, the nose cone 126 is functional as a door, optionally being referred to the nose cone door, thus allowing access to an interior cargo bay 170 defined by the fuselage 101 via a cargo opening 171 exposed by moving the nose cone door 126 into an open or loading position (the position illustrated in FIG. 2A; FIGS. 1A and 1B illustrate the nose cone door 126 in a closed or transport position). The door may operate by rotating vertically tip-upwards about a lateral axis, or by rotating horizontally tip-outboards about a vertical axis, or by other means as well such as translation forwards then in other directions, or by paired rotation and translation, or other means.

As described in greater detail below, the interior cargo bay 170 is continuous throughout the length of the aircraft 101, i.e., it spans a majority of the length of the fuselage. The continuous length of the interior cargo bay 170 includes the space defined by the fuselage 101 in the forward end 120, the aft end 140, and the kinked portion 130 disposed therebetween, such spaces being considered corresponding to the forward bay, aft bay, and kinked bay portions of the interior cargo bay 170. The interior cargo bay 170 can thus include the volume defined by nose cone 126 when it is closed, as well as the volume defined proximate to a fuselage tail cone 142 located at the aft end 140. In the illustrated embodiment of FIG. 2A, the nose cone door 126 is hinged at a top such that it swings clockwise towards the fuselage cockpit 122 and a fixed portion or main section 128 of the fuselage 101. In other embodiments, a nose cone door can swing in other manners, such as being hinged on a left or right side to swing clockwise or counter-clockwise towards the fixed portion 128 of the fuselage. The fixed portion 128 of the forwards fuselage 101 is the portion that is not the nose cone 126, and thus the forwards fuselage 101 is a combination of the fixed portion 128 and the nose cone 126. Alternatively, or additionally, the interior cargo bay 170 can be accessed through other means of access known to those skilled in the art, including but not limited to a hatch, door, and/or ramp located in the aft end 140 of the fuselage 101, hoisting cargo into the interior cargo bay 170 from below, and/or lowering cargo into the interior cargo bay 170 from above. One advantage provided by the illustrated configuration, at least as it relates to some aspects of loading large payloads, is that by not including an aft door, the interior cargo bay 170 can be continuous, making it significantly easier to stow cargo in the aft end 140 all the way into the fuselage tail cone 142. While loading through an aft door is possible with the present disclosures, doing so would make loading into and use of the interior cargo bay 170 space in the aft end 140 all the way into the fuselage tail cone 142 much more challenging and difficult to accomplish—a limitation faced in existing large cargo aircraft configurations. Existing large cargo aircraft are typically unable to add cargo in this way (e.g., upwards and aftwards) because any kink present in their aft fuselage is specifically to create more vertical space for an aft door to allow large cargo into the forwards portion of the aircraft.

A floor 172 can be located in the interior cargo bay 170, and can also extend in a continuous manner, much like the bay 170 itself, from the forward end 120, through the kinked portion 130, and into the aft end 140. The floor 172 can thus be configured to have a forward end 172f, a kinked portion 172k, and an aft end 172a. In some embodiments, the floor 172 can be configured in a manner akin to most floors of cargo bays known in the art. In some other embodiments, discussed in greater detail below, one or more rails can be disposed in the interior cargo bay 170 and can be used to assist in loading a payload, such as the payload 10, into the interior cargo bay 170 and/or used to help secure the location of a payload once it is desirably positioned within the interior cargo bay 170.

Opening the nose cone 126 not only exposes the cargo opening 171 and the floor 172, but it also provides access from an outside environment to a cantilevered tongue 160 that extends from or otherwise defines a forward-most portion of the fixed portion 128 of the fuselage 101. The cantilevered tongue can be an extension of the floor 172, or it can be its own feature that extends from below or above the floor 172 and associated bottom portion of the fuselage 101. The cantilevered tongue 160 can be used to support a payload, thus allowing the payload to extend into the volume of the interior cargo bay 170 defined by the nose cone 126.

A wingspan 180 can extend substantially laterally in both directions from the fuselage. The wingspan 180 includes both a first fixed wing 182 and a second fixed wing 184, the wings 182, 184 extending substantially perpendicular to the fuselage 101 in respective first and second directions which are approximately symmetric about a longitudinal-vertical plane away from the fuselage 101, and more particularly extending substantially perpendicular to the centerline $C_F$. Wings 182, 184 being indicated as extending from the fuselage 101 do not necessarily extend directly away from the fuselage 101, i.e., they do not have to be in direct contact with the fuselage 101. Further, the opposite directions the wings 182, 184 extend from each other can alternatively be described as the second wing 184 extending approximately symmetrically away from the first wing 182. As shown, the wings 182, 184 define approximately no sweep angle and no dihedral angle. In alternative embodiments, a sweep angle can be included in the tip-forwards (−) or tip-aftwards (+) direction, the angle being approximately in the range of about −40 degrees to about +60 degrees. In other alternative embodiments, a dihedral angle can be included in the tip-downwards (negative, or "anhedral") or tip-upwards (positive, or "dihedral") direction, the angle being approximately in the range of about −5 degrees to about +5 degrees. Other typical components of wings, including but not limited to slats for increasing lift, flaps for increasing lift and drag, ailerons for changing roll, spoilers for changing lift, drag, and roll, and winglets for decreasing drag can be provided, some of which a person skilled in the art will recognize are illustrated in the illustrations of the aircraft 100 (other parts of wings, or the aircraft 100 more generally, not specifically mentioned in this detailed description are also illustrated and recognizable by those skilled in the art).

Engines, engine nacelles, and engine pylons 186 can also be provided. In the illustrated embodiment, two engines 186, one mounted to each wing 182, 184 are provided. Additional engines can be provided, such as four or six, and other locations for engines are possible, such as being mounted to the fuselage 101 rather than the wings 182, 184.

The kinked portion 130 provides for an upward transition between the forward end 120 and the aft end 140. The kinked portion 130 includes a kink, i.e., a bend, in the fixed portion 128 of the fuselage 101 such that both the top-most outer surface 102 and the bottom-most outer surface 103 of the fuselage 101 become angled with respect to the centerline $C_F$ of the forward end 120 of the aircraft 100, i.e., both surfaces 102, 103 include the upward transition provided for by the kinked portion 130. As shown at least in FIG. 1B, the aft-most end of the aft end 140 can raise entirely above the centerline $C_F$. In the illustrated embodiment, the angle defined by the bottom-most outer surface 103 and the centerline $C_F$ is larger than an angle defined by the top-most outer surface 102 and the centerline $C_F$, although other configurations may be possible. Notably, although the present disclosure generally describes the portions associated with the aft end 140 as being "aft," in some instances they may be referred to as part of a "kinked portion" or the like because the entirety of the aft end 140 is angled as a result of the kinked portion 130. Thus, references herein, including in the claims, to a kinked portion, a kinked cargo bay or cargo bay portion, a kinked cargo centerline, etc. will be understood by a person skilled in the art, in view of the present disclosures, to be referring to the aft end 140 of the aircraft 100 (or the aft end in other aircraft embodiments) in some instances.

Despite the angled nature of the aft end 140, the aft end 140 is well-suited to receive cargo therein. In fact, the aircraft 100 is specifically designed in a manner that allows for the volume defined by the aft end 140, up to almost the very aft-most tip of the aft end 140, i.e., the fuselage tail cone 142, can be used to receive cargo as part of the continuous interior cargo bay 170. Proximate to the fuselage tail cone 142 can be an empennage 150, which can include horizontal stabilizers for providing longitudinal stability, elevators for controlling pitch, vertical stabilizers for providing lateral-directional stability, and rudders for controlling yaw, among other typical empennage components that may or may not be illustrated but would be recognized by a person skilled in the art.

The aircraft 100 is particularly well-suited for large payloads because of a variety of features, including its size. A length from the forward-most tip of the nose cone 126 to the aft-most tip of the fuselage tail cone 142 can be approximately in the range of about 60 meters to about 150 meters. Some non-limiting lengths of the aircraft 100 can include about 80 meters, about 84 meters, about 90 meters, about 95 meters, about 100 meters, about 105 meters, about 107 meters, about 110 meters, about 115 meters, or about 120 meters. Shorter and longer lengths are possible. A volume of the interior cargo bay 170, inclusive of the volume defined by the nose cone 126 and the volume defined in the fuselage tail cone 142, both of which can be used to stow cargo, can be approximately in the range of about 1200 cubic meters to about 12,000 cubic meters, the volume being dependent at least on the length of the aircraft 100 and an approximate diameter of the fuselage (which can change across the length). One non-limiting volume of the interior cargo bay 170 can be about 6850 cubic meters. Not accounting for the very terminal ends of the interior cargo bay 170 where diameters get smaller at the terminal ends of the fuselage

101, diameters across the length of the fuselage, as measured from an interior thereof (thus defining the volume of the cargo bay) can be approximately in the range of about 4.3 meters to about 13 meters, or about 8 meters to 11 meters. One non-limiting diameter of the fuselage 101 proximate to its midpoint can be about 9 meters. The wingspan, from tip of the wing 132 to the tip of the wing 134, can be approximately in the range of about 60 meters to 110 meters, or about 70 meters to about 100 meters. One non-limiting length of the wingspan 180 can be about 80 meters. A person skilled in the art will recognize these sizes and dimensions are based on a variety of factors, including but not limited to the size and mass of the cargo to be transported, the various sizes and shapes of the components of the aircraft 100, and the intended use of the aircraft, and thus they are by no means limiting. Nevertheless, the large sizes that the present disclosure both provides the benefit of being able to transport large payloads, but faces challenges due, at least in part, to its size that make creating such a large aircraft challenging. The engineering involved is not merely making a plane larger. As a result, many innovations tied to the aircraft 100 provided for herein, and in other counterpart patent applications, are the result of very specific design solutions arrived at by way of engineering.

Materials typically used for making fuselages can be suitable for use in the present aircraft 100. These materials include, but are not limited to, metals and metal alloys (e.g., aluminum alloys), composites (e.g., carbon fiber-epoxy composites), and laminates (e.g., fiber-metallic laminates), among other materials, including combinations thereof.

Figure 2A:
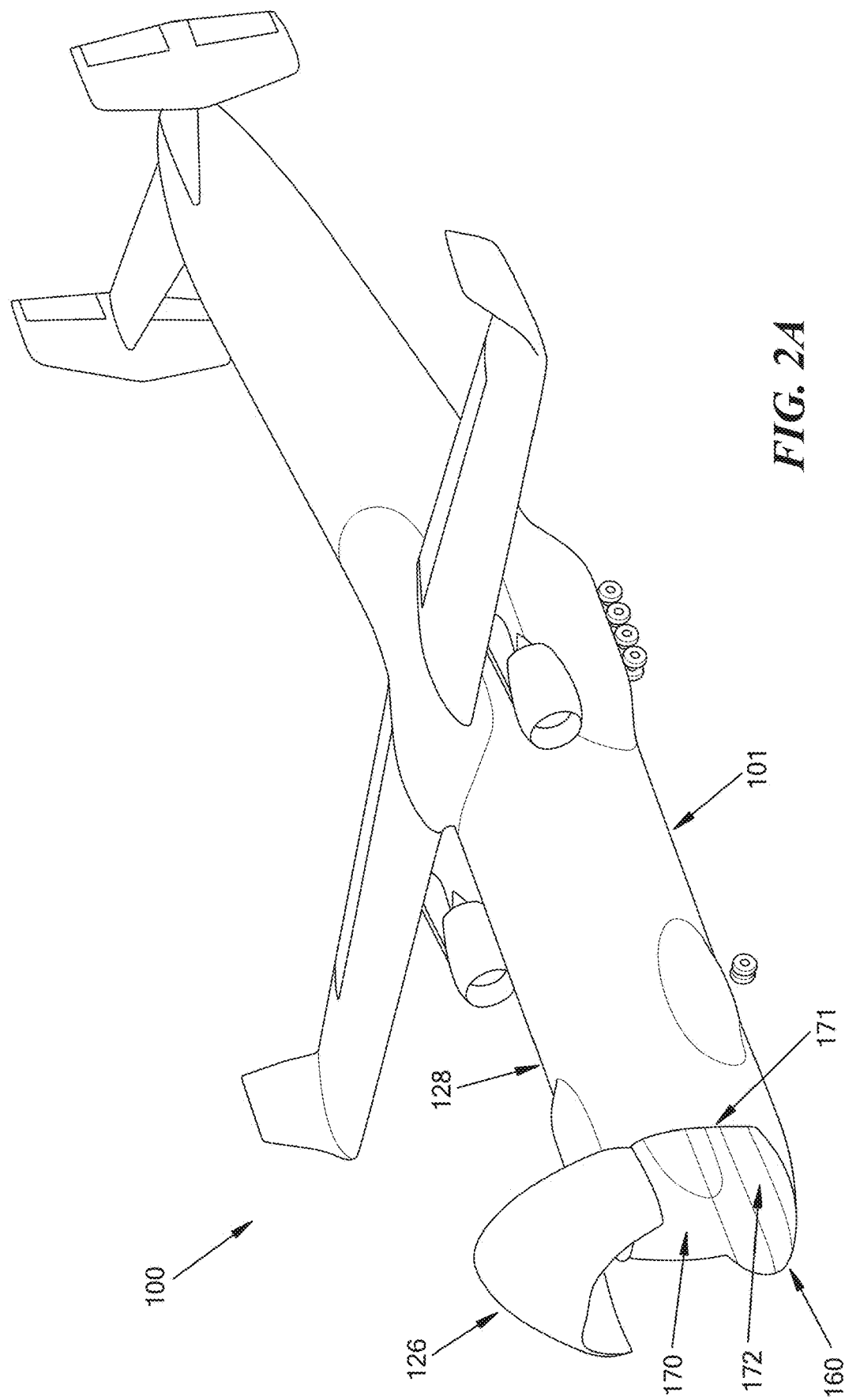
FIG. 2A is an isometric view of the aircraft of FIG. 1A with a nose cone door in an open position to provide access to an interior cargo bay of the aircraft.
Figure 2B:
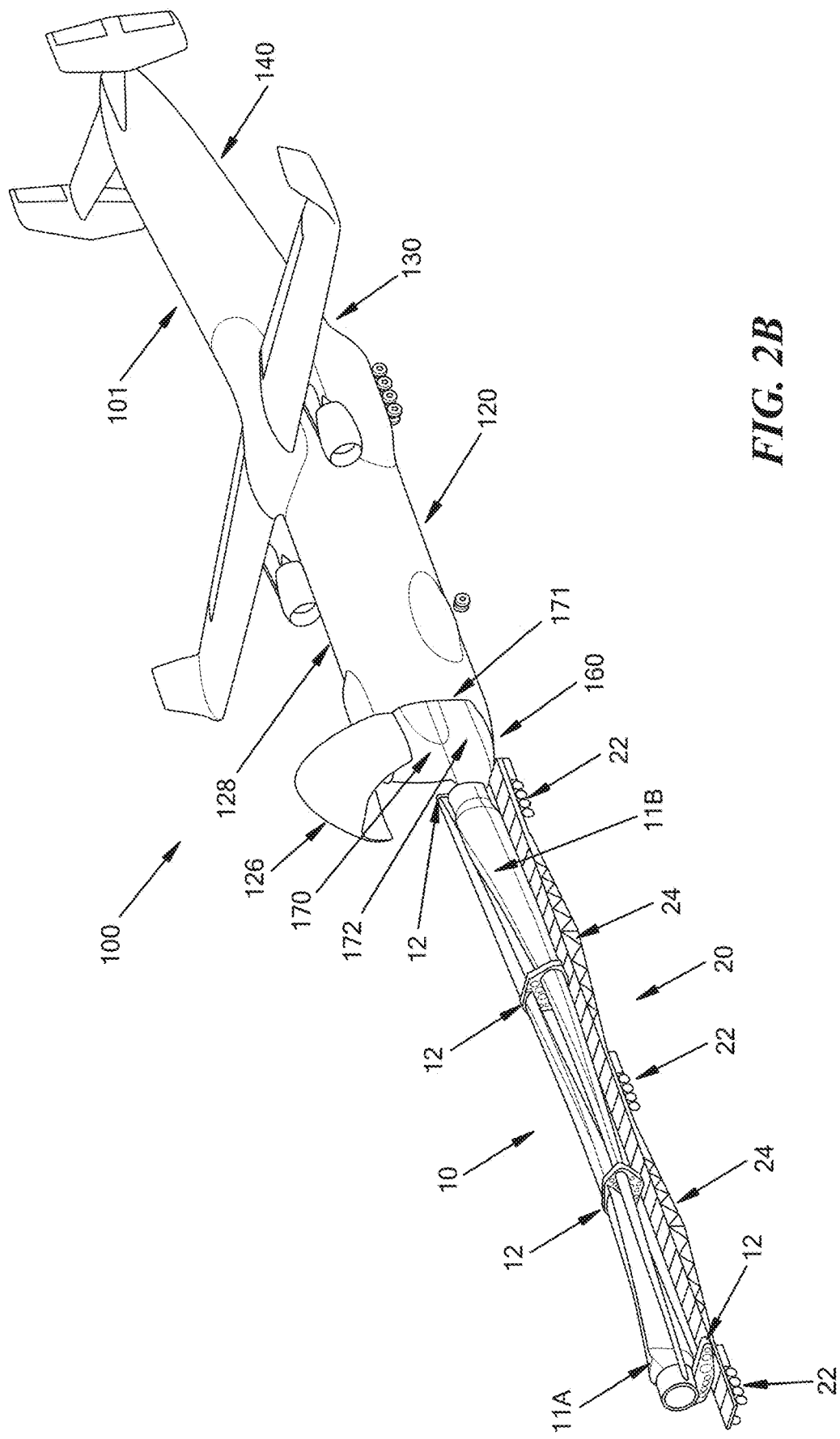
FIG. 2B is an isometric view of the aircraft of FIG. 2A with a payload being disposed proximate to the aircraft for loading into the interior cargo bay.
Figure 2C:
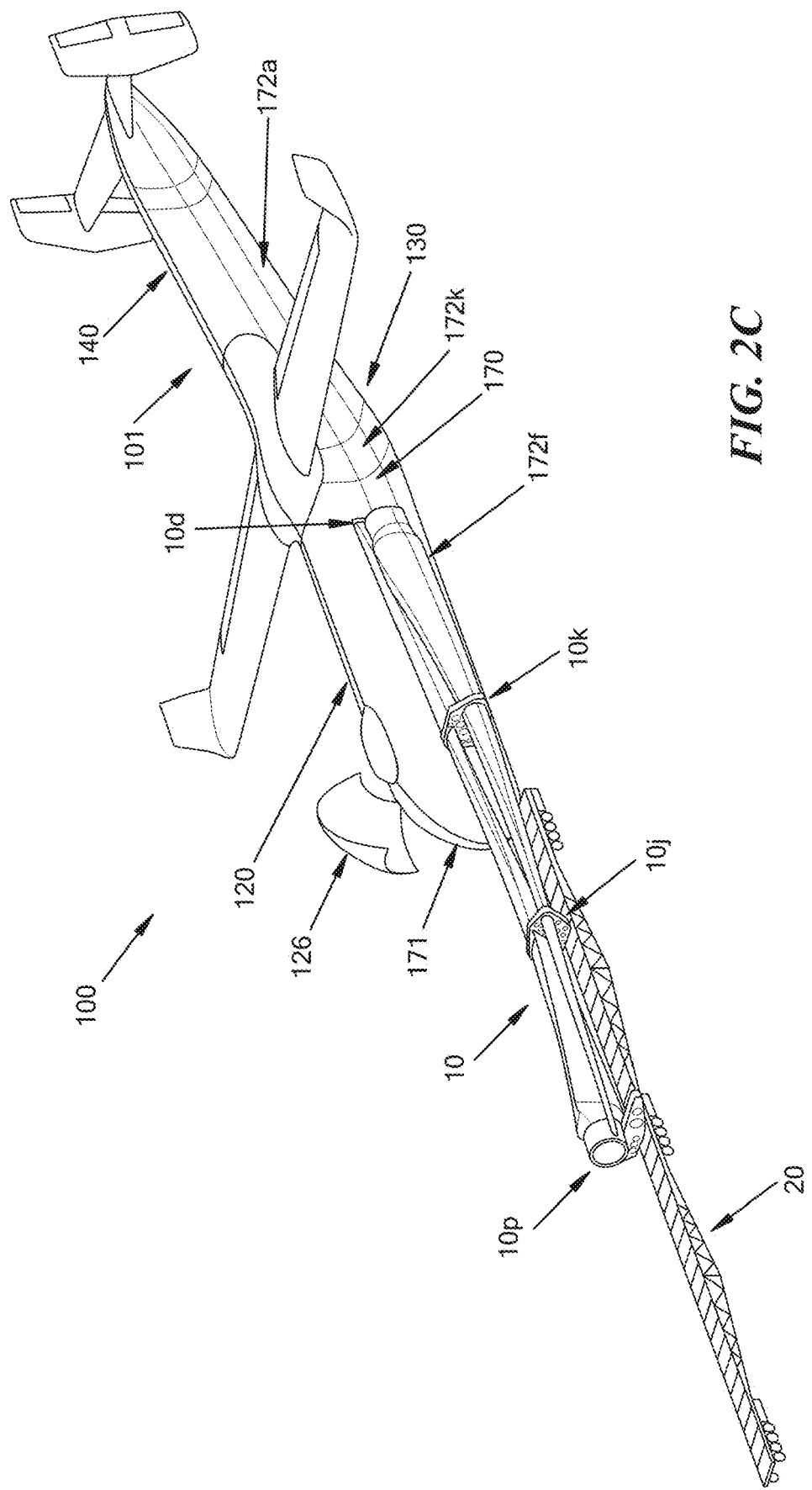
FIG. 2C is an isometric, partial cross-sectional view of the aircraft of FIG. 2B with the payload being partially loaded into the interior cargo bay.
Figure 2D:
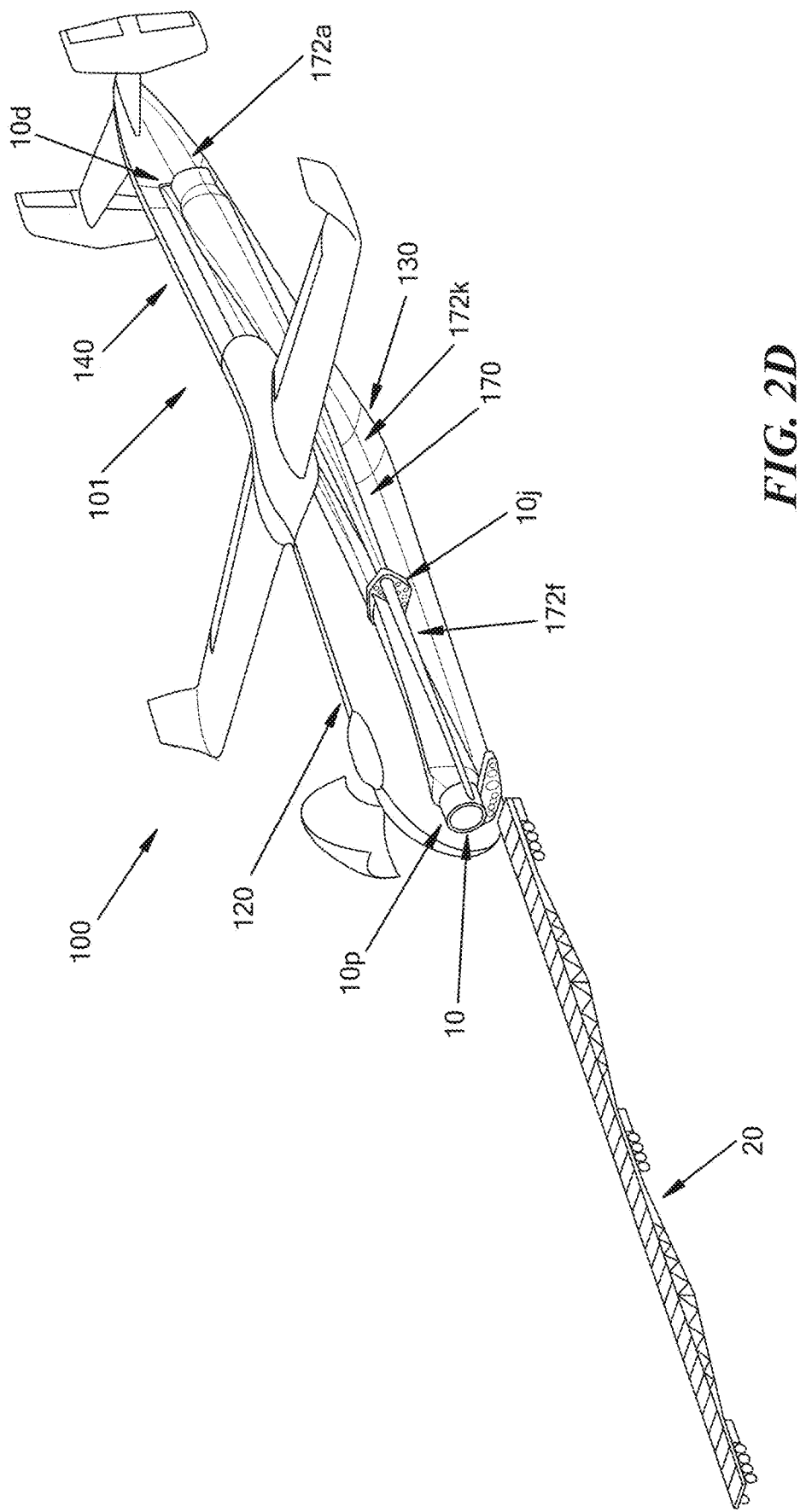
FIG. 2D is an isometric, partial cross-sectional view of the aircraft of FIG. 2C with the payload being fully loaded into the interior cargo bay.

FIGS. 2B-2D provide for a general, simplified illustration of one exemplary embodiment of loading a large payload 10 into the aircraft 100. As shown, the cargo nose door 126 is swung upwards into its open position, exposing the portion of the interior cargo bay 170 associated with the fixed portion 128 of the fuselage 101, which can extend through the kinked portion 130 and through essentially the entirety of the aft end 140. The cargo opening 171 provides access to the interior cargo bay 170, and the cantilevered tongue 160 can be used to help initially receive the payload. As shown, the payload 10 includes two wind turbine blades 11A, 11B, held with respect to each other by payload-receiving fixtures 12. The payload-receiving fixtures 12 are generally considered part of the payload, although in an alternative interpretation, the payload 10 can just be configured to be the blades 11A, 11B. This payload 10 can be considered irregular in that the shape, size, and weight distribution across the length of the payload is complex, causing a center of gravity of the payload to be at a separate location than a geometric centroid of the payload. One dimension (length) greatly exceeds the others (width and height), the shape varies with complex curvature nearly everywhere, and the relative fragility of the payload requires a minimum clearance be maintained at all times as well as fixturing support the length of the cargo at several locations even under the payload's own weight under gravity. Additional irregular payload criteria can include objects with profiles normal to a lengthwise axis rotate at different stations along that axis, resulting in a lengthwise twist (e.g., wind turbine blade spanwise twist) or profiles are located along a curved (rather than linear) path (e.g., wind turbine blade in-plane sweep). Additionally, irregular payloads include objects where a width, depth, or height vary non-monotonically along the length of the payload (e.g., wind turbine blade thickness can be maximal at the max chord station, potentially tapering to a smaller cylinder at the hub and to a thin tip). The term irregular package will be similarly understood.

The payload 10, which can also be referred to as a package, particularly when multiple objects (e.g., more than one blade, a blade(s) and ballast(s)) are involved, possibly secured together and manipulated as a single unit, can be delivered to the aircraft 100 using most any suitable devices, systems, vehicles, or methods for transporting a large payload on the ground. A package can involve a single object though. In the illustrated embodiment, a transport vehicle 20 includes a plurality of wheeled mobile transporters 22 linked together by a plurality of spans, as shown trusses 24. In some instances, one or more of the wheeled mobile transporters 22 can be self-propelled, or the transport vehicle 20 more generally can be powered by itself in some fashion. Alternatively, or additionally, an outside mechanism can be used to move the vehicle 20, such as a large vehicle to push or pull the vehicle 20, or various mechanical systems that can be used to move large payloads, such as various combinations of winches, pulleys, cables, cranes, and/or power drive units.

As shown in FIG. 2B, the transport vehicle 20 can be driven or otherwise moved to the forward end 120 of the aircraft 100, proximate to the cargo opening 171. Subsequently, the payload 10 can begin to be moved from the transport vehicle 20 and into the interior cargo bay 170. This can likewise be done using various combinations of one or more winches, pulleys, cables, cranes, and/or power drive units, such set-ups and configurations being known to those skilled in the art. FIG. 2C illustrates a snapshot of the loading process with half of the fuselage removed for illustrative purposes (as currently shown, the half of the nose cone 126 illustrated is in both an open and closed position, but during loading through the cargo opening 171, it is in an open position). As shown, the payload 10 is partially disposed in the interior cargo bay 170 and is partially still supported by the transport vehicle 20. A distal end 10*d* of the payload 10 is still disposed in the forward end 120, as it has not yet reached the kinked portion 130.

The system and/or methods used to move the payload 10 into the partially loaded position illustrated in FIG. 2C can continue to be employed to move the payload 10 into the fully loaded position illustrated in FIG. 2D. As shown, the distal end 10*d* of the payload 10*d* is disposed in the interior cargo bay 170 at the aft end 140, a proximal end 10*p* of the payload 10 is disposed in the interior cargo bay 170 at the forward end 120 (for example, on the cantilevered tongue 160, although the tongue is not easily visible in FIG. 2D), and the intermediate portion of the payload 10 disposed between the proximal and distal ends 10*p*, 10*d* extends from the forward end 120, through the kinked portion 130, and into the aft end 140. As shown, the only contact points with a floor of the interior cargo bay 170 (which for these purposes includes the tongue 160) are at the proximal and distal ends 10*p*, 10*d* of the payload 10 and at two intermediate points 10*j*, 10*k* between the proximal and distal ends 10*p*, 10*d*, each of which is supported by a corresponding fixture 12. In other embodiments, there may be fewer or more contact points, depending, at least in part, on the size and shape of each of the payload and related packaging, the size and shape of the cargo bay, the number of payload-receiving fixture used, and other factors. This illustrated configuration of the payload disposed in the interior cargo bay 170 is more clearly understood by discussing the configuration of the kinked fuselage (i.e., the fuselage 101 including the kinked portion 130) in greater detail. Once the payload 10 is fully disposed in the interior cargo bay 170, it can be secured within the cargo bay 170 using techniques provided for herein, in counterpart applications, or otherwise known to those skilled in the art.

Figure 3A:
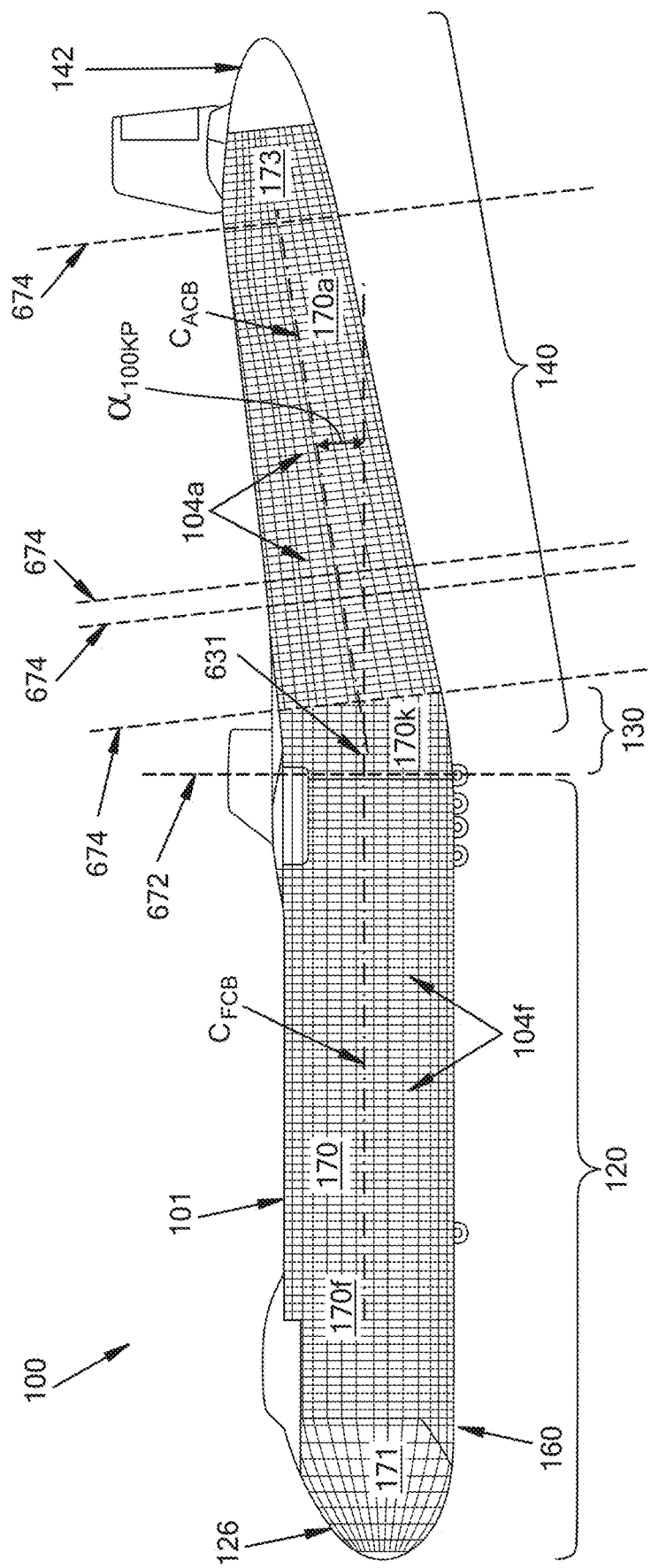
FIG. 3A is a side cross-sectional view of the aircraft of FIG. 1A, including an interior cargo bay of the aircraft.

FIG. 3A is side cross-section view of the cargo aircraft 100, the cross-section being taken along an approximate midline T-T of the top-most outer surface, as shown in FIG. 1A. The cargo bay 170 defines a centerline that extends along the overall length of the cargo bay 170. The cargo bay 170 extends from a forward end 171 of a forward end or region 170f of the cargo bay 170, as shown located in the nose cone 126, to an aft end 173 of an aft end or region 170a of the cargo bay 170, as shown located in the fuselage tail cone 142. The forward and aft regions 170f, 170a of the cargo bay 170 sit within the forward and aft ends 120, 140, respectively, of the aircraft 100. More particularly, the forward region 170f can generally define a forward cargo centerline $C_{FCB}$ that can be substantially colinear or parallel to the forward fuselage centerline $C_F$ (shown in FIG. 4) and the aft region 170a can generally define an aft cargo centerline $C_{ACB}$ that can be substantially colinear or parallel to the aft fuselage centerline $C_A$ (shown in FIG. 4). Accordingly, in the kinked portion 130 of the fuselage 101, which itself can include a comparable kinked portion 170k of the cargo bay 170, where the aft fuselage centerline $C_A$ bends with respect to the forward fuselage centerline $C_F$, the aft cargo centerline $C_{ACB}$ also bends at a kink location 631 with respect to the forward cargo centerline $C_{FCB}$. The bend can be at approximately the same angle, as shown an angle $\alpha_{100KP}$, as the kink angle $\alpha_{100K}$ of the fuselage 101. The aft cargo centerline $C_{ACB}$ can extend at least approximately 25% of a length of a centerline of the continuous interior cargo bay 170, i.e., the length of the centerline throughout the entire cargo bay 170. This amount more generally can be approximately in the range of about 25% to about 50%. There are other ways to describe these dimensional relationships as well, including, by way of non-limiting example, a length of the aft cargo centerline $C_{ACB}$ being at least approximately 45% of the length of the fuselage 101 and/or at least approximately 80% of a length of the fuselage 101 aft of the lateral pitch axis, among other relationships provided for herein or otherwise derivable from the present disclosures.

FIG. 3A shows the aft region 170a of the cargo bay 170 extending through almost all of the aft fuselage 140, which is a distinct advantage of the configurations discussed herein. Moreover, due to the length of the aft fuselage 140, a pitch 674 of structural frames 104a of the aft fuselage 140 can be angled with respect to a pitch 672 of structural frames 104f of the forward fuselage 120 approximately equal to the kink angle $\alpha_{100K}$ of the fuselage 101. In some examples, the kinked region 130 represents an upward transition between the pitch 672 of the structural frames 104f of the forward fuselage 120 and the pitch 674 of the structural frames 104a of the aft fuselage 140. A person skilled in the art will recognize that structural frames 104a, 104f are merely one example of structural features or elements that can be incorporated into the fuselage 101 to provide support. Such elements can be more generally described as circumferentially-disposed structural elements that are oriented orthogonally along the aft centerline $C_{ACB}$ and the forward centerline $C_{FCB}$. In some examples, the location of the cargo bay kink 631 is forward or aft of a fuselage kink such that either the forward cargo region 170f partially extends into the aft fuselage 140 or the aft cargo region 170a partially extends into the forward fuselage 120, however, this generally depends, at least in part, on the distance between the interior of the cargo bay 170 and the exterior of the fuselage, which is typically a small distance for cargo aircraft having a maximally sized cargo bay. Regardless, to fully utilize examples of the present disclosure, the aft region 170a of the cargo bay 170 can be both (1) able to be substantially extended due to the ability of the aft fuselage 140 length to be extended and (2) able to extend along substantially all of the length of the aft fuselage 140 because examples of the present disclosure enable aircraft to have elongated aft fuselages for a fixed tailstrike angle and/or minimized kink angle. Additionally, minimizing the fuselage kink angle for elongated aft fuselages allows the aft region of the cargo bay to extend further along the fuselage while increasing the maximum straight-line payload length for a given overall aircraft length and tailstrike angle, as shown at least in FIG. 3B.

Figure 3B:
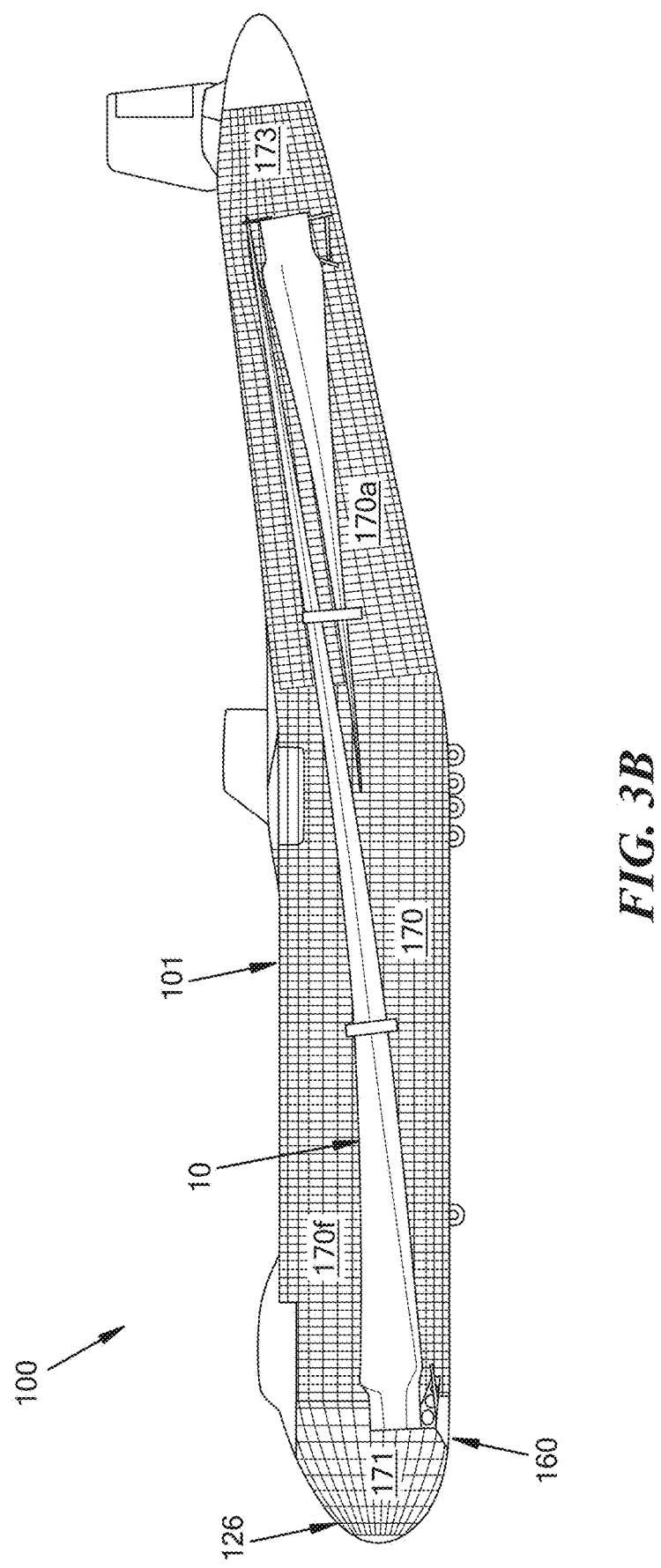
FIG. 3B is the side cross-sectional view of the aircraft of FIG. 1A with an exemplary payload disposed in the interior cargo bay.

FIG. 3B shows a side cross-sectional view of the fuselage 101 of the cargo aircraft 100 of FIG. 1A with a highly elongated payload 10 of two wind turbine blades 11A, 11B disposed substantially throughout the interior cargo bay 170 and extending from the forward end 171 of the forward region 170f to the aft end 173 of the aft region 170a. Having at least a portion of the aft region 170a being linearly connected to (e.g., within line of sight) of at least a portion of the forward region 170f enables the extension of the aft region 170a to result in an extension in the maximum overall length of a rigid payload capable of being carried inside the interior cargo bay 170. Wind turbine blades, however, are often able to be deflected slightly during transport and so examples of the present disclosure are especially suited to their transport as the ability to slightly deflect the payload 10 during transport enables even long maximum payload lengths to be achieved by further extending the aft end 173 of the aft region 170a beyond the line of sight of the forward-most end 171 of the forward region 170f.

Additional details about a kinked fuselage configuration may be provided in International Patent Application No. PCT/US2020/049787, entitled "AIRCRAFT FUSELAGE CONFIGURATIONS FOR AVOIDING TAIL STRIKE WHILE ALLOWING LONG PAYLOADS," and filed Sep. 8, 2020, and the content of which is incorporated by reference herein in its entirety.

Space Reservation Systems and Methods

The present disclosure is related to large, transport-category aircraft capable of moving oversized cargo not traditionally shippable by air (and potentially, among other uses, future cargo that is not shippable at higher levels of assembly by any current means). The present disclosure describes a process to determine a final space reservation for a new cargo vehicle based upon, at least in some embodiments, defining parametric definitions of potential desired payloads, accounting for and applying a variety of margins on each potential desired payload, and then determining the union of all potential desired payloads. The context of the space reservation systems and methods disclosed herein are framed using the example of wind turbine blades transported by a fixed-wing aircraft, however, the present disclosure is equally applicable to designing vehicles or other objects to carry any type of new or uncertain cargo.

Figure 4:
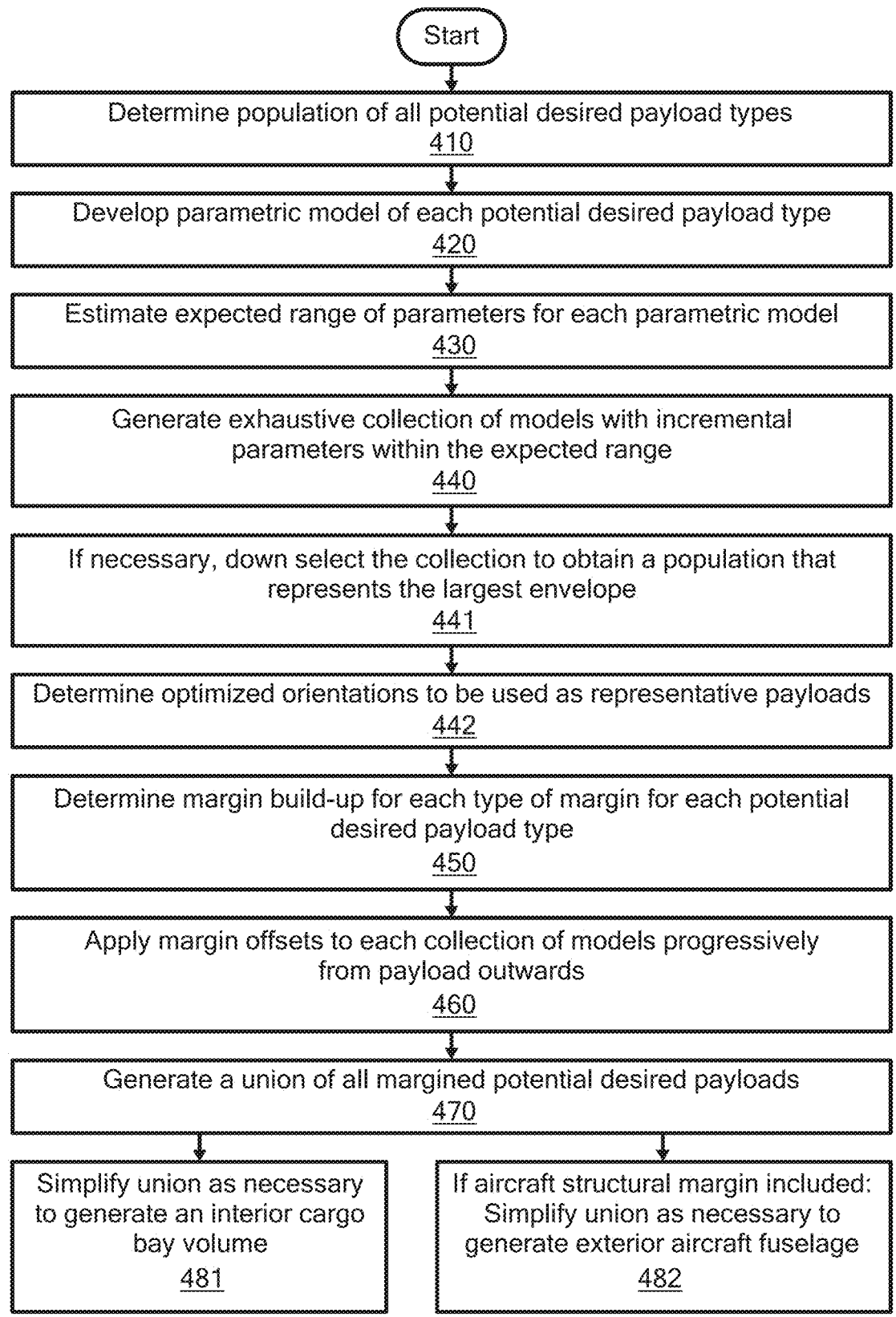
FIG. 4 is a flow chart of one exemplary process of calculating a space reservation.

As discussed above, the space set aside to carry a cargo or payload is called a space reservation. Determining a space reservation for all combinations of sizes and shapes of desired payloads and cargos as a starting point for vehicle design is a nontrivial process. The flowchart of FIG. 4 illustrates a new approach for easing this process. It involves a unique way of determining a required final homogenous space reservation for all potential desired payloads or cargos for a new vehicle including a variety of margins. The process starts with one or more representative payload objects (e.g., representing an entire range of sizes and shapes of one or more classes of objects, a known group of objects, or just a single object) and takes into account a variety of parameters, discussed in more detail herein, to generate a final keep-out zone (e.g., a space reservation) for use in sizing an aircraft or vehicle for loading, unloading, and transporting all of the potential desired payloads.

The process can begin at step 410 by determining the population of all potential desired payload types, for example wind turbine blades between 70 meters and 110 meters in length. Next, if shapes and sizes of the population are not all known (e.g., to account for future designs) at step 420, a parametric model for the desired payload types can be developed, and then, at step 430, ranges for each geometric parameter of the parametric model can be estimated based on known information (e.g., expected trends) to, at step 440, generate a population of representative payload objects suitable for use in designing an aircraft or vehicle to carry all of the potential real payload objects (and, if desired, combinations thereof) represented by the population.

For example, if a design objective is a vehicle to carry all single unit wind turbine blades up to 90 meters in length, a parametric model of wind turbine blades is then developed and ranges for the various parameters are estimated for blades up to 90 meters, from which a population of representative payload objects (e.g., a group of 85 meter and 90 meter blades) can be generated. Each payload object of the plurality can have some maximum or minimum dimension such that if a vehicle is be sized to carry all of the population of representative payload objects, it is anticipated that the vehicle can be used to transport any current or future wind turbine blade that is 90 meters in length or shorter. Additionally, as an optional step, payloads that include multiple objects of the population of individual payload objects can be considered as well. Additionally, when sizing for payloads that include two or more payload objects, an additional step of determining optimized arrangements of two or more payload objects can also be used to find optimized orientations to be used in the sizing along with any individual payload objects of the plurality. To continue the example, this would be sizing a vehicle for all individual wind turbine blades under 90 meters as well as optimized combination of two wind turbine blades under 80 meters, or some other value less than 90 meters.

With a population of representative payloads, a down-selections step 441 can be conducted to reduce the population to a only those payloads that represent some outer bound of a geometric volume containing all of the payloads (e.g., only those that would substantively change the result design of a cargo volume configured to carry the population. Additionally, an optimization step 442 can be used to determine an optimal orientation of each of the payloads to, for example, allow an optimized overlapping of each payload to be used when making a union of all the payloads and to reduce any space that may be wasted when groups of two or more payload objects are being considered as representative payloads (e.g., two or more payload objects whose geometries present a non-trivial problem of determining their optimal respective orientations for being carried in an efficiently-sized cargo volume). Both of the steps 441, 442 can be performed in a variety of manners, including but not limited to those disclosed herein or otherwise derivable from the present disclosures, without departing from the spirit of the present disclosure.

Next a plurality of margins can be calculated at step 450 to account for a plurality of different tolerances and clearances required, such as due to the manufacture of the payloads or vehicle or the expected deformations of the payloads due to flight loads. Additionally, loading and unloading paths for the payloads can be considered by sweeping each payload through an unloading and unloading path to generate a swept volume before adding the plurality of margins at step 460. With each payload volume or swept payload volume being margined, a union of all margined payloads is generated at step 470. If the margins added were configured to only account for the payload and any interior constraints of a cargo bay, the union can be simplified and used for sizing an interior cargo bay volume at step 481. Alternatively, additional margins can be applied to account for various structural aspects of the vehicle such that the union can be simplified and used for generating an entire exterior vehicle section, such as an external skin of a fuselage section of an aircraft containing a cargo bay configured to carry the entire population of representative payloads.

Figure 5A:
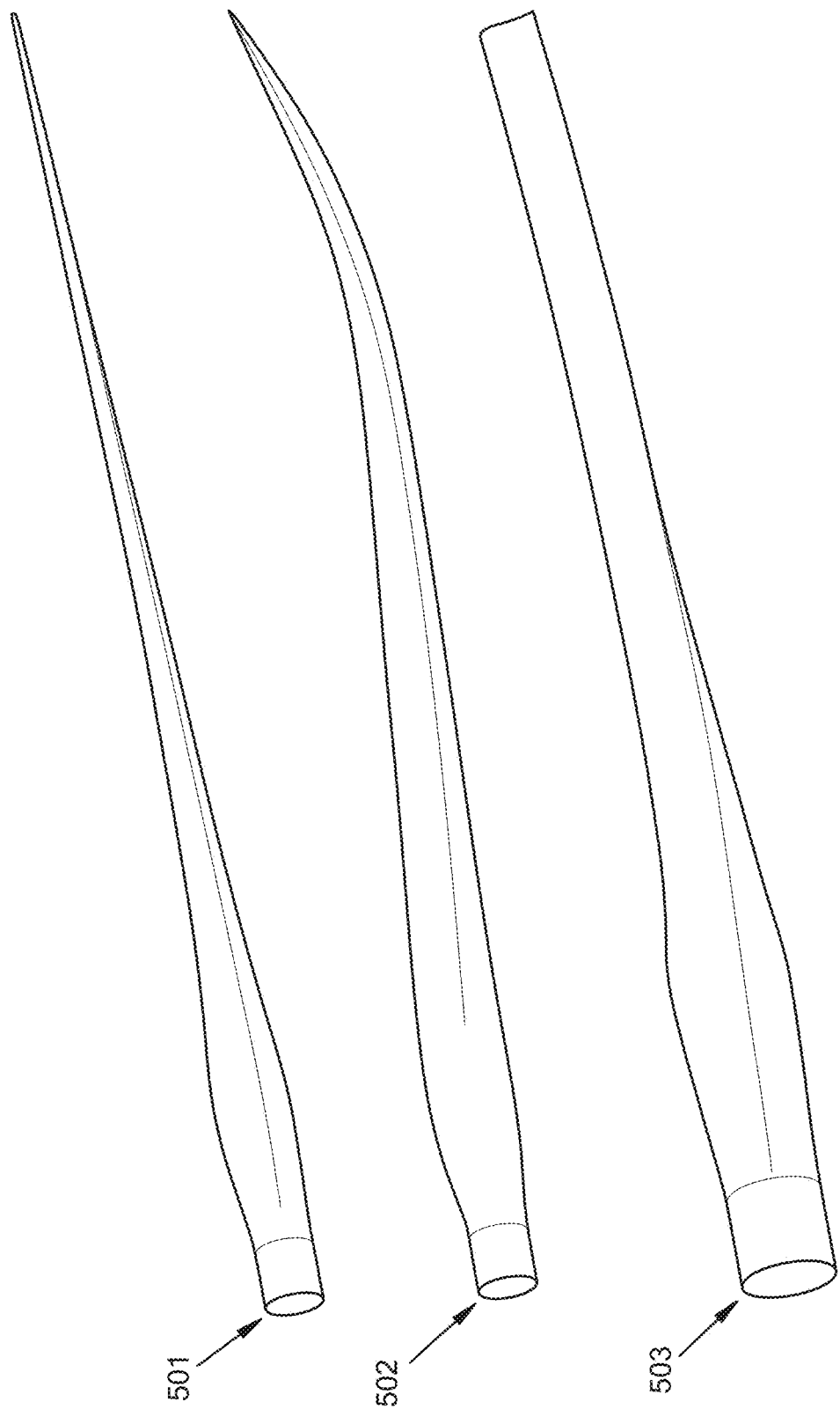
FIGS. 5A and 5B are views of a population of representative cargo payloads.
Figure 5B:
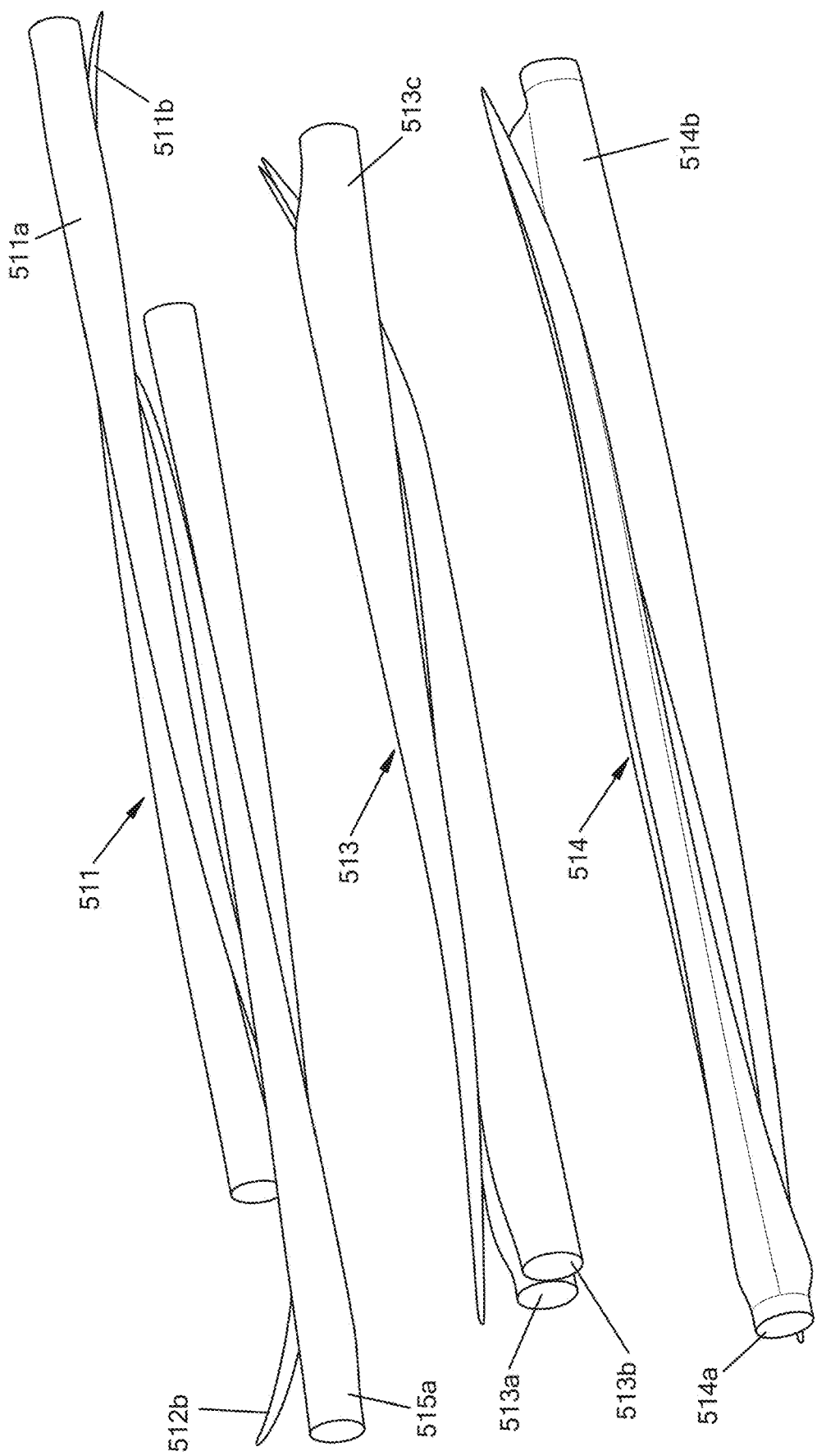
Figure 5C:
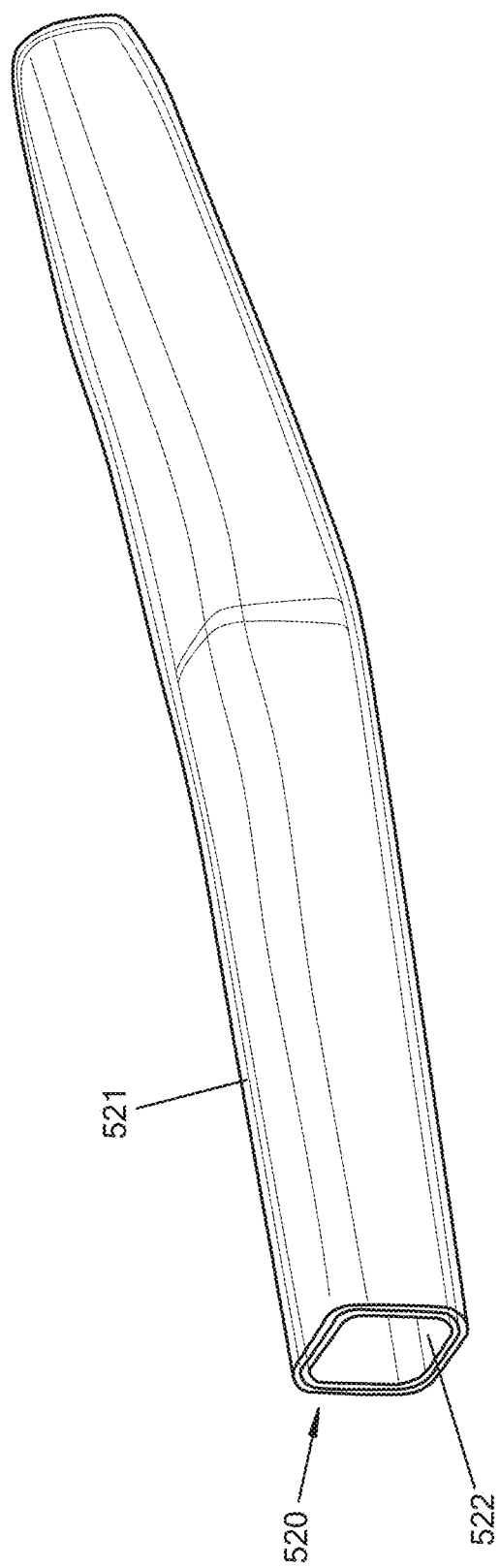
FIG. 5C is a calculated space reservation based on the payloads of FIGS. 5A and 5B.

FIGS. 5A and 5B illustrate a population of representative cargo payloads and FIG. 5C illustrates a calculated space reservation based on the representative cargo payloads. In FIG. 5A, the representative payloads include differently sized and shaped individual wind turbine blades 501, 502, 503, while in FIG. 5B there are three different payload arrangements 511, 513, 514 of multiple wind turbine blades. More particularly, the illustrated first payload arrangement 511 includes a first pair of wind turbine blades 511a,b in an optimized orientation combined with a second pair of wind turbine blades 511a,b in a similar optimized orientation with the pairs being arranged in an optimized orientation as a single payload 511. Similarly, a second payload arrangement 513 includes three wind turbine blades 513a-c arranged together and a third payload arrangement 514 includes two wind turbine blades 514a,b arranged together. With regards to wind turbine sizes, FIG. 5A shows a straight single 90-meter wind turbine blade 501, a 90-meter wind turbine blade 502 with a maximum pre-bend sweep angle, and a single 100-meter segmented wind turbine blade 503. Meanwhile, FIG. 5B shows the first payload arrangement 511 including four 65-meter packaged wind turbine blades, the second payload arrangement 513 including three 70-meter packaged wind turbine blades, and the third payload arrangement 514 including two 85-meter packaged wind turbine blades.

In FIG. 5C, a space reservation 520 includes an inner surface 522 (e.g., an initial keep-out zone) defined by the maximum extent of any portion occupied by any of the representative cargo payloads and an outer portion 521 (e.g., a final keep-out zone) defined by one or more margins applied to the inner surface 522 to represent the minimum inner dimensions of a cargo bay configured to carry the representative cargo payloads.

Example Parametric Payload Model: Wind Turbine Blades

Figure 6A:
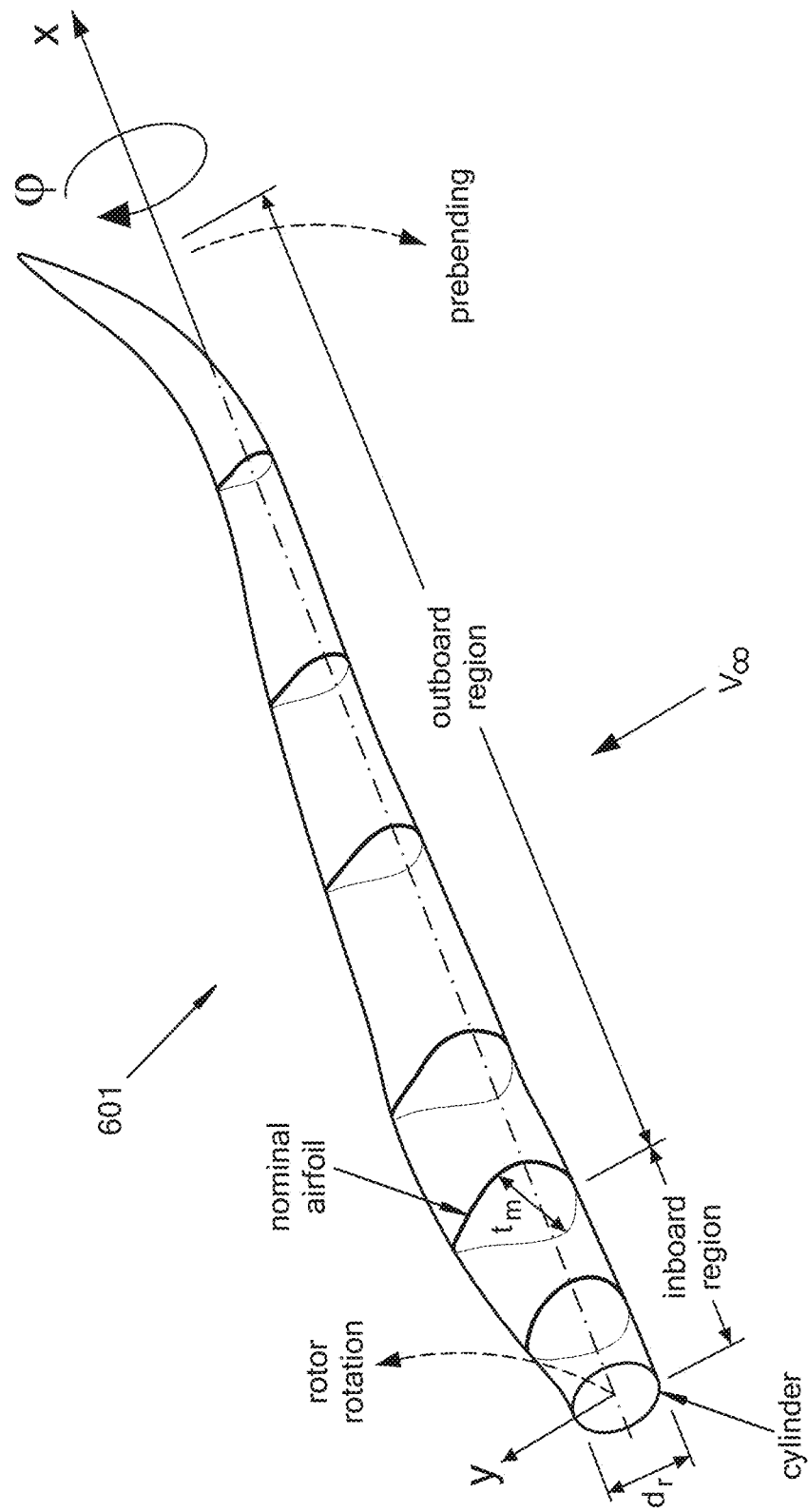
FIG. 6A is an isometric, transparent view of a parametric model of a wind turbine blade.
Figure 6B:
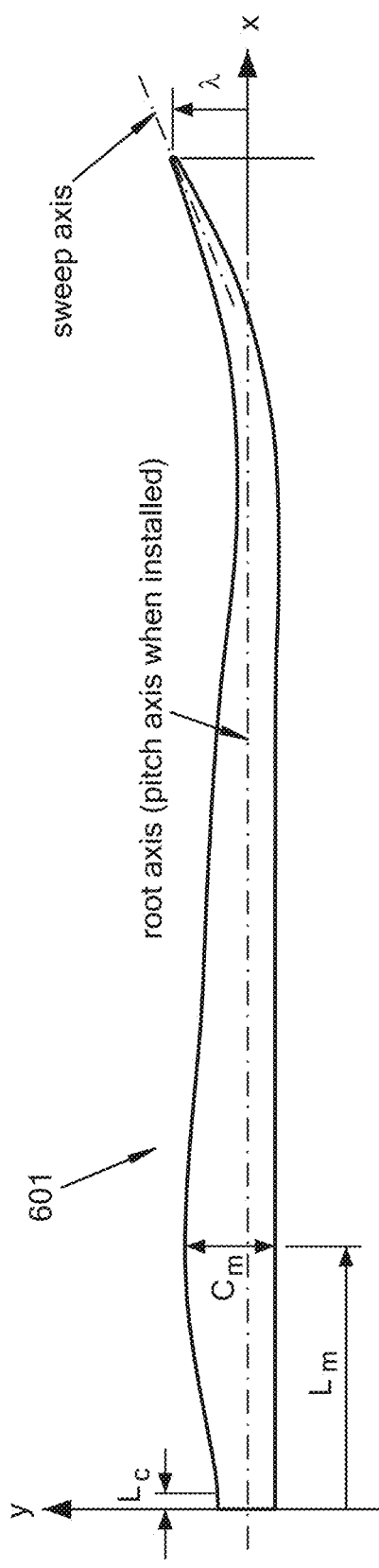
FIG. 6B is a side view of the parametric model of the wind turbine blade of FIG. 6A.
Figure 6C:
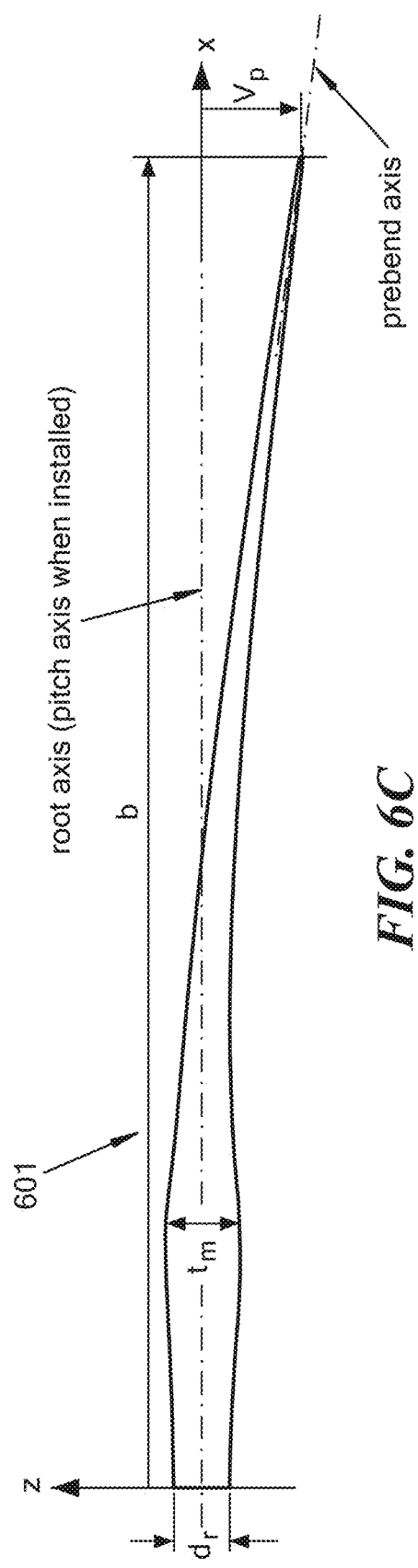
FIG. 6C is a top view of the parametric model of the wind turbine blade of FIG. 6A.

FIGS. 6A-6C are illustration of a parametric model of a wind turbine blade used to generate the representative payloads of FIGS. 5A and 5B. In this example parametric model of a desired potential payload, the generic wind turbine blade is parameterized by $C_m$, Lc, $L_m$, $t_m$, b, $v_p$, $\lambda$, and $\varphi$ as either constants or single-term polynomials, as explained in more detail below. Parametric models of a wind turbine blade allow an exhaustive family of turbine blades to be developed from a range of parameters.

Modern wind turbine blades have common features across the industry (even if details of those features vary across operating environments and manufacturer). Those common features include: (1) a cylindrical cross-section at the blade root location, and (2) a transition from cylindrical cross-section to airfoil shape moving away from the blade root location along span.

Additionally, as wind turbine blades have become more efficient at generating power via lift while reducing mass, the loads have increased and consequently deflection along the wind axial direction has increased. Just as in airplane wings, aeroelastic deflection leads to a reduction in aerodynamic efficiency of the lifting surface. To counteract this shortcoming, blade designers have introduced pre-bend, which leads to the deformed shape of the blade to deviate less severely from the desired shape compared to a blade without pre-bend. Additional means of aeroelastic tailoring include twist of the airfoil along the span and sweep (often referred to as pre-sweep). To this end, the parametric blade definition includes these bulk parameters.

The isometric view of the parameterized airfoil definition is shown in FIG. 6A. The inboard region begins at the root and includes the spanwise coordinates up to the maximum chord spanwise coordinate $L_m$. The outboard region begins at the maximum chord spanwise coordinate and includes the remainder of the blade to the tip. The twist, denoted as $\varphi$, uses positive (right-hand) rotation about the x axis. Rotor rotation is defined as counterclockwise for the blade trailing edge parallel to the y-axis (blade coming out of the page). Consequently, pre-bend would be into the opposite of rotor rotation, and the freestream wind falls parallel to the y-axis.

The top-view of the parametric blade model is shown in FIG. 6B. The airfoil at the maximum chord coordinate is at zero angle of attack with respect to the XY plane (i.e., the trailing edge of the airfoil at maximum chord is at z=0). The root axis of the blade is concentric with the cylinder axis and orthogonal to its base on the YZ-plane, and the pre-bend and pre-sweep are measured with respect to it. The blade span, b, is also measured with respect to the root axis. The pre-sweep and pre-bend are denoted by the symbols $\lambda$ and $v_p$, respectively. The root diameter of the blade is $d_r$ and is purely cylindrical for a distance of $L_c$ until a transition to the maximum chord airfoil, $C_m$, which is a location a spanwise distance $L_m$ from the root.

Using the parametric model of FIG. 6A-C and estimates for the ranges of each parameters for representative payload sizes, a distribution of individual payload shapes can be generated and down-selected as necessary to produce a representative population of payload objects.

Generating a Space Reservation

Once a representation population of payload objects is generated, groups of multiple objects comprising a single payload must be packaged together, and then all single payloads must be positioned similarly in space. Then, a number of different steps can be undertaken in different orders to generate a homogenous volume from a plurality of individual volumes, and these steps can occur in different orders: (1) taking a union of all volumes, (2) sweeping either the union through a generalized loading and unloading path or each the individual payload volume through a generalized loading and unloading path or a unique path for each payload, and (3) adding a plurality of margins to the union or to each individual payload volume. Notably, before any of these three steps are undertaken, it may be useful to further down-select the population of representative payloads in order to reduce the computational difficulty of generating the union.

Figure 7A:
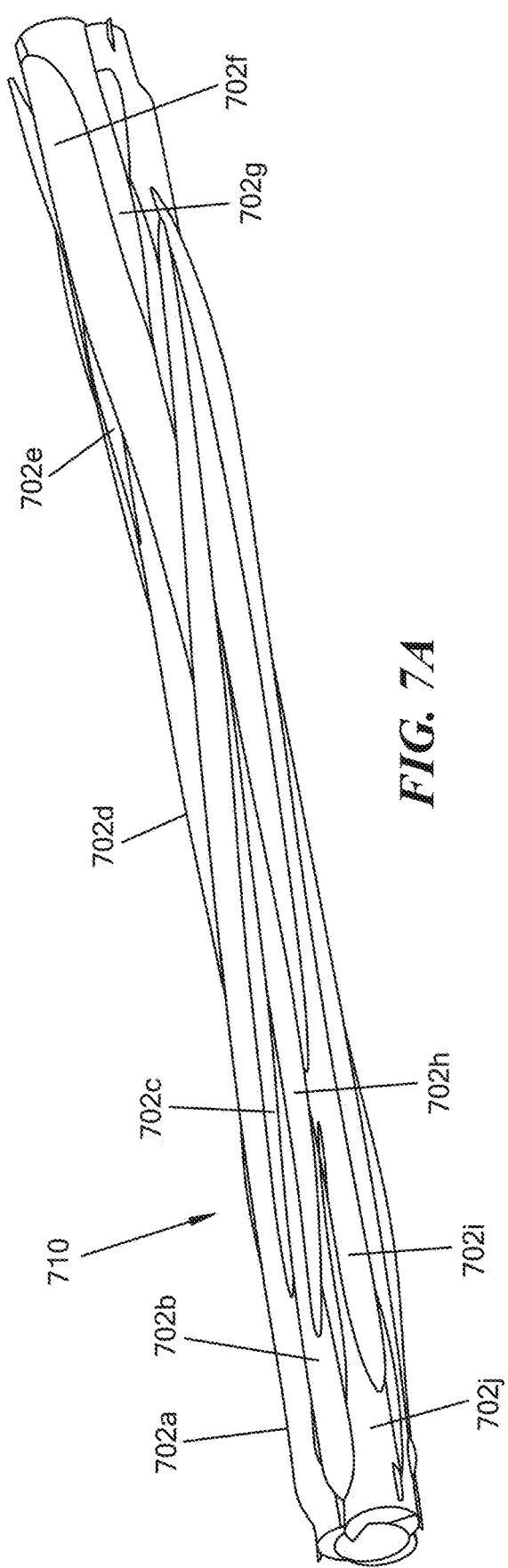
FIG. 7A is an isometric view of a plurality of overlapping representative cargo payloads.
Figure 7B:
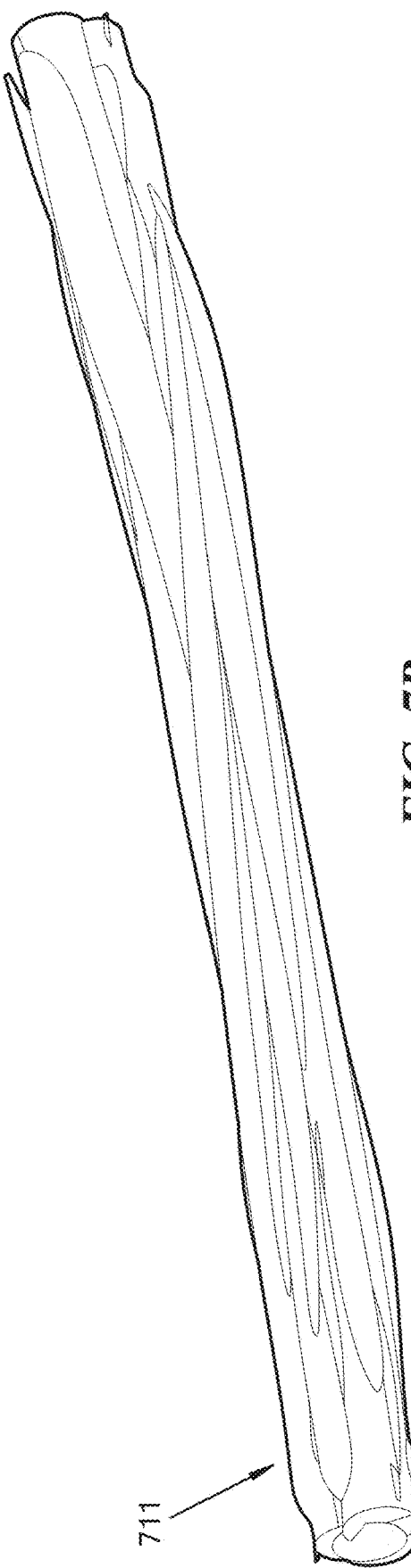
FIG. 7B is an isometric view of a union of the plurality of overlapping representative cargo payloads of FIG. 7A.
Figure 7C:
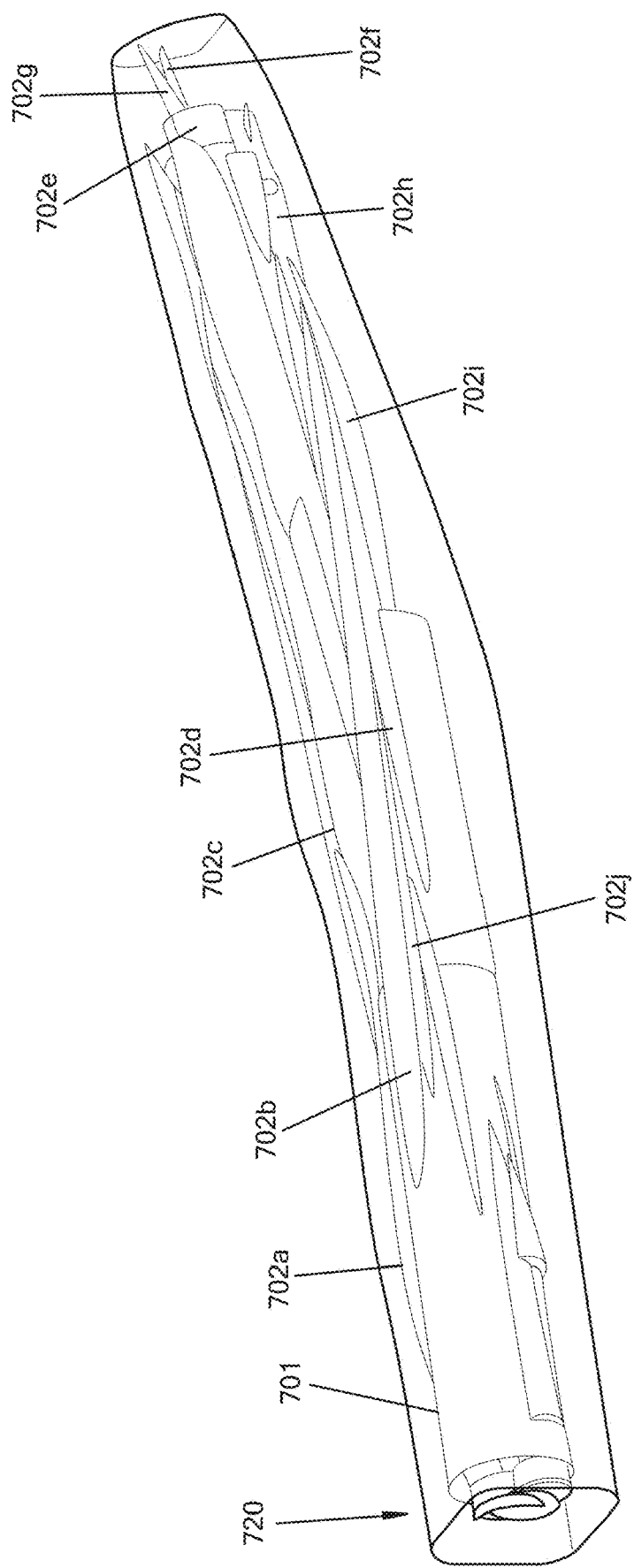
FIG. 7C is an isometric, semi-transparent view of a union of a plurality of representative cargo payloads inside of a cargo bay sized according to a space reservation calculated using the plurality of representative cargo payloads.

The first step (1) involves overlaying a plurality of volumes, margined or unmargined and swept or unwept, and generating a homogenous volume with an outer surface formed by the outermost extent of each payload volume that does not reside inside any other volume. FIG. 7A is an isometric view of a plurality of overlapping representative cargo payloads, which are shown here as plurality of single wind turbine blades 702a-j. The arrangement of FIG. 7A can be generated, for example, by determining an optimal orientation of each payload object with respect to a hypothetical centerline of a cargo bay to, for example, overlap each wind turbine blade 702a-j such that the combination represents a 3D volume containing each wind turbine blades 702a-j in a respective optimal arrangement. In other examples, groupings of payload objects can be included (e.g., two or more wind turbine blades), where, in each grouping the individual payload objects are arranged in an optimal orientation with respect to each other and, together, the group can be orientated in an optimal position with respect to a hypothetical cargo centerline to be included in a representative group of payloads. Orientating each payload or payload group in the plurality to a respective centerline enables, for example, aligning the centerline of each payload to form the group. FIG. 7B is an isometric view of a union of the plurality of overlapping representative cargo payloads of FIG. 7A. In FIG. 7B, the non-overlapping outer volumetric extent of each of the plurality of wind turbine blades 702a-j has been used to form a closed 3D geometric volume containing all the wind turbine blades 702a-j. This volume can be used as an initial keep-out volume though, in some examples, this geometry can be further smoothed to generate a less convoluted shape for use in further steps. FIG. 7C shows an example homogenous union comprised of the plurality of wind turbine blades 702a-j and a wind turbine tower section 701 overlaid with respect to the wind turbine blades 702a-j. FIG. 7C also shows the resultant space reservation volume 720 that is generated after all three steps are conducted.

Figure 8A:
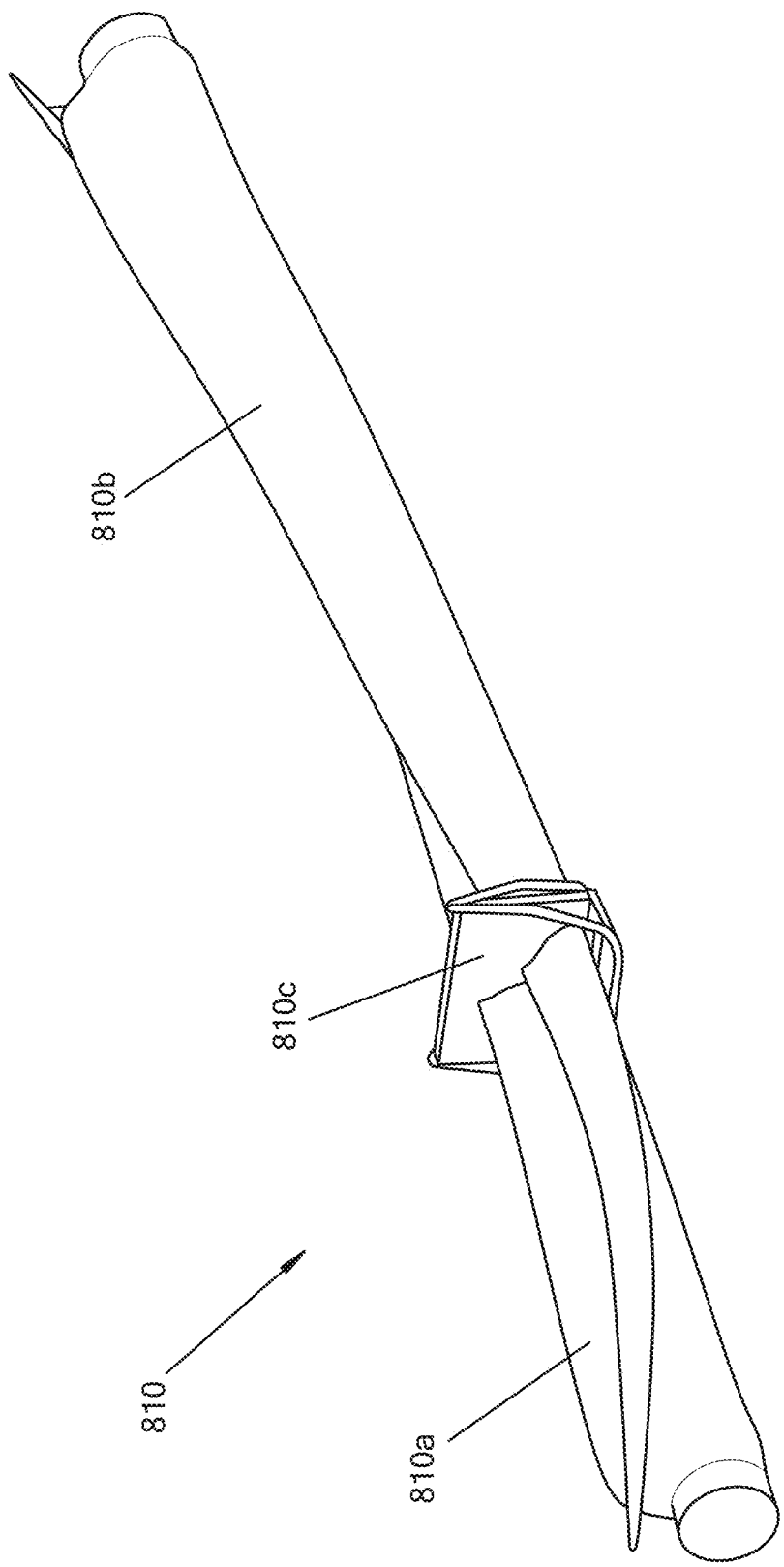
FIG. 8A is an isometric view of one exemplary representative payload and fixture.
Figure 8B:
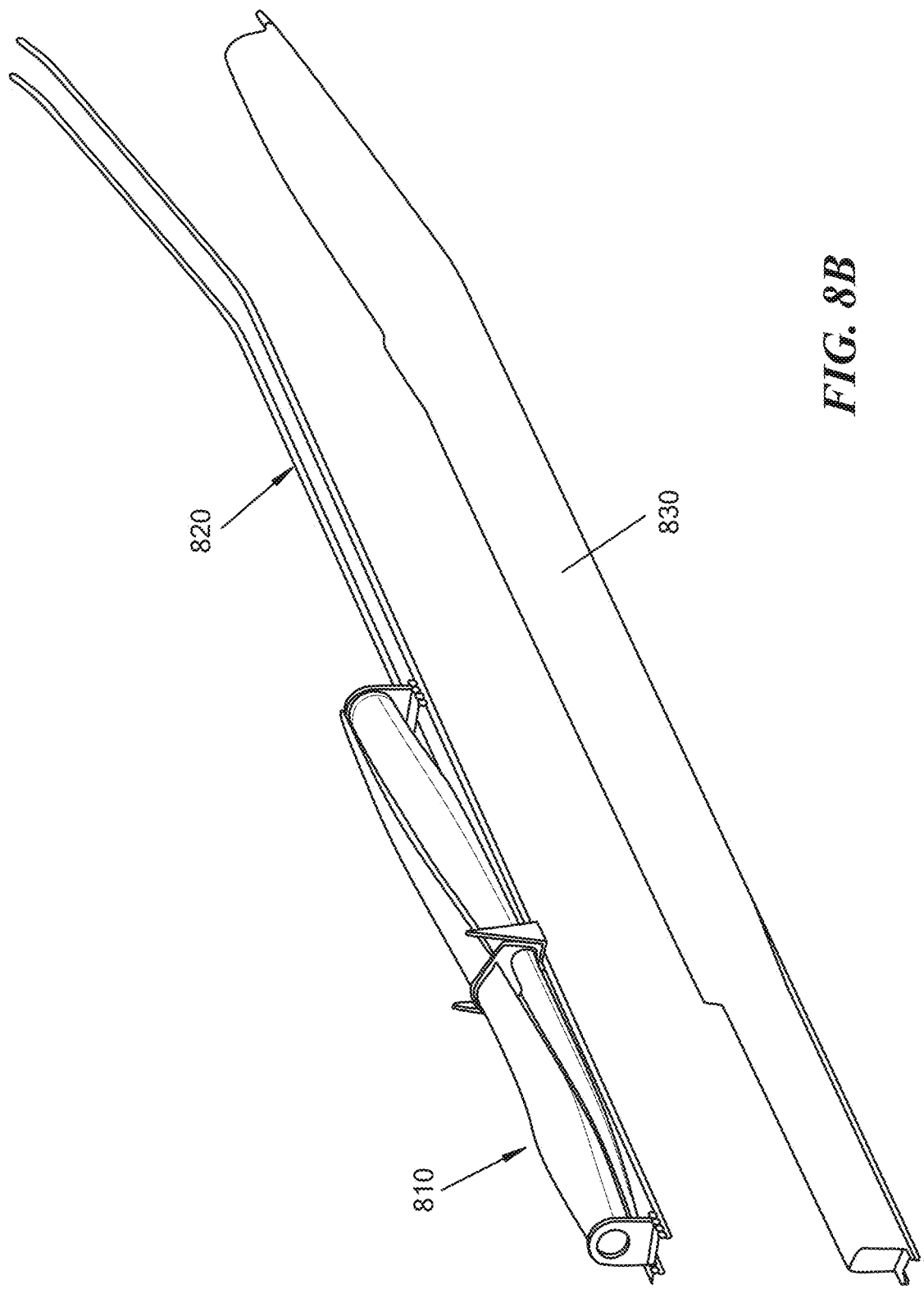
FIG. 8B is an isometric view of a schematic illustration of a swept volume generated by moving the representative payload and fixture of FIG. 8A through a loading and/or unloading operation.
Figure 8C:
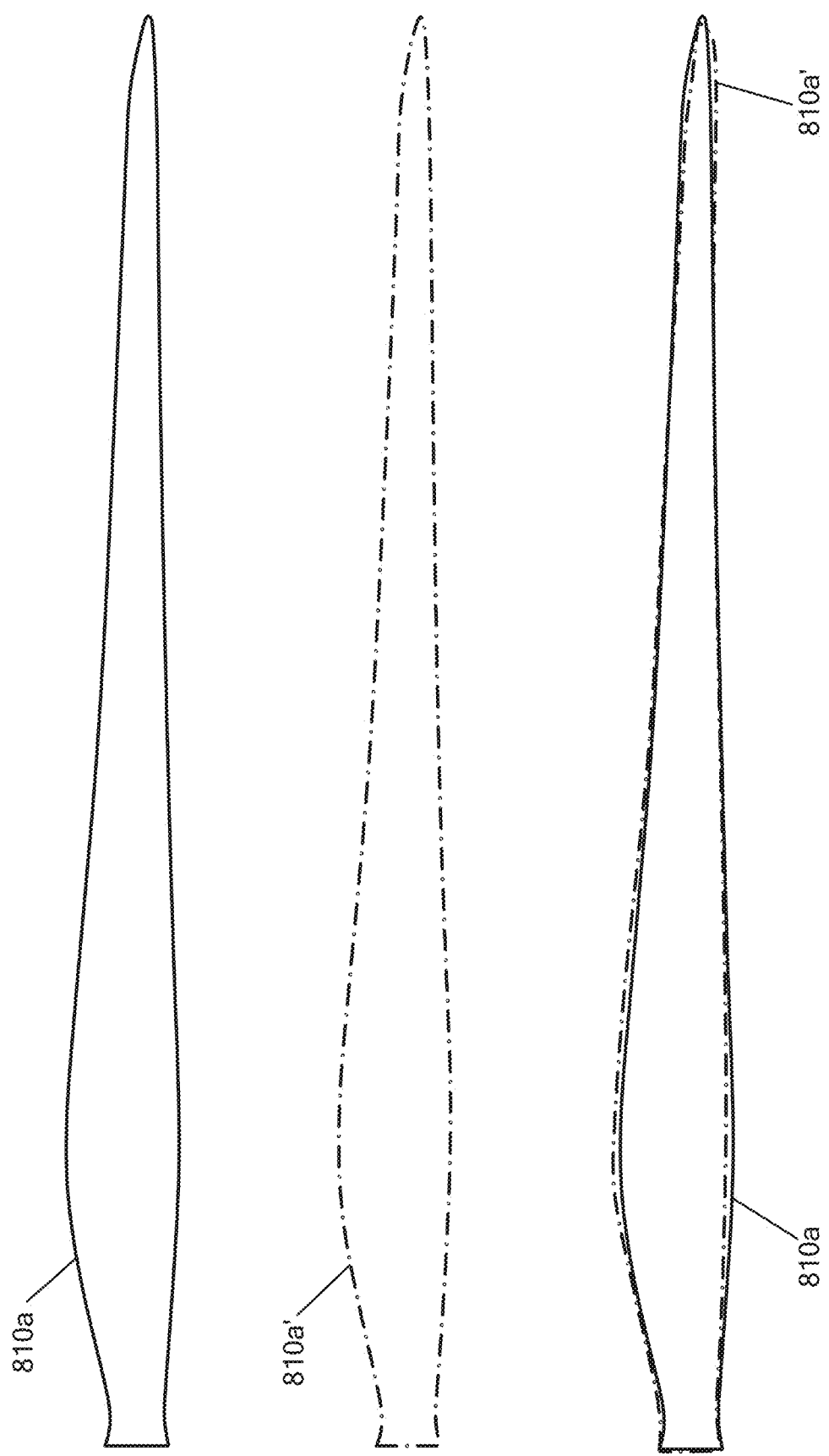
FIG. 8C is an illustration showing sides views of an exaggerated difference between a designed payload shape and an as-built payload shape.
Figure 8D:
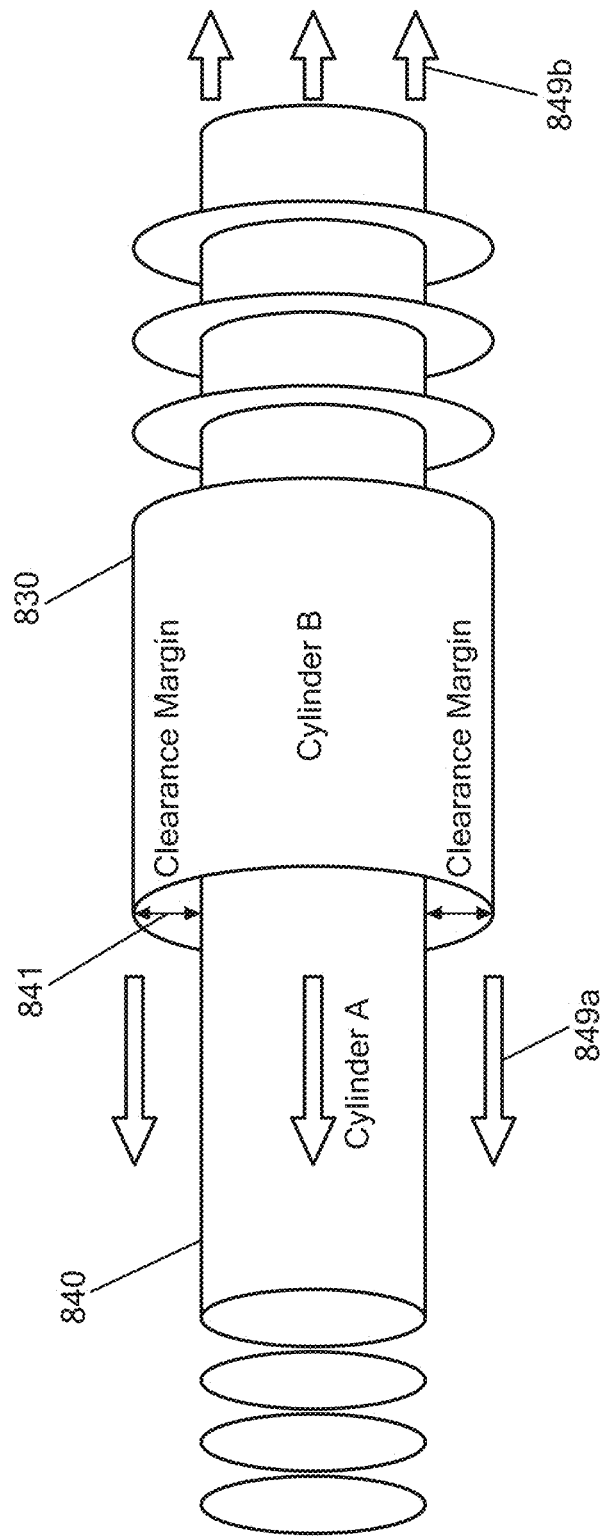
FIG. 8D is a side view of a schematic illustration of two representative cylinders demonstrating a calculation of a clearance margin.
Figure 8E:
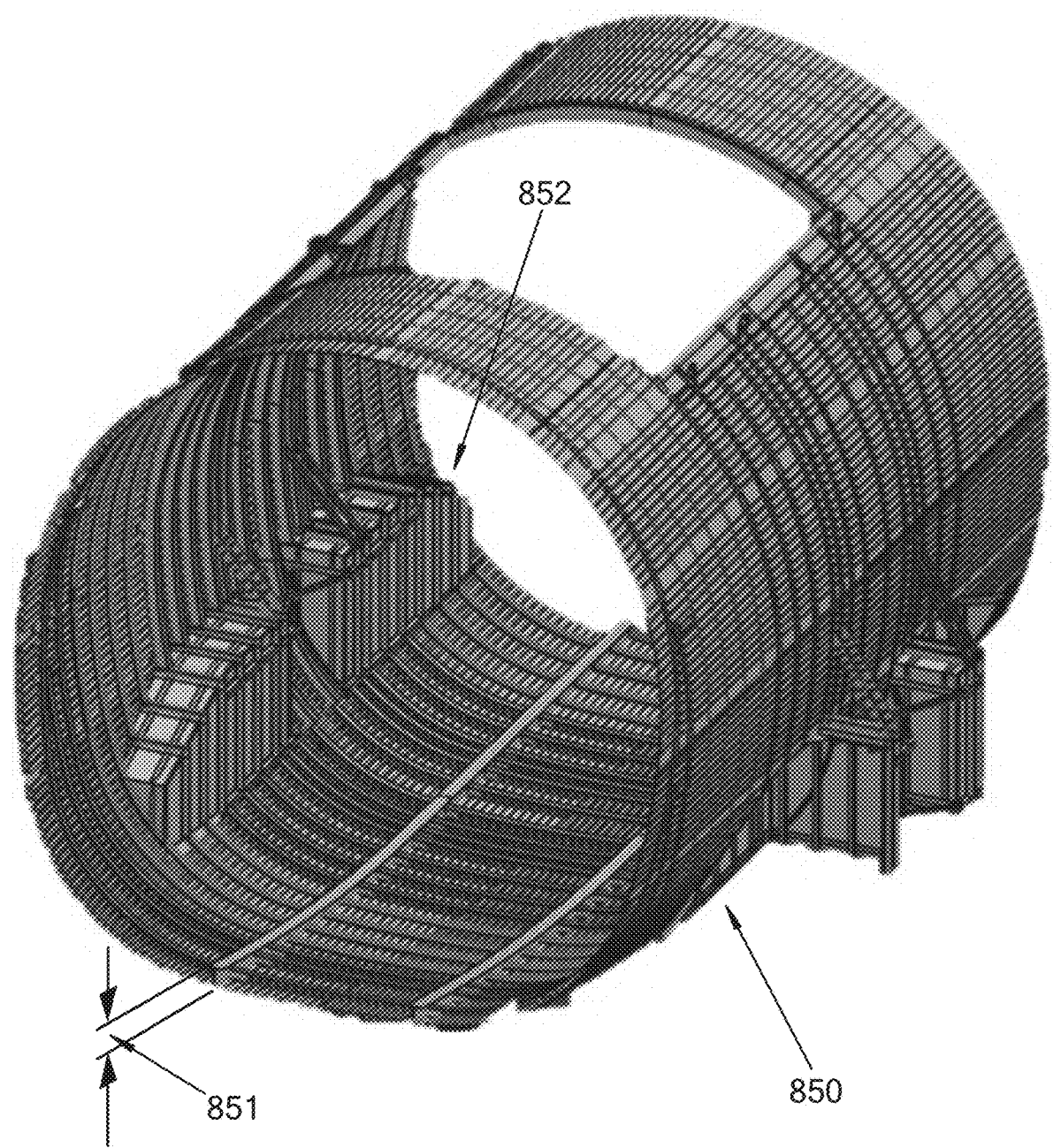
FIG. 8E is an isometric view of a structural frame of an aircraft cargo bay.
Figures 8F, 8G:
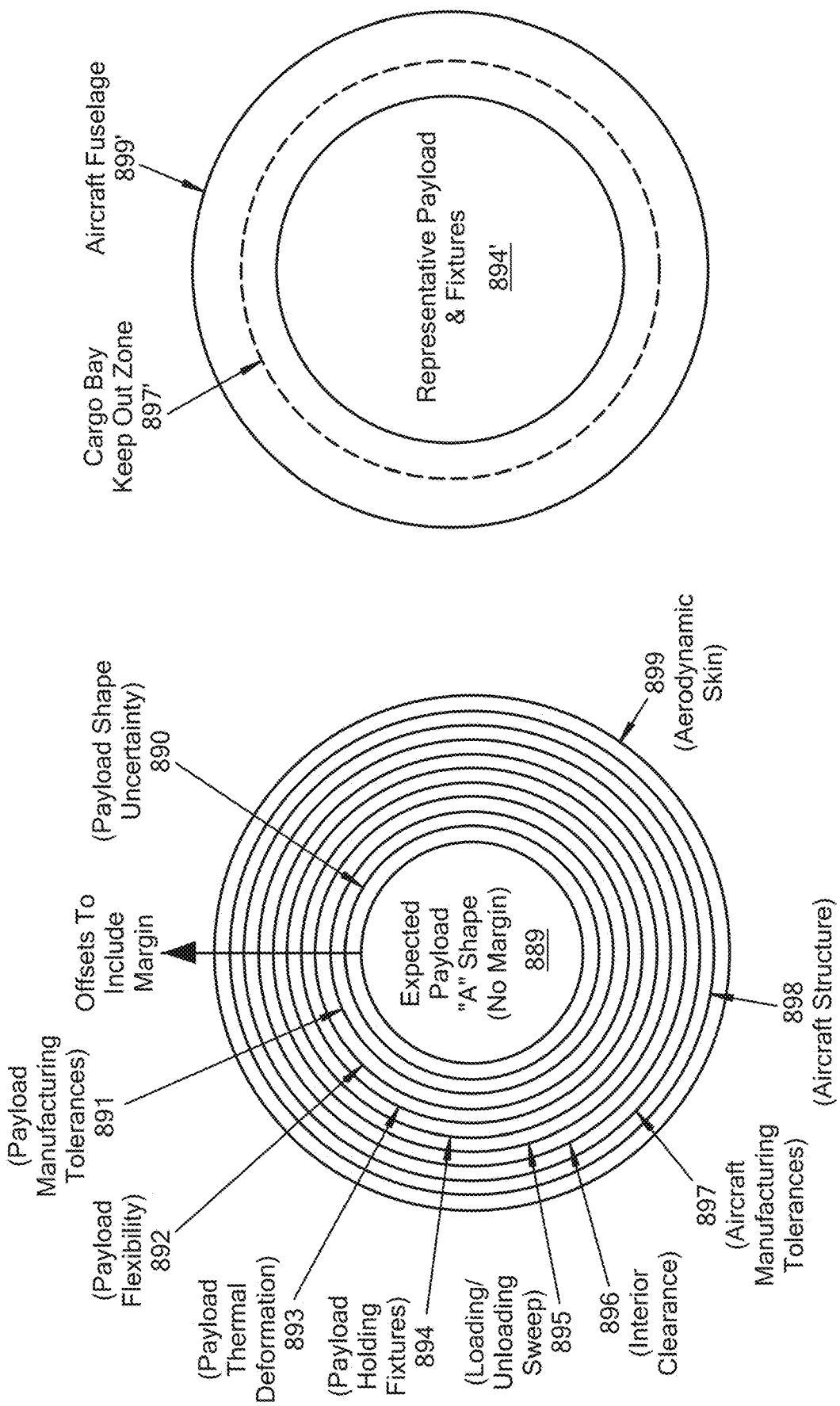
FIG. 8F is a schematic cross-section illustration showing the accumulation of a plurality of margins to determine an interior cargo space reservation and an exterior loft of an aircraft fuselage section having the interior space reservation.
FIG. 8G is a schematic cross-section illustration of a cargo aircraft holding a payload in a cargo bay.

FIGS. 8A-8E are supporting illustrations of the following discussion of a plurality of different example margins that can be accounted for in generating a final keep-out volume. FIG. 8F is a schematic of each margin being added to a single representative payload volume or an initial keep-out volume generated from a plurality of representative payloads. Finally, FIG. 8G is a cross-sectional illustration of an example aircraft fuselage showing representative payload disposed in an aircraft fuselage and cargo bay sized according to the space reservation shown in FIG. 8F.

Payloads often include figures that are used to both load the cargo in ground static conditions, and to hold the cargo while the vehicle is in motion and the generation of a space reservations can account for these fixtures. FIG. 8A shows an example of a representative payload 810 that includes a fixture 810c and a pair of wind turbine blades 810a,b held by that the fixture 810c. for example when loading and/or unloading the blades 810a, b. The fixture 810c takes up additional space beyond the space taken up by the wind turbine blades 810a,b. Accordingly, in some embodiments, where the fixture size or volume is known, it can be added to the representative payload volume before any additional steps are performed. Alternatively, a fixture margin can be used to account for an expected amount of space needed for any fixtures.

Large vehicles and their cargos or payloads can involve significant manufacturing deviations as well. Generally, the difference in a vehicle design and an actual manufactured vehicle may be different by fractions of an inch, or even several inches for extremely large vehicles designed to carry cargos or payloads that are too large to be transported by other currently existing vehicles. FIG. 8B shows the representative payload 810 of FIG. 8A disposed on a represented cargo loading/unloading path 820. This path 820 can be custom generated for the representative payload 810 or it can be predetermined by several different aircraft constraints, such as the kink angle discussed in view of FIG. 3A. With a known path 820, the representative payload 810 is swept along the path 820 to generate a swept volume 830 that represents the space needed to move the representative payload 810 into and out of the hypothetical cargo bay. The swept volume is the space occupied by the union of all positions throughout a loading and/or unloading sweep. It is understood that the length of the swept volume 830 is significantly longer than any anticipated cargo bay due, at least in part, to the necessity of also having an opening to the cargo bay sufficient to unload and load the payloads, and a possibility that the final length of the cargo bay is to be determined using the result of this process, the entire swept volume can be used during the space reservation process to size and position a cargo bay opening around the swept volume.

Additionally, vehicles such as aircraft are frequently manufactured from various aluminum alloys because of the beneficial strength properties of the alloys relative to their low density. Meanwhile, cargos or payloads might be made from generally different materials. Without providing potentially heavy, expensive, fuel-thirsty payload bay environmental control systems (e.g., heat and pressurization), which may require significant effort and schedule to develop and integrate, the differences in thermal expansion or contraction between the vehicle structure and the payload or cargo can add up to several inches or even a few feet for large payloads and cargos. FIG. 8C illustrates an example of the differences between an as-designed wind turbine blade shape and size 810a, and an as-built wind turbine blade shape and size 810a'.

Additionally, a space reservation can account for clearance between a payload or cargo in a vehicle, and the surrounding vehicle structure; otherwise, the relative motion that occurs during loading and unloading operations between these two flexible, potentially complex shapes can result in a collision that may create, for example, vehicle and cargo damage and/or shipping delays. FIG. 8D illustrates an example of cargo or payload 840 indicated as Cylinder A and the available storage volume 830 inside the aircraft fuselage is indicated by Cylinder B. The indicated clearance margin 841 can accommodate the cargo/payload during transportation as well as during the loading/unloading process.

Finally, a space reservation can also be coupled with a structural definition that can be necessary to support the vehicle shape under loads experienced due to the motion of the vehicle and the vehicle and payload inertias during accelerations. FIG. 8E is an example of an aircraft fuselage section 850 with an interior cargo bay constructed from various structural elements. FIG. 8E shows a structural thickness location 851 where a structural margin requirement can be used to approximate the necessary thickness of the aircraft fuselage 850 around the interior cargo bay. In the example of FIG. 8E, the structural ribs in the fuselage 850 are approximately 12 to 18 inches deep. Additionally, FIG. 8E illustrates landing gear wells 852 that also occupy space within the fuselage 850. A structural reservation margin can take into account all space limitations imposed by the design of the aircraft.

As shown in FIG. 8F, a plurality of different margins (e.g., additive offsets) may be brought together for each potential desired payload shape 899 as a worst-case scenario to provide a space reservation outside of which a vehicle shape may be defined. In FIG. 8F, the following margins are illustrated:

A Nominal Payload Shape Uncertainty Margin 890: an additive offset for potential unknown shape changes that a payload designer may make, beyond the parametric model and parameter ranges that can be estimated to generate the representative payload shapes. Basically, if the payload shape changes in a way that is not foreseen, this initial margin can reduce the risk that such a change will materially affect the ability to be transported. Example margins include approximately in the range of about 5% to about 10% of payload radius.

A Payload Manufacturing Tolerance Margin 891: an additive offset to account for manufacturing tolerances (i.e., it is rare, if not impossible, to build something perfectly), and across multiple manufacturing instances, locations, or tooling, it is expected that many payloads will have defects and deviations in them. Example margins include approximately in the range of about 0.125 inches to about 2 inches of payload diameter and length.

A Payload Flexibility Margin 892: an additive offset to account for flexible payloads that can be expected to flex during aircraft maneuver, such as a rough landing and in-flight turbulence, and certain payloads (e.g., wind turbine blades) that are not expected to stay the same shape. Accordingly, where a rigid payload shape may fit well, a deformable payload will likely require additional space to allow a temporary new shape to fit before the payload returns to the original rigid shape. Additionally, some payloads may deform under their own weight during loading and unloading and/or during flight. Example margins include approximately in the range of about 0 inches to about 12 inches of payload diameter. In some embodiments, this margin can be reduced where it can be assumed that any subsequent clearances used for loading and/or unloading (which can be slow operations and do not imply much flexibility) can be used as flexibility margins for a presumably static aircraft payload being loaded.

Thermal Expansion/Contraction Difference Margin 893: an additive offset to account for the thermal expansion and contraction experienced by the payload during transport. For example, wind turbine blades are generally made of fiberglass or carbon fiber, wind turbine tower segments are generally made of steel, and a cargo aircraft fuselage is typically made of aluminum. When a cargo aircraft starts out on the tarmac on a hot day (e.g., 120° F.), the aircraft and blades or towers may start at one size, but when the aircraft and blades are at 43,000 feet, where the temperature may be over 200° F. lower (e.g., −80° F.), the aircraft and blades or towers may be another size. This is at because materials generally expand when they warm up, and contract when they cool down, but their expansion or contraction coefficient varies by material. Fiberglass and carbon fiber will grow or shrink much less than aluminum, for example. Accordingly, if a payload fits the cargo bay of a grounded aircraft on a hot day and then the aircraft shrinks relatively more than the payload at high altitude/lower temperature, this margin 893 is needed to account for that difference. Moreover, because any expected difference is essentially a stretching rate this margin is particularly important along the length direction of the aircraft. Example margins include approximately in the range of about 0.125 inches to about 1 inch in diameter or height, and 1" to 12" in length.

A Holding Fixture Margin 894: an additive offset to account for fixtures and holding structures that are added to the payload shape to securely load and unload the payload and/or stow the payload during transport. This margin can account for the uncertainly in future fixture designs and can alternatively be removed if the fixture shapes are included in the payload models. Example margins include approximately in the range of about 12 inches to 24 inches.

A Loading/Unloading Sweep Margin 895: an additive offset to account for the movement of the payloads when being loaded and unloaded. Especially for more complicated aircraft cargo bay shapes (e.g., the "kinked" fuselage shape discussed above), and the fact that the fuselages often taper from front to back for aerodynamic reasons, the space needed for the payload can vary as the payload is loaded and unloaded in ways that are not obvious by just considering the final loaded shape. This margin 895 can be accounted for in different ways. For example, as discussed above, the starting payload geometry can be swept along one or more different loading and unloading paths to generate a swept starting shape. In some instances, a margined payload can be swept in a similar manner after one or more of the margins discussed herein are accounted for. In other instances, a simpler additive offset is added across some or all of the payload shape where, for example, the loading and unloading paths are not yet determined. Example margins include approximately in the range of about 12 inches to about 36 inches.

A Clearance Margin 896: an additive offset to account for additional space between the payload and the fuselage. Typically, there needs to be some at least small amount of extra distance between the payload and the fuselage while the payload is moving relative to the fuselage. This distance reservation margin 896 is the clearance. Example clearance margins include approximately in the range of about 3 inches to about 24 inches (e.g., 6 inches) and can vary depending, at least in part, on the type of cargo and any associated regulations or other requirements, such as the ability to walk around the payload during transport.

A Vehicle Manufacturing Tolerance Margin 897: an additive offset to account for the manufacturing tolerances of the interior of the cargo bay, which has a nominal design shape, but an unknown as-built shape. While the difference between these two shapes is typically kept to some small amount (i.e., the stack-up of allowed tolerances on each of the individual parts of the aircraft), some extra margin can be helpful. Example margins include approximately in the range of about 0.125 inches to about 2 inches. With the accounting of this margin, a final keep out zone can be calculated as a summation of all the previous margins, which represents a minimum cargo bay shape to carry the represented payload(s).

A Vehicle Structural Frame Depth 898: in embodiments where an exterior of the aircraft and/or an entire aircraft fuselage section is being designed, this is an additive offset added to the "final keep out zone" to figure out how big a final lofted shape for the aircraft needs to be. This aircraft structure margin 898 accounts for the structural members expected to be found between the interior skin of the cargo bay and the exterior skin of the aircraft (e.g., frames, stringers, longerons, spars, ribs). These structural members can be extremely non-aerodynamic shapes, and they can take up space, which may require them to be outside of the payload "final keep out zone" but inside of the aircraft skin. Example margins include approximately in the range of about 6 inches to about 36 inches (e.g., approximately 18 inches), and may vary around the fuselage for example, being thicker below the payload to account for the weight of the payload being carried.

With each of the margins disclosed herein, any example or representative values are non-limiting, and a person skilled in the art will recognize that some applications may result in margins that are above and/or below the exemplary ranges.

With the aircraft structure margin 898 added to the final keep out zone, a final exterior loft of the aircraft may be any desired aerodynamic shape 899 outside of that margined keep-out zone.

FIG. 8G shows a representative aircraft design result as a cross-sectional view of a fuselage section having an exterior and interior cargo bay sized according to the space reservation margins of FIG. 8F. In FIG. 8G, an exterior aircraft fuselage skin 899' is lofted according to the minimum space dimensions determined by the final exterior surface 899 of the space reservation. The fuselage also has an interior cargo bay keep out zone 897' that represents the minimum interior dimensions of the cargo bay determined by the margined space reservation up to the accounting for aircraft manufacturing tolerances. Further, a representative margined payload 894' is disposed inside the fuselage to represent the largest accounted for margin of the actual payload and fixtures during flight. In some examples, this can represent a margined union of a population of representative payloads. For example, as determined by the parametric models discussed below.

FIG. 8H is an illustration of a translucent final keep-out volume showing an intermediate keep-out volume and a solid initial keep-out volume. The initial keep-out volume is a 3D example of a desired payload shape 899 that represents a group of different payloads in optimized orientations. For the illustration of FIG. 8H, the initial keep-out volume is presented as a simplified shape (i.e., smoothed exterior) to produce a more realizable aircraft fuselage design. The intermediate keep-out volume is formed from the initial keep-out volume with a plurality of margins, including and up to the clearance margin 896 discussed above, which illustrates the maximum designed-for shape of a payload disposed in a cargo bay. Finally, the final keep-out volume is formed by adding the final margins, up to the aircraft skin 899, to generate a 3D volume that can be used for sizing an exterior of an aircraft, as shown in FIG. 8I. FIG. 8I is an illustration of a solid final keep-out volume (e.g., the initial keep-out volume with margins up to and including the aircraft skin margin 899) disposed inside a translucent exterior loft 900 of an actual aircraft design made according to the size and shape of the final keep-out volume. The exterior left 900 extends forward to account for a nose cone door, and upwards to include a cockpit, but generally the sizing of the aftward exterior loft 900 following the final keep-out volume, with a few acceptable deviations 899" visible where, for example, an aerodynamic or structural constraint may result in a small change from the final keep-out shape to meet other design constraints.

Parametric Payload Shape Modeling Systems and Methods

In order to design and build a vehicle that transports a specific cargo, a rigorous geometric definition of that cargo is helpful. In the absence of clear design metrics of either current or anticipated future wind turbine blade designs, systems and methods for generating a population of representative payloads is described herein.

Both research and engineering judgment can be utilized to develop the parametrically defined geometry, as shown in FIGS. 6A-6C. The parametric model of the wind turbine blade can be used in the absence of actual specifications and/or transportation requirements from wind turbine blade manufacturers. In addition to using this blade definition and envelope for fuselage sizing and design, this data can be used in the design and analysis of an aircraft to promote consistency and compatibility across the aircraft sub-systems.

A parametric model, such as the wind turbine blade definition discussed herein, can be created by researching various blade designs, design studies, and wind turbine industry software that also requires a sufficiently rigorous model definition. The parametric design space was reduced by assuming a single airfoil and spanwise distribution of various quantities. Most blade designs will have varying airfoil sections, and deviations of various parameters along the length of the turbine blade. However, for the purposes of a preliminary design, the effect of these assumptions should be negligible while some amount of margin can be maintained based on an understanding of expected variances.

Approximating Design Trends

Figure 9A:
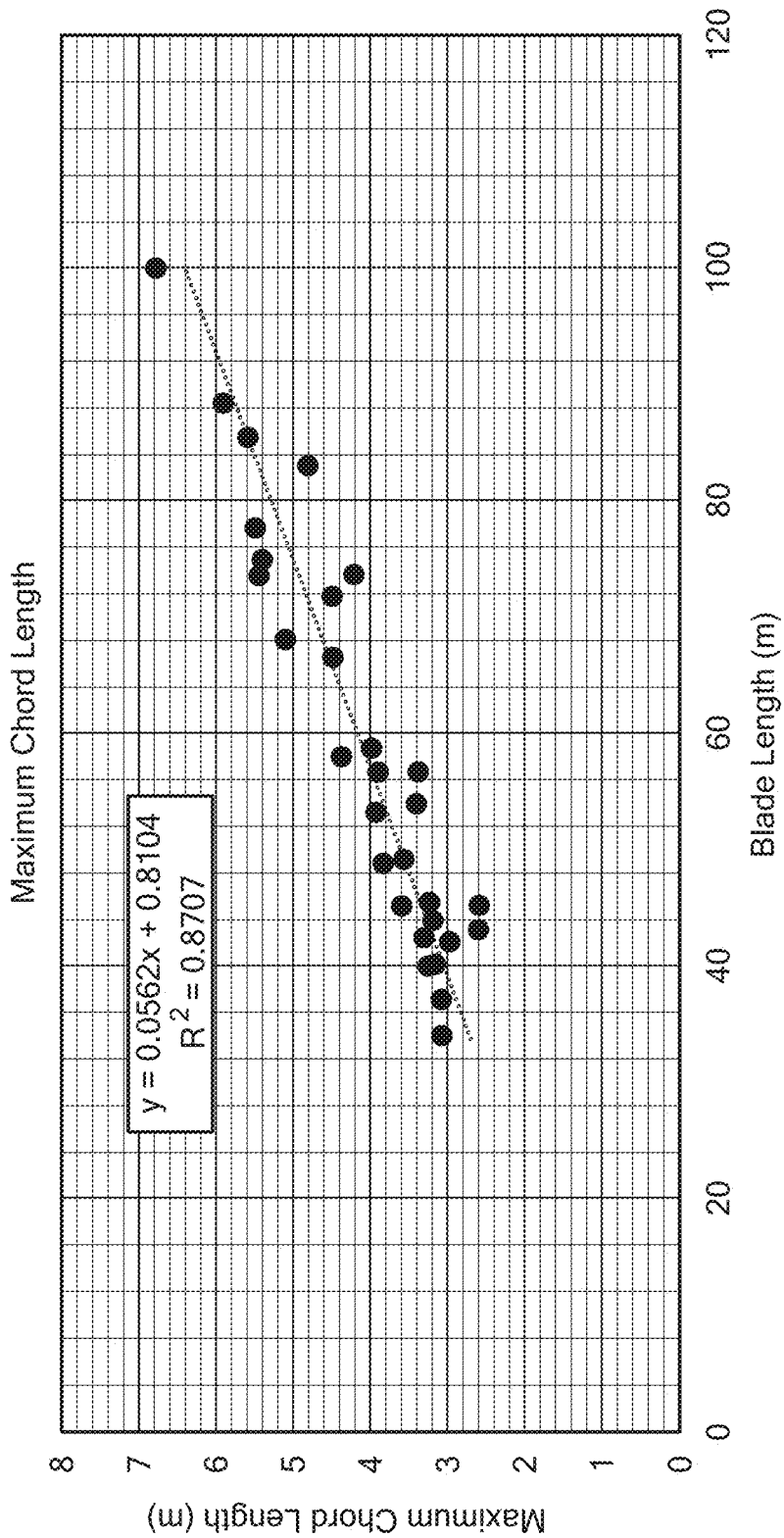
FIG. 9A is scatter plot comparing maximum chord length to blade length for use in a parametric wind turbine blade model.
Figure 9B:
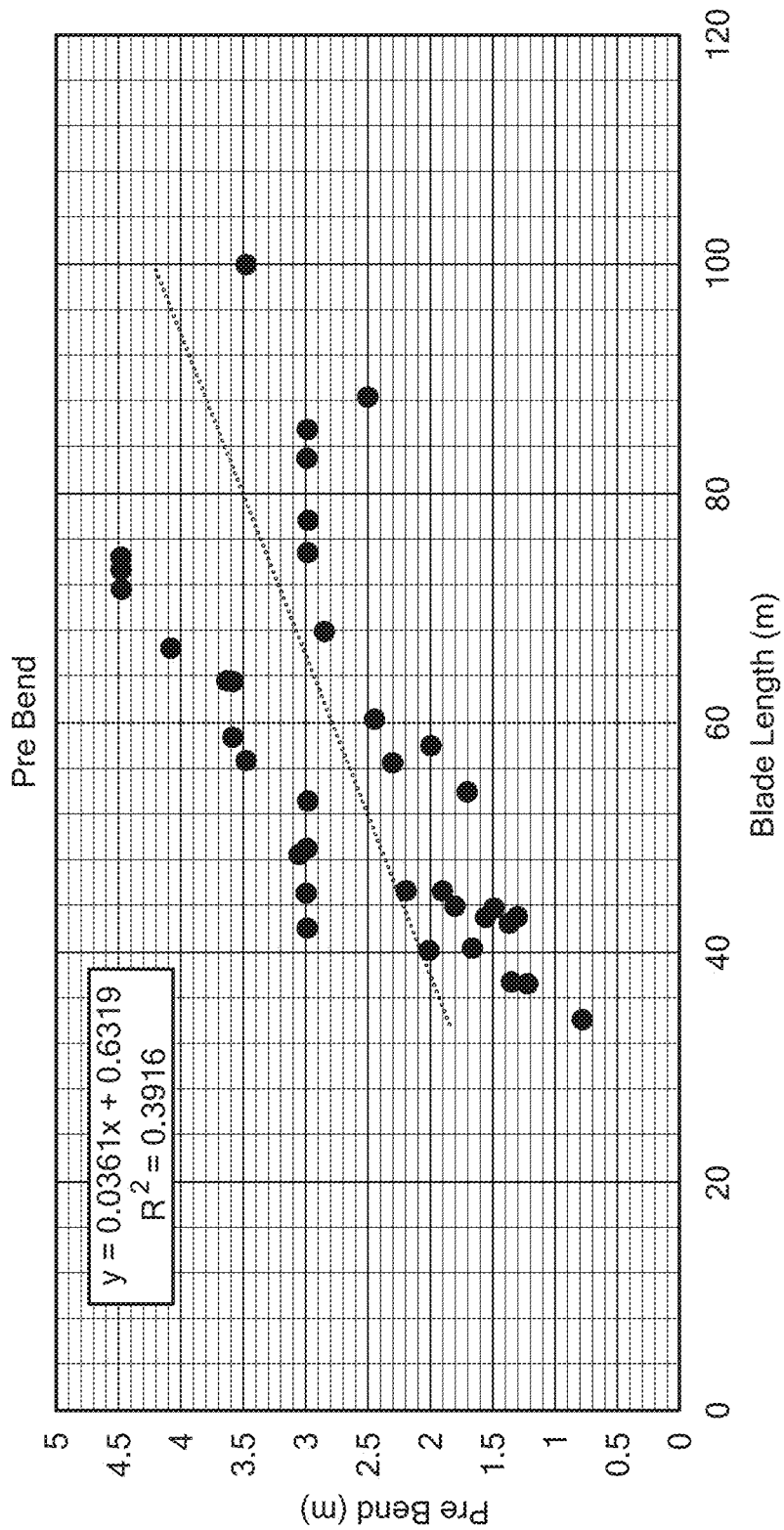
FIG. 9B is scatter plot comparing prebend to blade length for use in a parametric wind turbine blade model.
Figure 9C:
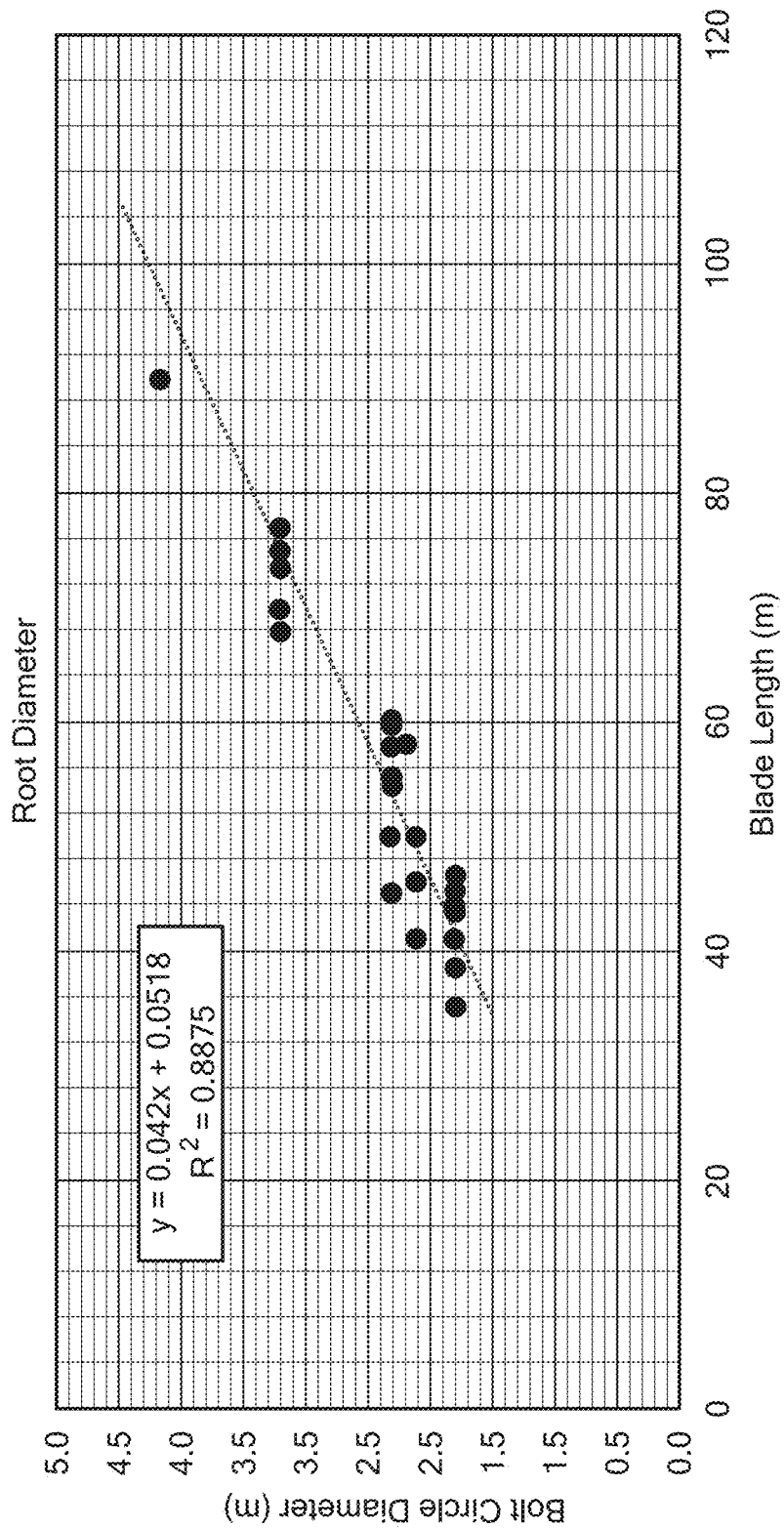
FIG. 9C is a scatter plot comparing bolt circle diameter to blade length for use in a parametric wind turbine blade model.

Data from a multitude of publicly available sources was compiled for as many blade specifications as possible. Scatter plots were created from this data to extract correlations. A distribution of maximum chord length (Cm) is plotted in FIG. 9A. A linear fit is shown to be a decent approximation up to about 100 meters. Using the line fit illustrated in FIG. 9A, a 110-meter blade would yield a maximum chord of about 7 meters, which was used as a maximum for this parametric model example. FIG. 9B shows the relationship of pre-bend $v_p$ with blade length. Here, there is a significantly wider error band about this parameter than the length-chord relationship. This risk was mitigated by using sufficiently wide margins in the envelope creation for this parameter, discussed below. FIG. 9C illustrates the relationship of blade root diameter with blade length. Even accounting for an error band, this parameter is not typically a controlling dimension for sizing an aircraft as compared to maximum chord length.

Figure 9D:
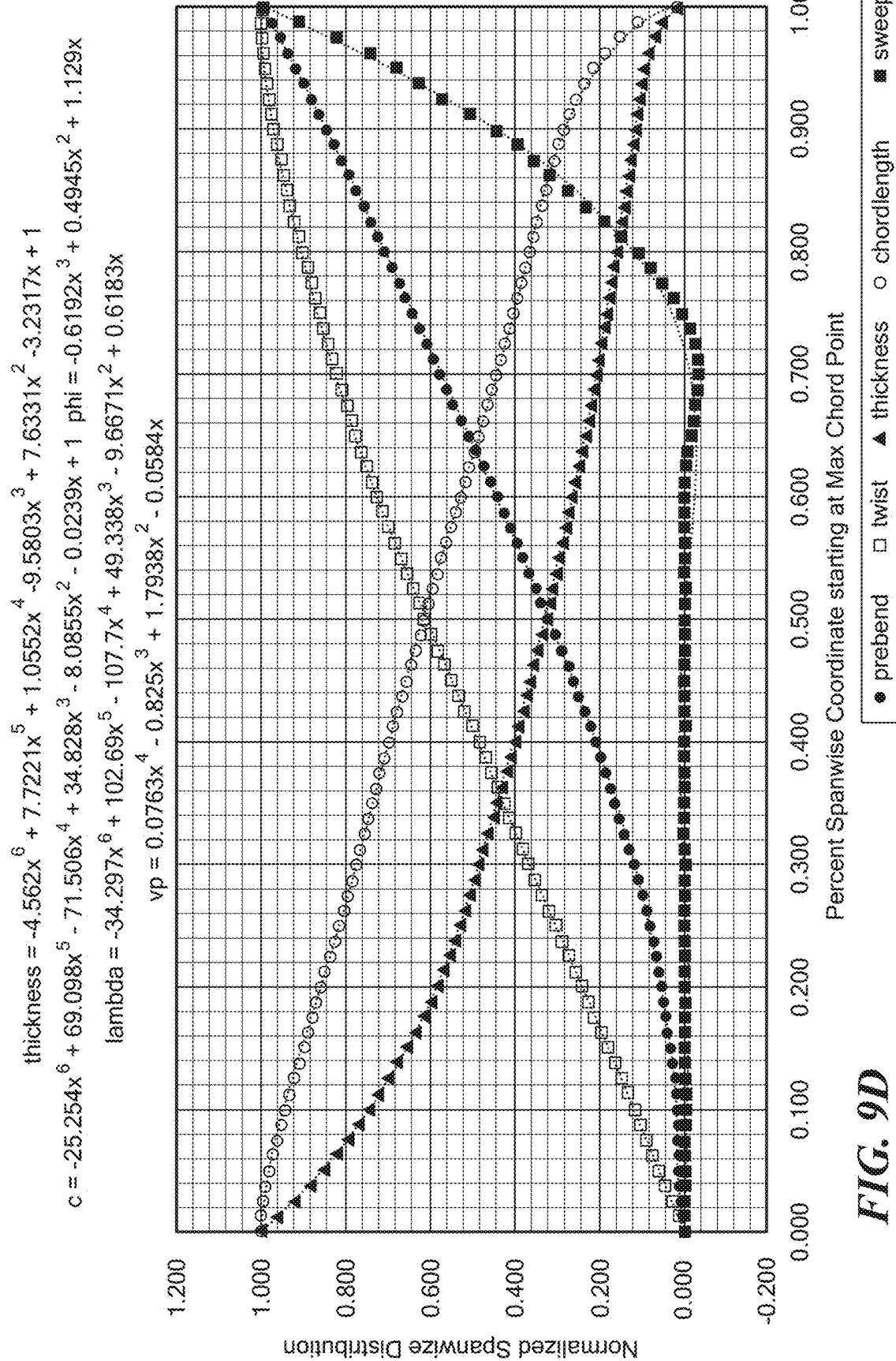
FIG. 9D is a spanwise distribution plot of a plurality of geometric parameters for use in a parametric wind turbine blade model.

Together with design trends and engineering judgment, an uncertainty range can be assigned to each variable and each blade length. To reduce the total number of explicitly analyzed blade designs, in the present instance baseline values were assumed for maximum chord ($C_m$), root diameter ($d_r$), and thickness at max chord coordinate ($t_m$) for all three different blade lengths: 85 meters, 90 meters, and a 110 meter segmented blade (e.g., two-part construction with a 70 meter root segment and a 40 meter tip segment). All three lengths assumed nominal values for both cylinder-root length ($L_c$) and length-to-max chord coordinate ($L_m$). Additionally, a single airfoil and rational distributions for each parameter along the length of the blade can be used. While each blade design can have different spanwise distributions for each parameter, this is unlikely to influence the overall shape design of a fuselage. The resultant spanwise distributions used for this example parametric blade model definition are shown in FIG. 9D.

Payload Envelopes

In order to design the shape of the fuselage and the internal payload space reservations, an enveloping set of models can be generated using the parametric model applied to a plurality of different blade lengths. 85-meter, 90-meter, and segmented 110-meter blades were used in this example. Uncertainty ranges for pre-bend, twist, and sweep at the blade tip can be assigned for all blade lengths for two primary reasons: a) these parameters govern the most out-of-plane spatial variation; and b) as blade lengths increase the aeroelastic loading is expected to increase along with deflection, which is counteracted by bend, sweep, and/or twist.

Figure 10A:
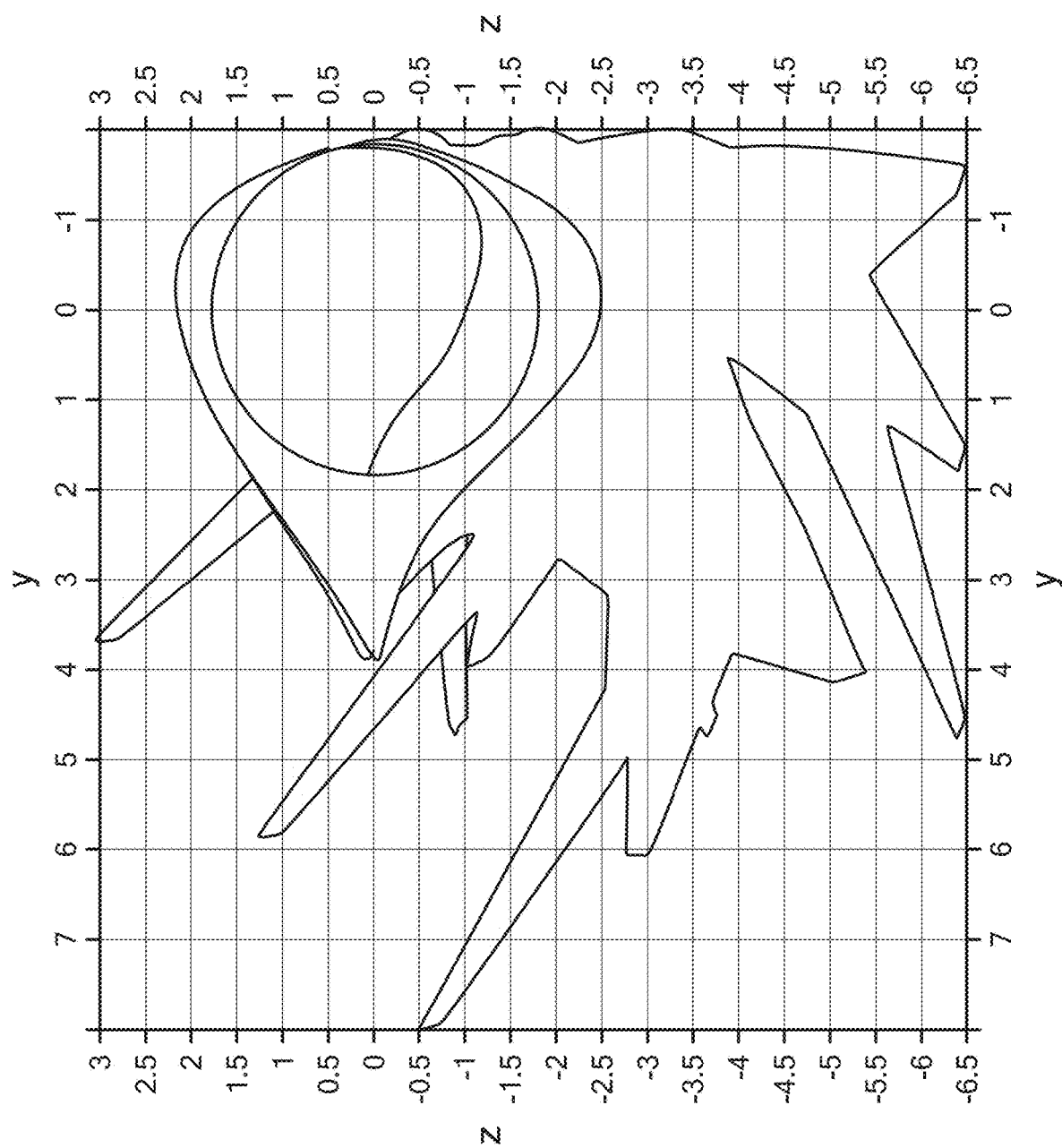
FIG. 10A is a YZ plane view of one exemplary embodiment of a blade envelop of a parametric model of an 85 m wind turbine blade.
Figure 10B:
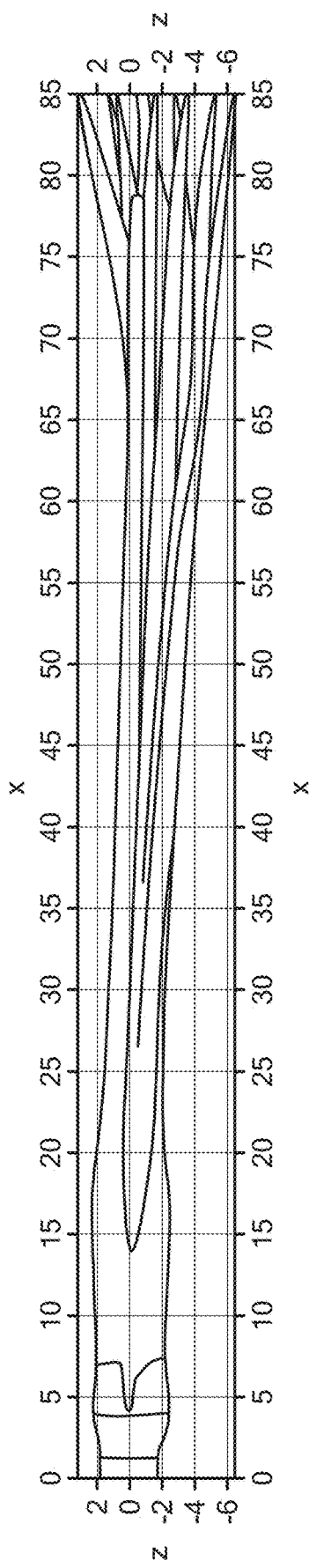
FIG. 10B is an XZ plane view of the blade envelop of the parametric model of FIG. 10A.
Figure 10C:
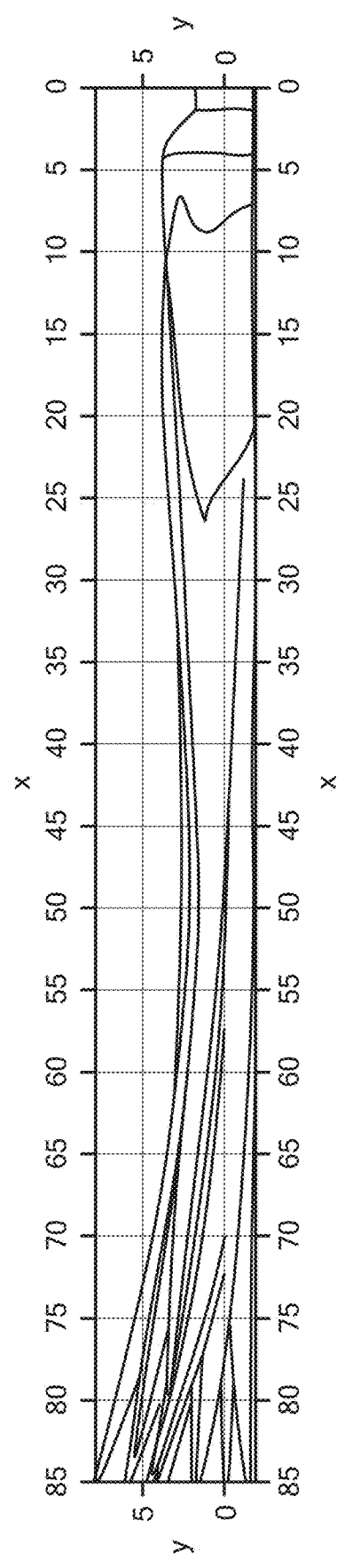
FIG. 10C is an XY plane view of the blade envelop of the parametric model of FIG. 10A.

A surface representation was created for each combination of parameters at the lower, nominal, and upper bounds of each range. FIGS. 10A-10C illustrate different views of the geometric variations for a small selection of the resultant 85-meter blade designs.

Figure 11:
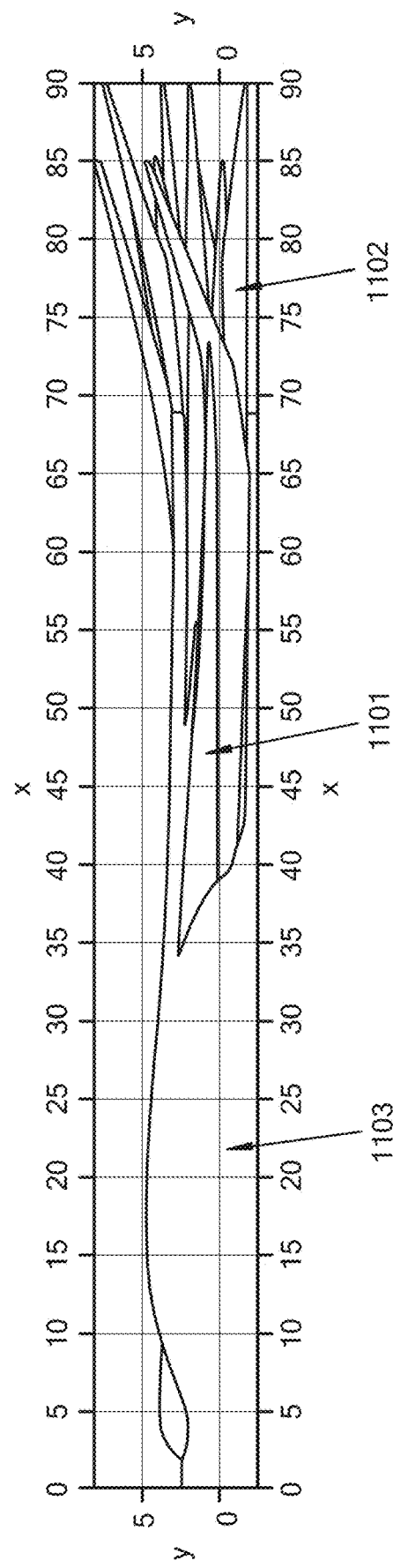
FIG. 11 is an XY plane view of one exemplary embodiment of a blade envelop of a reduced parametric model of an 85-meter wind turbine blade, a 90-meter wind turbine blade, and a 110-meter segmented wind turbine blade.

This process can be repeated for the 90-meter and 110-meter segmented designs and the results can be combined and overlaid to generate an intermediate payload envelope for the parametric model. This intermediate payload envelopment is not anticipated to be a final output of the process for at least two reasons: (1) not every payload object in the result complete payload envelope actually extends or defines an outer limit of the envelop (i.e., a number of payload objects may lie entirely within another, larger payload object); and (2) the orientations of the payload objects are fixed, but the various parameters considered can significantly change their effective orientation, as seen in FIG. 10A. Accordingly, a down-selection process can used to reduce the number of total blade designs to analyze in the packaging analysis. All blades for each length can be rotated 360 degrees about the X-axis, and maximum Y and Z spatial spans can be computed and ranked. Further, a subgroup of each length can be selected and combined to provide a representative population of blade designs that both maximizes and minimizes the out-of-axis spatial span. A final payload envelope can include as many expected future blade designs as possible for the largest sizes the aircraft is intended to carry. An overlay of each blade of an example payload envelope after the down-selection process is shown in FIG. 11, including eight 85-meter blades 1101, four 90-meter blades 1102, and three 110-meter segmented blades 1103.

While the above example has been conducted for wind turbine blades, other example payloads from which a parametric model can be generated are suitable.

Payload Orientation Optimization Systems and Methods

Examples of the present disclosure include systems and methods of calculating optimized orientations of the generated population of representative payloads to maximize their packing efficiency before generating an initial keep out volume for use with the sizing systems and methods disclosed herein. In brief, when creating an initial keep-out volume using payloads comprising multiple representative payload objects, the overall efficiency of the final design can be improved by only considering the payloads where the representative payload objects are arranged in optimal orientations (e.g., ones that minimize one or more cost functions, such as minimum clearance or overall volume). Methods exist for determining one or more optimal arrangements to use. One such method is discussed below and more detail can be found in International Patent Application No. PCT/US2020/049781, entitled "SYSTEMS AND METHODS FOR OPTIMIZATION OF PACKAGING LARGE IRREGULAR PAYLOADS FOR SHIPMENT BY AIR VEHICLES," and filed Sep. 8, 2020, the content of which is incorporated by reference herein in its entirety.

Examples include routines for determining one or more optimized payload configurations implemented using a computer processor executing a software program that takes, as an input, two or more objects (e.g., wind turbine blades) each having a 3D surface geometry (or one is calculated from a plurality of parameters defining the input object) that includes a large number of tessellated arbitrary surfaces. The program can then execute one or more optimization routines that sequentially perturb the orientation and position each 3D surface geometry through a large number of possible positions with respect to each other (and, in some instances, a cargo bay volume). The program can further, for each position, calculate one or more cost functions and, as an output, return those orientations of each object for which the calculated cost functions are one or more of minimized, maximized, within some predetermined threshold, and/or satisfies a similar type(s) of constraint.

In an exemplary embodiment, conventional software can be used to create the tessellated 3D surface geometry for each object and, when applicable, for the interior of the cargo bay, which can be made up entirely of triangles or other arbitrary planar polygons. In another alternative embodiment, custom-written software can be used to create the same tessellated 3D surface geometry for each object and, when applicable, for the interior of the cargo bay, which can be made up entirely of triangles or other arbitrary planar polygons. A finer tessellation process requires more triangles to define the surface, but also can result in a 3D surface geometry that more closely approximates the actual surface of the object being modeled. Accordingly, the fineness or resolution of the tessellation can depend on, for example, a parameter or cost function of the payload being calculated. For instance, if the cost function being calculated is a minimum clearance between each object of more than six (6) inches, it may be advantageous to have a 3D surface geometry that can vary less than a maximum of one (1) inch from the surface of the real object such that the maximum possible variance between 3D surface geometries objects is four (4) inches on the corresponding real objects.

In operation, determining an optimal orientation of one or more elongated irregular objects in space, such as wind turbine blades, can require numerous perturbations of each object in space and an evaluation of each minimum distance between the objects for clearance, as well as an evaluation of additional cost functions, such as volume or payload cargo bay clearance.

Figure 12A:
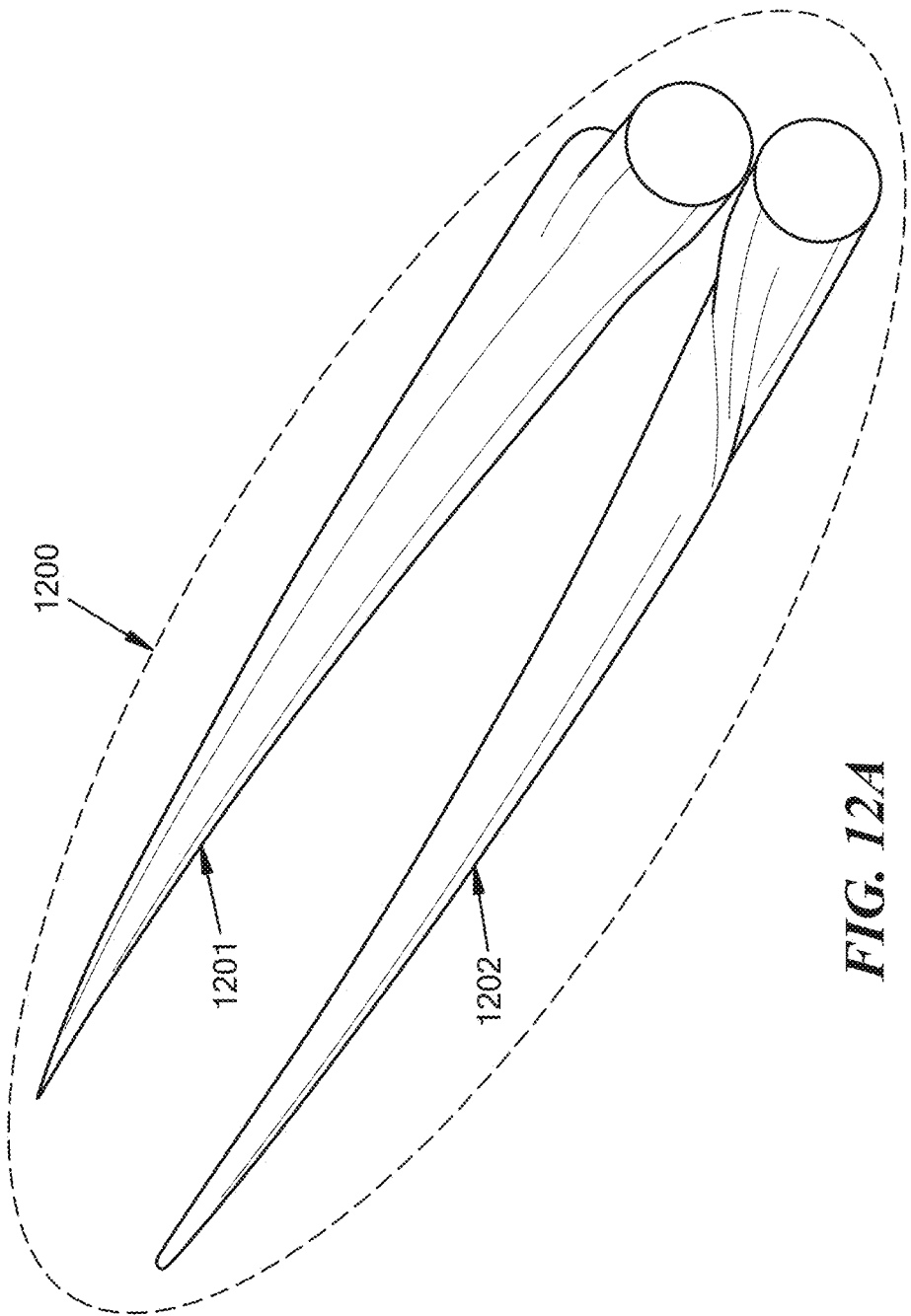
FIG. 12A is an illustration of two wind turbine blades as examples of two highly elongated and irregularly-shaped objects.

FIG. 12A shows an example of two representative payload objects in an arbitrary orientation that can subsequently have their orientations optimized using aspects of the present disclosure to determine a packaging arrangement of the two payload objects that can satisfy one or more cost functions, in addition to a simple clearance constraint (e.g., they are not contacting or inside of each other). Specially, FIG. 12A shows two wind turbine blades 1201, 1202 defining a payload arrangement 1200, with each blade 1201, 702 being about 100 m long and occupying about 538.15 meters$^3$ of volume, for a sum of 1,076.31 meters$^3$ of occupied space of the blade combination. However, this payload arrangement 1200 of wind turbine blades 1201, 1202 cannot nest perfectly together as illustrated because of their awkward, complex, irregular shapes. Moreover, there is no orientation or position of one wind turbine blade relative to the other that results in zero gap distances between one another over significant portions of their surfaces. Therefore, to package these wind turbine blades 1201, 1202 together and transport them as a cargo payload 1200, they will require much more total volume to hold the package than the sum of the enclosed volume of each individual blade.

Figure 12B:
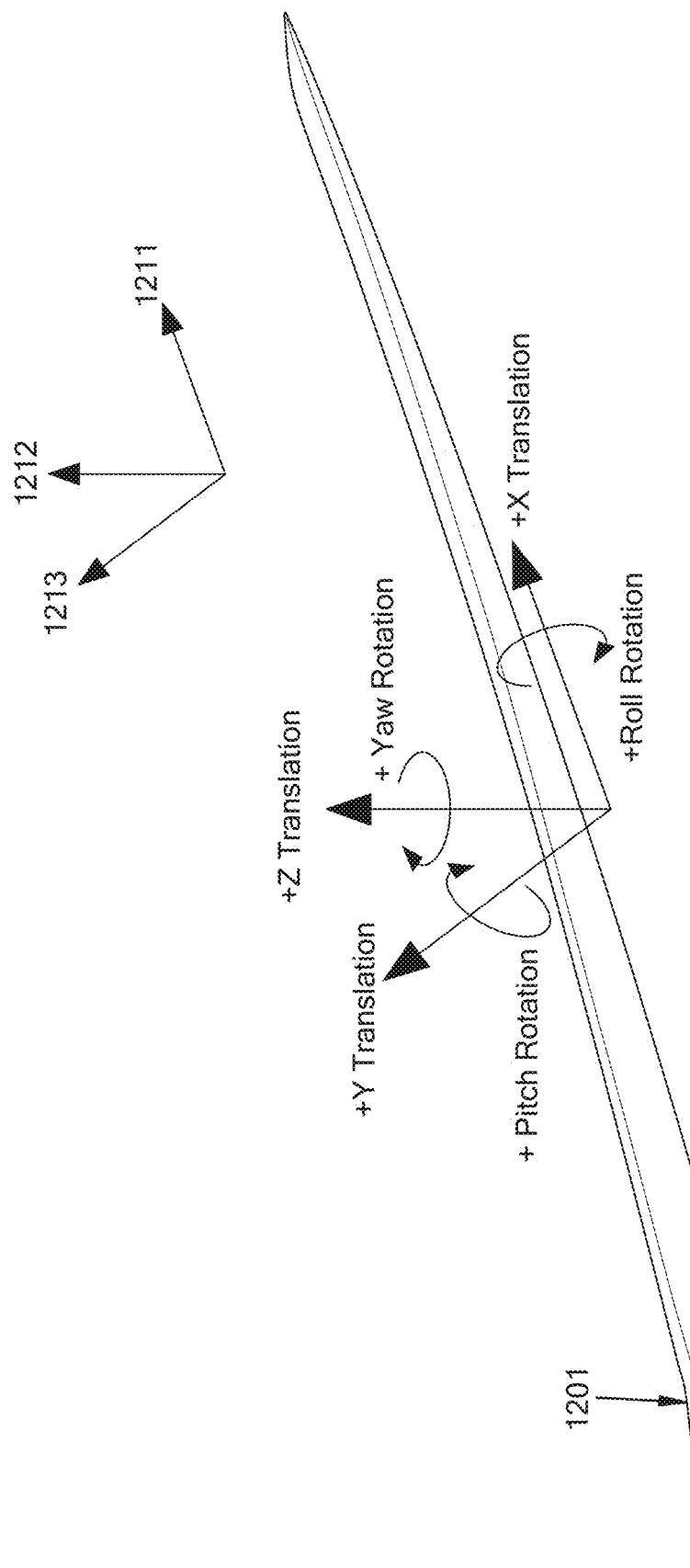
FIG. 12B is a schematic illustration of the six degrees of freedom of the wind turbine blades of FIG. 12A considered as variables to be adjusted and optimized by the payload orientation optimization routine.

The output of the optimization routine can be one or more orientations, with the degrees of freedom of the orientation of each object being shown in FIG. 12B for a wind turbine blade 1201, with each of the six degrees of freedom being: Roll (also referred to herein as 'dRoll'), which is as angle of rotation about an X axis 1211, Pitch (also referred to herein as 'dPitch'), which is an angle of rotation about a Y axis 1213, Yaw (also referred to herein as 'dYaw'), which is an angle about Z axis 1212), Position along the X axis 1211 (also referred to herein as variable 'dX'), Position along the Y axis 1213 (also referred to herein as 'dY'), and Position along the Z axis 1212 (also referred to herein as 'dZ'), each of which can be varied for each object being positioned and orientated during the optimization routine. For each change in one of the six degrees of freedom for each object, the clearance is checked and, if necessary, one or more cost functions are also checked. After each orientation of each object has been checked, the output can be a plot that shows contours of cost functions versus orientation variables. In some situations, the absolute global minimum solution for a cost function is not necessarily the best choice for the final orientation of the payload. However, the process described herein makes it simple to select another configuration with marginally worse cost function magnitude but which is a better overall choice for other reasons. In some instances, the range of each variable of one or more objects can be constrained by one or more parameters, such as a maximum cargo bay dimension (e.g., no object is translated to a position more than a difference between the overall length of the longest object and the cargo bay, as, for example, arranging two 100 meter objects in a 110 meter long cargo bay requires that the other object not be translated along the axes closest approximating the 100 meter length by more than 10 meters or so). Additionally, during the optimization, each degree of freedom can be incremented at a certain fineness or coarseness, which can determine the overall level of computation required. As such, it is also possible to optimize the optimization routine by running it multiple times, for example, using a first coarse increment to find a few orientations that satisfy the cost functions, and then re-running the routine with finer increments but with a range of the positions and orientation variables being roughly constrained about the known solution regions to further determine the presence of local minimum and better optimize any global minimum. Alternatively, it is possible to automate such an approach using an adaptive algorithm which adds additional sub-increments to each degree of freedom of each object near the locations of the coarsely evaluated degree of freedom increments which yielded the best cost function values.

The data generated by examples of the processes described herein allow for quick and compact modeling of the resulting orientations in CAD space with only six (6) numbers (e.g., the degrees of freedom variables). In some examples, for processing more than two wind turbine blades, it is possible to initiate the process by optimizing the orientation for two blades together, then optimize the third blade against the "pre-packaged" pair of blades already optimized. For four wind turbine blades, it is also possible to model the two pairs separately and then optimize the pre-packaged pairs with respect to each other. This is merely one option in the optimization process. It is possible to model an arbitrary number of blades individually rather than pre-packaged pairs. Those skilled in the art will appreciate that N=6 variables are used for two blades, N=12 for three blades, N=18 for four blades, and so forth. With a high-performance computing cluster, it is possible run parallel processing sweeps through all orientations to determine the optimal packaging.

In general, examples of the process disclosed herein can take an arbitrary number of tessellated arbitrary surfaces and execute a routine to output minimized cost function orientations, where the cost functions can include, but are not limited to: (i) resultant payload volume (e.g., the volume of the convex hull of a combination of the objections); (ii) unsigned distance from a set of entities (e.g., a cloud of points, a series of line or curve segments, an additional arbitrary discrete or analytical surface); and/or (iii) signed distance relative to a set of entities (e.g., a cloud of points, a series of line or curve segments, an additional arbitrary discrete or analytical surface). One or more of these cost functions may be minimized within additional constraints, such as, for example, maintaining a minimum spatial clearance between each arbitrary surface in the optimized package or restrictions on allowable orientation of each arbitrary surface in the optimized package.

Examples of the present disclosure can therefore be used to analyze multiple large, irregularly-shaped objects to determine how they may be optimally oriented in space and/or in a predefined cargo bay volume, and optimally subject to multiple constraints, to automatically optimize for multiple cost functions, such as to: (i) restrict predefined ranges of orientation; (ii) maintain a minimum clearance between objects in a payload; (iii) minimize an overall volume of the payload; (iv) minimize the distance from the payload to a set of entities (e.g. orienting a payload as close as possible to a cargo centerline); and/or (v) maximize the distance from the payload to to a set of entities (e.g., maintaining a minimum clearance between the payload and the cargo bay, or centering the payload within the cargo bay).

Examples include reducing the overall computational time of an optimization process by restricting the ranges of orientations or the objects. For example, it is not necessary to consider object orientations where the longest dimension of one object is orthogonal to the longest dimension of another object, as this orientation will obviously be unable to result in the optimal cost function of minimizing the overall payload volume. Similarly, there are situations in which object symmetry implies that certain orientations do not need to be analyzed because they are non-unique. Finally, there may be manufacturer restrictions on certain object orientations during transportation, making it unnecessary to evaluate prohibited orientations.

In addition to optimizing the packaging of one or more objects, the process can evaluate orientations within the limitations of the internal volume of the available cargo space (e.g., in the cargo bay of an aircraft). For example, a cargo bay may have "Keep Out" spaces where the payload is not allowed to intrude. In one embodiment, the process described herein can minimize the maximum distance from a curve along the cargo bay centerline to the furthest point outwards on the cargo. In another embodiment, the process described herein can maximize the minimum distance from aircraft structures in the cargo bay to the nearest point on the outside of the payload package to maintain as much clearance as possible.

Examples of the systems and methods can start by creating geometric inputs (e.g., 3D surface geometries) for each object to be optimized as a payload. In some example processes this tessellation can occur as an initial step, and may be outside of the optimizing routine, for example, using existing software solutions that may be external to the processes discussed herein. Additionally, this can include taking existing 3D surface geometries and adjusting or changing their properties, such as tessellation density, to better execute the subsequent optimization steps. The example process continues with an input receiving parameters for use during the optimization routine, for example one or more allowable ranges of orientation for each object, minimum required clearance, additional desired cost functions, and/or increment size in perturbations of the objects.

In some instances, the example process allows for preparation or modification of each 3D surface geometry during or after this step, such that the subject optimization calculations can be processed more efficiently or quickly because the 3D surface geometry may be simplified without significantly impacting the accuracy of the process beyond a fraction of the minimum required clearance.

The example process proceeds to an optimization routine in which the process can perturb each combination of every object through the full range of permitted orientations by the input increments in translation along each spatial axis, and in rotation about each spatial axis. At each unique orientation, the minimum distance between each unique object can be checked against the minimum required clearance between all objects, and other cost functions can be computed (e.g., total packaged volume dimensions or convex hull volume, maximum unsigned distance from entities including a series of points, curves, surfaces, and/or volumes inside of a cargo bay, and/or minimum signed distance from entities including a series of points, curves, surfaces, and/or volumes defining the structural edges of a cargo bay). After the full range of orientations are analyzed, the process continues by outputting each orientation that meets clearance and/or cost function constraints, along with cost function output, to allow selection from output of the optimum blade packaging (minimum cost function), or alternatively, a solution that is close to optimum but may meet additional constraints. The outputting can include storing the cost functions and/or calculated clearances for each individually calculated orientation, or, in some instances, storing each of the orientations and their corresponding cost functions for orientations that satisfy one or more constraints on the cost functions or clearance. Implementations of this brute-force optimization approach to evaluating the entire orientation space can be extremely thorough (e.g., robust at finding global minimums to within the tolerance of the perturbation increments) and parallel (e.g., allowing fully independent evaluation of each orientation in isolation).

In the example process, the optimization routine can include a series of steps defining each iteration in a single loop. The optimization routine can include a check to see if all orientations have been considered and/or if some desired optimized orientation has been achieved and, if so, proceed to the output 940. The check can call an incrementer to adjust the position of one or more of the 3D surface geometries, and afterwards a geometric processor can determine one or more points on the 3D surface geometries according to the cost functions (e.g., determining the closest two point between to objects). The result(s) can be sent to a comparer to calculate cost function values and cross-check any cost function constraints with the values.

An example variation of these processes is a more complex solver approach that determines sensitivities in each cost functions by perturbing the object orientations to determine a local minimum in cost function at far fewer evaluated orientations.

Example Optimization Routine

It is difficult to show the plurality of nested loop of the example optimization routines in a single flowchart, as there are six (6) variables to sweep through for each blade that is being oriented or positioned relative to another blade and/or cargo bay shape. Accordingly, a pseudocode example is presented below for a two-object optimization loop (i.e., 'Blade1' and 'Blade2'), with each layer representing a nested loop adjusting one of the degrees of freedom a respective blade for each of the six degrees of freedom—dRoll (angle about X axis in degrees), dPitch (angle about Y axis in degrees), dYaw (angle about Z axis in degrees), dX (position along X axis in inches), dY (position along Y axis in inches), and dZ (position along Z axis in inches)—which are varied. There can be a minimum and maximum value checked for each degree of freedom. For the angles, one example can include a full range that would be the bounds from spherical coordinates (e.g., dRoll, dYaw each being incremented from −180 deg to +180 deg, and dRoll from −90 deg to +90 deg), however, examples can include reductions in these bounds being applied due to common sense, for example, that the pitch angle range will not exceed 50% above and below a fuselage kink angle. For the lengths, a full range example would roughly the difference in length between the primary dimensions of the blades and the cargo bay, in each direction: for a 100 meter blade in a 105 meter fuselage, the blades may be taken forward and aft by five (5) meters from an intermediate position to cover the full range.

Routines can result in a substantial number of orientations being calculated. For example, if the number of calculations for each degree of freedom is ten (10), the result is $10^6$ total permutations. Accordingly, it can be advantageous to limit the ranges of each degree of freedom and use larger increments. Additionally, in examples that include conducting a "packaging" step and a "place/orient payload in vehicle" step separately, during the packaging step the one object can be held static during an optimization routine. Then, once the best "payload package" of the objects relative to one another has been determined, a single 6-DOF sweep of a resultant packaged payload within the cargo bay with additional cost functions described above can be performed. In algorithm parlance, this is replacing to get a lower number of permutations:

$10^{12}$ to optimize 3 blades+$10^6$ to orient and position final blade package, which is substantially less than $10^{18}$ to simultaneously package blades together and orient the blades in the cargo payload in a single optimization algorithm.

Example Cost Function: Minimum Clearance

Calculating the minimum clearance between each object ensures that a minimum amount of clearance can be maintained so that the objects do not damage or touch one another in the finished packaging. During air transport, for example, objects may undergo moderate vertical accelerations (e.g., approximately in the range of about −1.0 G to about +2.5 G) and often continuous vibration. While example objects like wind turbine blades are flexible items, and will deform small distances with loads, if they touch one another, they may abrade or forcefully collide in a way that leaves permanent, undesirable damage. By calculating a merit function of clearance, a filter may be applied to maintain a minimum amount of clearance, such as 6 inches between 100-meter-long wind turbine blades.

Figure 13:
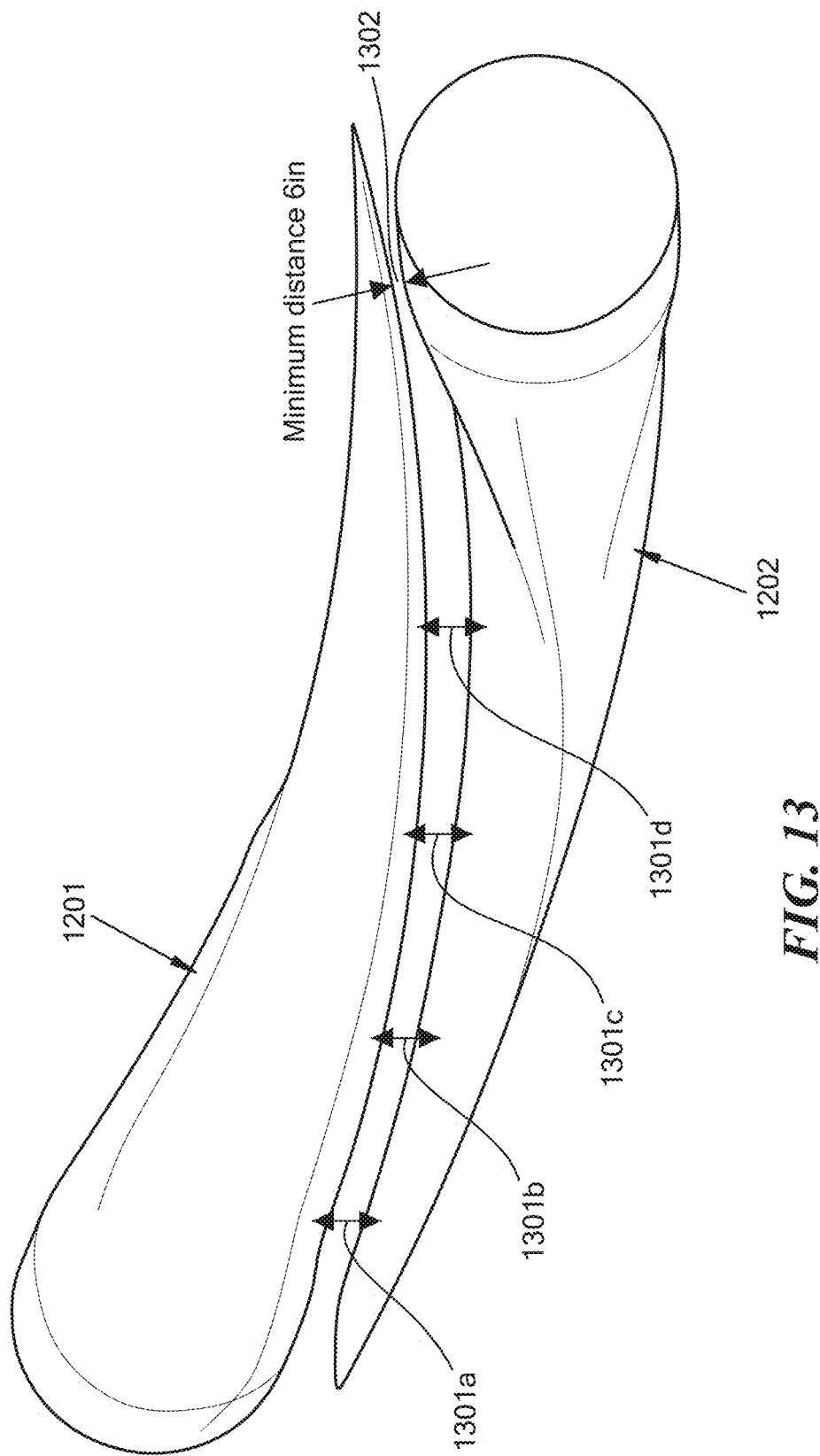
FIG. 13 is an illustration of an optimized orientation of two wind turbine blades of FIG. 12A according to an output of a payload orientation optimization routine based on a minimum clearance cost function.

FIG. 13 is an illustration of the minimum clearance maintained by filtering all permutations of six degrees of freedom between one blade 1201 while a second blade 1202 is held static. In each orientation a large number of individual inter-object clearances 1301a-d are calculated to determine a minimum 1302.

Example Optimized Payload and Aircraft

Using aspects of the present optimization method, including sweeping through six degrees of freedom for each object and repeating the process, testing each combination of the orientations of the two blades, an optimized arrangement can be found. This is shown, for example, in FIG. 14A, where an optimized payload arrangement 1470 of the first and second blades 1201, 1202 is illustrated in a highly efficient packaging orientation. To achieve this orientation, the top blade 1201 was rotated +176.5 degrees in the roll axis (about its longest dimension from root to tip). Here, a 3D convex hull calculation results in only 42% wasted volume relative to the minimum volume occupied by the combination of the individual first and second blades 1201, 1202. This optimized payload arrangement 1470 can be set as an initial keep out volume by itself and swept along a loading/unload path to generate a swept volume for use in the aircraft sizing systems and methods disclosed herein. Additionally, or alternatively, the arrangement 1470 can be combined with one or more other optimized arrangements of payload objects or individual payload objects (which can be swept or unswept volumes) to create a space reservation volume for use in sizing an aircraft cargo bay or the cargo aircraft fuselage section itself.

Figure 14A:
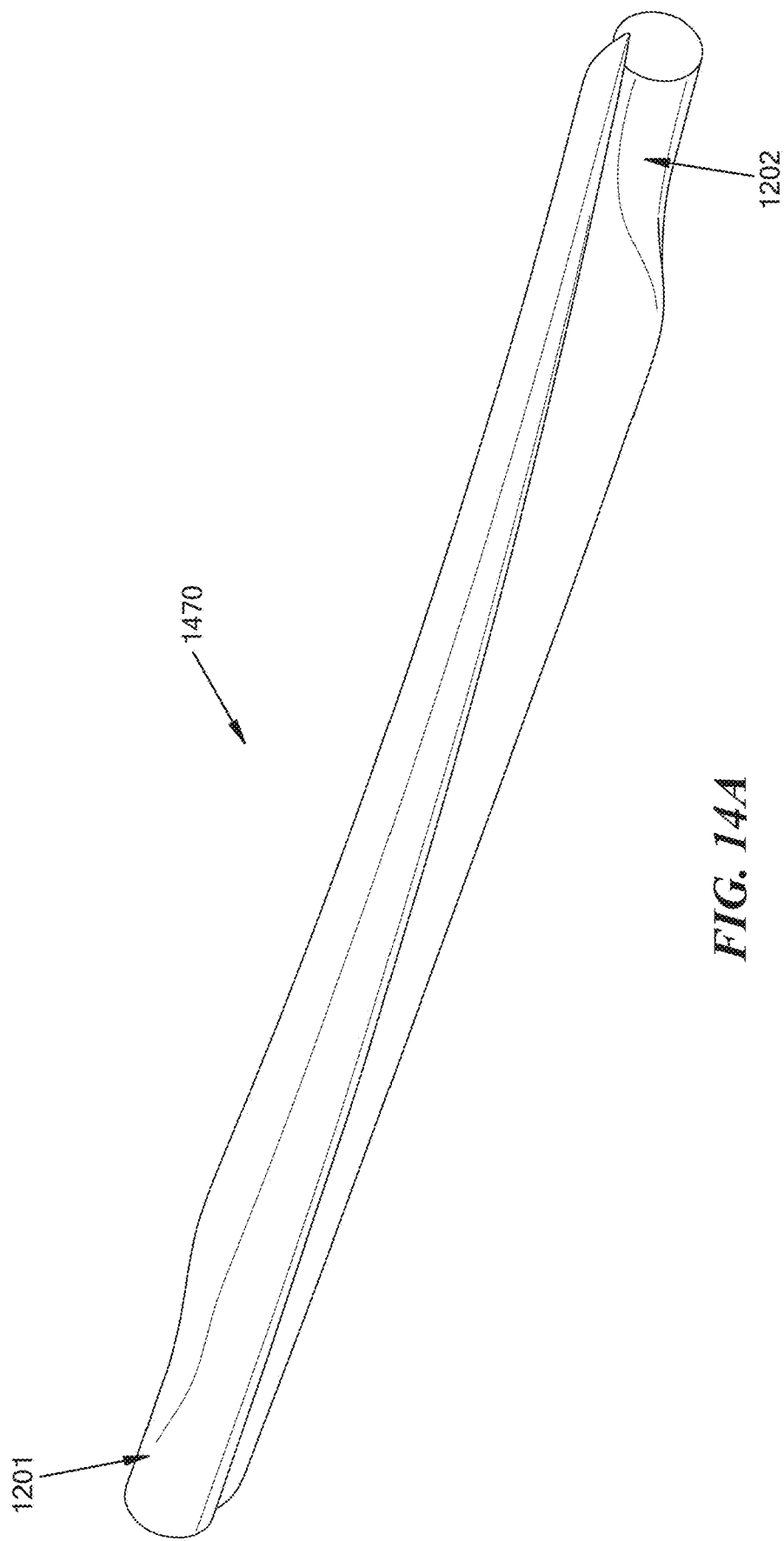
FIG. 14A is an illustration of the wind turbine blades of FIG. 12A arranged according to an optimized payload arrangement.
Figure 14B:
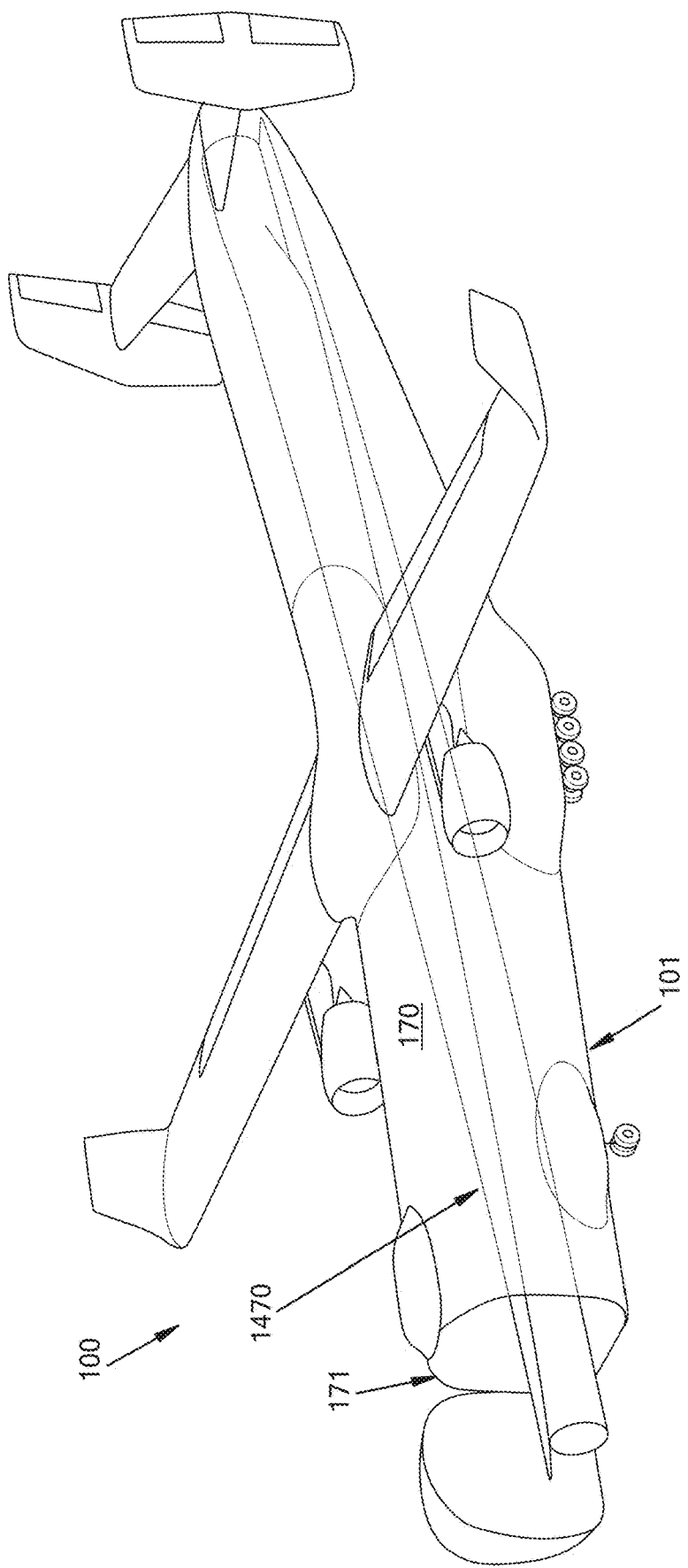
FIG. 14B is an illustration of the optimized payload arrangement of the wind turbine blades of FIG. 14A inside the interior cargo bay of the aircraft of FIG. 1.

FIG. 14B shows the payload 1470 of FIG. 14A disposed in the interior cargo bay 170 of the aircraft 100 of FIG. 1A. Here, the cargo bay 170 of the aircraft 100 was dimensioned according to a union of a plurality of optimized payload orientation and individual payload objects, including the optimized payload arrangement 1470. Accordingly, the cargo bay 170 can allow the optimized payload arrangement 1470 to be loaded, unloaded, and stowed, as illustrated by FIG. 14B.

Figure 15:
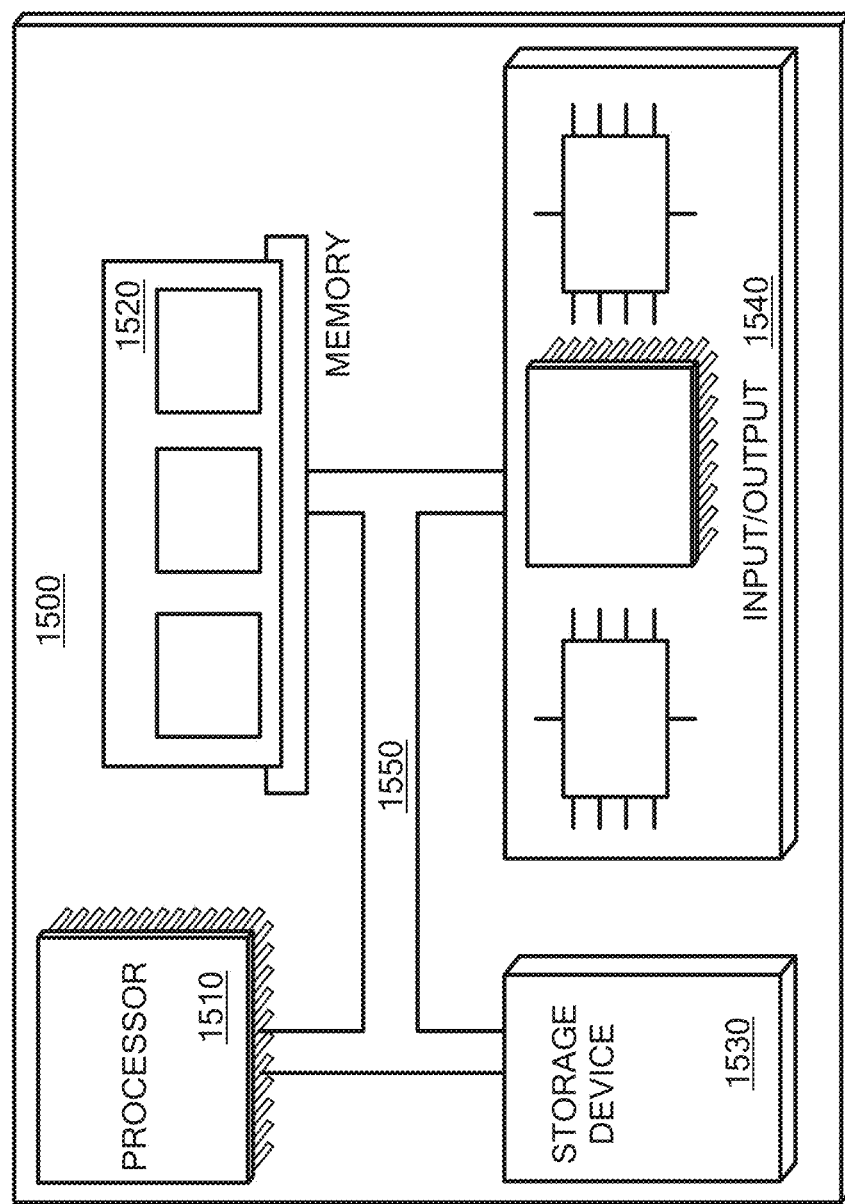
FIG. 15 is a block diagram of one exemplary embodiment of a computer system for use in conjunction with the present disclosures.

FIG. 15 is a block diagram of one exemplary embodiment of a computer system 1500 upon which the present disclosures can be built, performed, trained, etc. For example, referring to FIGS. 7 to 14C, any modules or systems can be examples of the system 1500 described herein, for example the optimization routines 900A, 900B and any of the associated modules or routines described therein. The system 1500 can include a processor 1510, a memory 1520, a storage device 1530, and an input/output device 1540. Each of the components 1510, 1520, 1530, and 1540 can be interconnected, for example, using a system bus 1550. The processor 1510 can be capable of processing instructions for execution within the system 1500. The processor 1510 can be a single-threaded processor, a multi-threaded processor, or similar device. The processor 1510 can be capable of processing instructions stored in the memory 1520 or on the storage device 1530. The processor 1510 may execute operations such as executing a parametric model to generate a population of representative payload volumes, taking a union of one or more payload volumes, adding margins to one or more payload volumes, generating a swept volume from one or more payload volumes moving along a loading/unload path, and/or conducting an optimization routine on two or more payload objects to determine optimized payload orientations, including calculating minimum clearance or other constraints, various cost functions and/or associated constraints, among other features described in conjunction with the present disclosure.

The memory 1520 can store information within the system 1500. In some implementations, the memory 1520 can be a computer-readable medium. The memory 1520 can, for example, be a volatile memory unit or a non-volatile memory unit. In some implementations, the memory 1520 can store information related to wind turbine blades and cargo bays, cost functions, and optimization landscapes, among other information.

The storage device 1530 can be capable of providing mass storage for the system 1500. In some implementations, the storage device 1530 can be a non-transitory computer-readable medium. The storage device 1530 can include, for example, a hard disk device, an optical disk device, a solid-date drive, a flash drive, magnetic tape, and/or some other large capacity storage device. The storage device 1530 may alternatively be a cloud storage device, e.g., a logical storage device including multiple physical storage devices distributed on a network and accessed using a network. In some implementations, the information stored on the memory 1520 can also or instead be stored on the storage device 1530.

The input/output device 1540 can provide input/output operations for the system 1500. In some implementations, the input/output device 1540 can include one or more of network interface devices (e.g., an Ethernet card or an Infiniband interconnect), a serial communication device (e.g., an RS-232 10 port), and/or a wireless interface device (e.g., a short-range wireless communication device, an 802.7 card, a 3G wireless modem, a 4G wireless modem, a 5G wireless modem). In some implementations, the input/output device 1540 can include driver devices configured to receive input data and send output data to other input/output devices, e.g., a keyboard, a printer, and/or display devices. In some implementations, mobile computing devices, mobile communication devices, and other devices can be used.

In some implementations, the system 1500 can be a microcontroller. A microcontroller is a device that contains multiple elements of a computer system in a single electronics package. For example, the single electronics package could contain the processor 1510, the memory 1520, the storage device 1530, and/or input/output devices 1540.

Although an example processing system has been described above, implementations of the subject matter and the functional operations described above can be implemented in other types of digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible program carrier, for example a computer-readable medium, for execution by, or to control the operation of, a processing system. The computer readable medium can be a machine-readable storage device, a machine-readable storage substrate, a memory device, a composition of matter effecting a machine-readable propagated signal, or a combination of one or more of them.

Various embodiments of the present disclosure may be implemented at least in part in any conventional computer programming language. For example, some embodiments may be implemented in a procedural programming language (e.g., "C" or ForTran95), or in an object-oriented programming language (e.g., "C++"). Other embodiments may be implemented as a pre-configured, stand-along hardware element and/or as preprogrammed hardware elements (e.g., application specific integrated circuits, FPGAs, and digital signal processors), or other related components.

The term "computer system" may encompass all apparatus, devices, and machines for processing data, including, by way of non-limiting examples, a programmable processor, a computer, or multiple processors or computers. A processing system can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, executable logic, or code) can be written in any form of programming language, including compiled or interpreted languages, or declarative or procedural languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Such implementation may include a series of computer instructions fixed either on a tangible, non-transitory medium, such as a computer readable medium. The series of computer instructions can embody all or part of the functionality previously described herein with respect to the system. Computer readable media suitable for storing computer program instructions and data include all forms of non-volatile or volatile memory, media and memory devices, including by way of example semiconductor memory devices, e.g., EPROM, EEPROM, and flash memory devices; magnetic disks, e.g., internal hard disks or removable disks or magnetic tapes; magneto optical disks; and CD-ROM and DVD-ROM disks. The processor and the memory can be supplemented by, or incorporated in, special purpose logic circuitry. The components of the system can be interconnected by any form or medium of digital data communication, e.g., a communication network. Examples of communication networks include a local area network ("LAN") and a wide area network ("WAN"), e.g., the Internet.

Those skilled in the art should appreciate that such computer instructions can be written in a number of programming languages for use with many computer architectures or operating systems. Furthermore, such instructions may be stored in any memory device, such as semiconductor, magnetic, optical, or other memory devices, and may be transmitted using any communications technology, such as optical, infrared, microwave, or other transmission technologies.

Among other ways, such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). In fact, some embodiments may be implemented in a software-as-a-service model ("SAAS") or cloud computing model. Of course, some embodiments of the present disclosure may be implemented as a combination of both software (e.g., a computer program product) and hardware. Still other embodiments of the present disclosure are implemented as entirely hardware, or entirely software.

One skilled in the art will appreciate further features and advantages of the disclosures based on the provided for descriptions and embodiments. Accordingly, the inventions are not to be limited by what has been particularly shown and described. For example, although the present disclosure provides for transporting large cargo, such as wind turbines, the present disclosures can also be applied to other types of large cargo or to smaller cargo, at least some of which are mentioned above. All publications and references cited herein are expressly incorporated herein by reference in their entirety.

Examples of the Above-Described Embodiments can Include the Following

1. A method of generating a space reservation volume for use in sizing a cargo bay of a cargo aircraft, the method comprising:
   generating, using a processor, one or more optimized payload orientations of one or more representative payloads to be carried in a cargo bay of a cargo aircraft;
   generating, using a processor, an initial keep out volume containing the one or more optimized payload orientations;
   creating, using a processor, a final keep out volume by sequentially adding a plurality of margins to the initial keep out volume; and
   generating, using a processor, a space reservation volume based on the final keep out volume, the space reservation volume being dimensioned greater than or equal to the final keep out volume such that the space reservation volume is suitable for use in sizing interior dimensions of the cargo bay and the cargo bay being suitable for at least one of loading, unloading, or holding a payload represented by the one or more representative payloads in their respective optimized payload orientations.
2. The method of claim 1, wherein the one or more representative payloads comprises one or more wind turbine blades.
3. The method of claim 1 or 2, wherein generating the initial keep out volume comprises generating a union of 3D geometries of the one or more optimized payload orientations.
4. The method of claim 1 or 2, wherein generating an initial keep out volume comprises:
   sweeping a 3D geometry of each of the one or more representative payloads in their respective one or more optimized payload orientations through at least one of a simulated loading movement or a simulated unloading movement to generate a swept 3D geometry of a volume swept through by the one or more representative payloads; and
   generating a union of the swept 3D geometries of the one or more optimized payload orientations.
5. The method of any of claims 1 to 4, further comprising generating one or more optimized payload orientations of two or more representative payloads by running an optimization routine configured to test a plurality of possible non-intersecting orientations of the two or more representative payloads and calculate at least one cost function for each possible non-intersecting orientation, the optimized payload orientation including a set of possible non-intersecting orientations that at least one of: (1) minimizes the one or more cost functions; or (2) minimizes a weighted average of the one or more cost functions.
6. The method of claim 5, wherein running the optimization routine to test the plurality of possible non-intersecting orientations of the two or more representative payloads comprises keeping a 3D geometry of at least one of the two or more representative payloads fixed in space and sequentially iterating a plurality of degrees of freedom of the 3D geometries of the remaining two or more representative payloads and, for each iteration, calculating the at least one cost function that includes at least a minimum clearance between the two or more representative payloads.
7. The method of any of claims 1 to 6, wherein the plurality of margins comprises a first set of margins based on 3D geometries of the one or more representative payloads.
8. The method of claim 7, wherein the first set of margins comprises at least one or more of:
   an additive offset for payload shape uncertainty;
   an additive offset for payload manufacturing tolerances;
   an additive offset for payload flexibility; or
   an additive offset for thermal deformation.
9. The method of claim 7 or 8, wherein the plurality of margins comprises a second set of margins based on 3D geometries of one or more fixtures configured to hold the one or more representative payloads in the one or more optimized payload orientations, the second set including an additive offset for the one or more fixtures.
10. The method of claim 9, wherein creating the final keep out volume comprises creating an intermediate keep out volume by sweeping the initial keep out volume through at least one of a simulated loading movement or a simulated unloading movement to generate a third set of margins of the plurality of margins based on at least one of the loading or unloading sweeps, the third set including an additive offset representing the volume swept through by the intermediate keep out volume during the at least one of the simulated loading movement or the simulated unloading movement.
11. The method of claim 10, wherein creating the final keep out volume comprises adding one or more of the first or second set of margins to the initial keep out volume before sweeping the initial keep out volume and subsequently adding the third set of margins.
12. The method of claim 10, wherein creating the final keep out volume comprises adding one or more of the first, second, or third set of margins to the initial keep out volume after sweeping the initial keep out volume.
13. The method of any of claims 10 to 12, wherein creating the final keep out volume comprises adding a fourth set of margins of the plurality of margins, the fourth set including an additive offset representing a minimum clearance margin between the intermediate keep out volume and an inner wall of the cargo bay.
14. The method of claim 13, wherein the fourth set comprises an additive offset representing manufacturing tolerances of the cargo aircraft.
15. The method of claim 13 or 14, wherein the fourth set comprises an additive offset representing structural elements configured to support the one or more representative payloads in the cargo bay.
16. The method of any of claims 13 to 15, wherein the fourth set comprises an additive offset representing equipment configured to move the one or more representative payloads during at least one of a loading operation or an unloading operation.

17. The method of any of claims 13 to 16, wherein generating the space reservation volume comprises generating a convex hull based on the final keep out volume.

18. The method of any of claims 1 to 17, further comprising:
before generating the one or more optimized payload orientations, calculating, using a processor, the one or more representative payloads, the calculating including:
generating 3D geometries for a plurality of sample payload shapes when a parameterized nominal payload geometry definition comprises a plurality of geometric parameters, each sample payload shape having at least one different geometric parameter; and
reducing the plurality of sample payload shapes to the one or more representative payloads using a down-selection process to remove sample payload shapes that do not expand a volume envelope of a combination of all the sample payload shapes.

19. The method of claim 18, wherein generating 3D geometries for a plurality of sample payload shapes comprises using a parametric distribution of one or more of the plurality of geometric parameters.

20. The method of claim 18 or 19, wherein the parameterized nominal payload geometry comprises a parameterized nominal wind turbine geometry.

21. The method of claim 20, wherein the plurality of geometric parameters include one or more of the following:
a blade twist angle;
an airfoil shape;
a blade span length;
a root diameter;
a cylindrical root length;
a root transition length;
a maximum chord length;
a location of the maximum chord length;
a thickness at the location of the maximum chord length;
a pre-bend tip deflection; or
a pre-sweep tip deflection.

22. The method of any of claims 1 to 21, further comprising generating a plurality of dimensions for use in sizing a cargo bay structure to contain the space reservation volume.

23. The method of any of claims 1 to 22, further comprising generating a plurality of dimensions for use in sizing a cargo aircraft fuselage structure to at least one of contain, load, or unload the space reservation volume.

24. A computer system, comprising:
an optimization module configured to generate one or more optimized payload orientations of one or more representative payloads to be carried in a cargo bay of a cargo aircraft;
a generating module configured to generate an initial keep out volume containing the one or more optimized payload orientations;
a margining module configured to create a final keep out volume by sequentially adding a plurality of margins to the initial keep out volume; and
a designing module configured to generate a space reservation volume based on the final keep out volume, the space reservation volume being dimensioned greater than or equal to the final keep out volume such that the space reservation volume is suitable for use in sizing interior dimensions of the cargo bay and the cargo bay being suitable for at least one of loading, unloading, or holding a payload represented by the one or more representative payloads in their respective optimized payload orientations.

25. The computer system of claim 24, wherein the one or more representative payloads comprises one or more wind turbine blades.

26. The computer system of claim 24 or 25, wherein the generating module is further configured to generate the initial keep out volume by generating a union of 3D geometries of the one or more optimized payload orientations.

27. The computer system of claim 24 or 25, wherein the generating module is further configured to generate an initial keep out volume by:
sweeping a 3D geometry of each of the one or more representative payloads in their respective one or more optimized payload orientations through at least one of a simulated loading movement or a simulated unloading movement to generate a swept 3D geometry of a volume swept through by the one or more representative payloads; and
generating a union of the swept 3D geometries of the one or more optimized payload orientations.

28. The computer system of any of claims 24 to 27, wherein the optimization module is further configured to generate one or more optimized payload orientations of two or more representative payloads by running an optimization routine configured to test a plurality of possible non-intersecting orientations of the two or more representative payloads and calculate at least one cost function for each possible non-intersecting orientation, the optimized payload orientation including a set of possible non-intersecting orientations that at least one of: (1) minimizes the one or more cost functions; or (2) minimizes a weighted average of the one or more cost functions.

29. The computer system of claim 28, wherein running the optimization routine to test the plurality of possible non-intersecting orientations of the two or more representative payloads comprises keeping a 3D geometry of at least one of the two or more representative payloads fixed in space and sequentially iterating a plurality of degrees of freedom of the 3D geometries of the remaining two or more representative payloads and, for each iteration, calculating the at least one cost function that includes at least a minimum clearance between the two or more representative payloads.

30. The computer system of any of claims 24 to 29, wherein the plurality of margins comprises a first set of margins based on 3D geometries of the one or more representative payloads.

31. The computer system of claim 30, wherein the first set of margins comprises at least one or more of:
an additive offset for payload shape uncertainty;
an additive offset for payload manufacturing tolerances;
an additive offset for payload flexibility; or an additive offset for thermal deformation.

32. The computer system of claim 30 or 31, wherein the plurality of margins comprises a second set of margins based on 3D geometries of one or more fixtures configured to hold the one or more representative payloads in the one or more optimized payload orientations, the second set including an additive offset for the one or more fixtures.

33. The computer system of claim 32, wherein the margining module is further configured to create the final keep out volume by creating an intermediate keep out volume by sweeping the initial keep out volume through at least one of a simulated loading movement or a simulated unloading movement to generate a third set of margins of the plurality of margins based on at least one of the loading or unloading sweeps, the third set including an additive offset representing the volume swept through by the intermediate keep out volume during the at least one of the simulated loading movement or the simulated unloading movement.

34. The computer system of claim 33, wherein the margining module is further configured to create the final keep out volume by adding one or more of the first or second set of margins to the initial keep out volume before sweeping the initial keep out volume and subsequently adding the third set of margins.

35. The computer system of claim 33, wherein the margining module is further configured to create the final keep out volume by adding one or more of the first, second, or third set of margins to the initial keep out volume after sweeping the initial keep out volume.

36. The computer system of any of claims 33 to 35, wherein the margining module is further configured to create the final keep out volume by adding a fourth set of margins of the plurality of margins, the fourth set including an additive offset representing a minimum clearance margin between the intermediate keep out volume and an inner wall of the cargo bay.

37. The computer system of claim 36, wherein the fourth set comprises an additive offset representing manufacturing tolerances of the cargo aircraft.

38. The computer system of claim 36 or 37, wherein the fourth set comprises an additive offset representing structural elements configured to support the one or more representative payloads in the cargo bay.

39. The computer system of any of claims 36 to 38, wherein the fourth set comprises an additive offset representing equipment configured to move the one or more representative payloads during at least one of a loading operation or an unloading operation.

40. The computer system of any of claims 36 to 39, wherein the designing module is further configured to the create space reservation volume by generating a convex hull based on the final keep out volume.

41. The computer system of any of claims 24 to 40, further comprising:
a modeling module, configured to, before generating the one or more optimized payload orientations, calculate the one or more representative payloads, the modeling module being configured to:
generate 3D geometries for a plurality of sample payload shapes when a parameterized nominal payload geometry definition comprises a plurality of geometric parameters, each sample payload shape having at least one different geometric parameter; and
reduce the plurality of sample payloads to the one or more representative payloads using a down-selection process to remove sample payload shapes that do not expand a volume envelope of a combination of all the sample payload shapes.

42. The computer system of claim 41, wherein the modeling module is further configured to generate 3D geometries for a plurality of sample payload shapes by using a parametric distribution of one or more of the plurality of geometric parameters.

43. The computer system of claim 41 or 42, wherein the parameterized nominal payload geometry comprises a parameterized nominal wind turbine geometry.

44. The computer system of claim 43, wherein the plurality of geometric parameters include one or more of the following:
a blade twist angle;
an airfoil shape;
a blade span length;
a root diameter;
a cylindrical root length;
a root transition length;
a maximum chord length;
a location of the maximum chord length;
a thickness at the location of the maximum chord length;
a pre-bend tip deflection; or
a pre-sweep tip deflection.

45. The computer system of any of claims 24 to 44, wherein the designing module is further configured to generate a plurality of dimensions for use in sizing a cargo bay structure to contain the space reservation volume.

46. The computer system of any of claims 24 to 45, wherein the designing module is further configured to generate a plurality of dimensions for use in sizing a cargo aircraft fuselage structure to at least one of contain, load, or unload the space reservation volume.

47. A computer program product, comprising a tangible, non-transient computer usable medium having computer readable program code thereon, the computer readable program code comprising program code configured to:
generate one or more optimized payload orientations of one or more representative payloads to be carried in a cargo bay of a cargo aircraft;
generate an initial keep out volume containing the one or more optimized payload orientations;
create a final keep out volume by sequentially adding a plurality of margins to the initial keep out volume; and
generate a space reservation volume based on the final keep out volume, the space reservation volume being dimensioned greater than or equal to the final keep out volume such that the space reservation volume is suitable for use in sizing interior dimensions of the cargo bay and the cargo bay being suitable for at least one of loading, unloading, or holding a payload represented by the one or more representative payloads in their respective optimized payload orientations.

48. The computer program product of claim 47, wherein the one or more representative payloads comprises one or more wind turbine blades.

49. The computer program product of claim 47 or 48, wherein the instructions to generate the initial keep out volume comprises instruction to generate a union of 3D geometries of the one or more optimized payload orientations.

50. The computer program product of claim 47 or 48, wherein the instructions to generate an initial keep out volume comprises instructions to:

sweep a 3D geometry of each of the one or more representative payloads in their respective one or more optimized payload orientations through at least one of a simulated loading movement or a simulated unloading movement to generate a swept 3D geometry of a volume swept through by the one or more representative payloads; and generate a union of the swept 3D geometries of the one or more optimized payload orientations.

51. The computer program product of any of claims 47 to 50, further comprising the instructions to generate one or more optimized payload orientations of two or more representative payloads by running an optimization routine configured to test a plurality of possible non-intersecting orientations of the two or more representative payloads and calculate at least one cost function for each possible non-intersecting orientation, the optimized payload orientation including a set of possible non-intersecting orientations that at least one of: (1) minimizes the one or more cost functions; or (2) minimizes a weighted average of the one or more cost functions.

52. The computer program product of claim 51, wherein in instructions to run the optimization routine to test the plurality of possible non-intersecting orientations of the two or more representative payloads comprises instructions to keep a 3D geometry of at least one of the two or more representative payloads fixed in space and sequentially iterate a plurality of degrees of freedom of the 3D geometries of the remaining two or more representative payloads and, for each iteration, calculating the at least one cost function that includes at least a minimum clearance between the two or more representative payloads.

53. The computer program product of any of claims 47 to 52, wherein the plurality of margins comprises a first set of margins based on 3D geometries of the one or more representative payloads.

54. The computer program product of claim 53, wherein the first set of margins comprises at least one or more of:
an additive offset for payload shape uncertainty;
an additive offset for payload manufacturing tolerances;
an additive offset for payload flexibility; or
an additive offset for thermal deformation.

55. The computer program product of claim 53 or 54, wherein the plurality of margins comprises a second set of margins based on a 3D geometries of one or more fixtures configured to hold the one or more representative payloads in the one or more optimized payload orientations, the second set including an additive offset for the one or more fixtures.

56. The computer program product of claim 55, wherein the instructions to create the final keep out volume comprises instructions to create an intermediate keep out volume by sweeping the initial keep out volume through at least one of a simulated loading movement or a simulated unloading movement to generate a third set of margins of the plurality of margins based on at least one of the loading or unloading sweeps, the third set including an additive offset representing the volume swept through by the intermediate keep out volume during the at least one of the simulated loading movement or the simulated unloading movement.

57. The computer program product of claim 56, wherein the instructions to create the final keep out volume comprises the instructions to add one or more of the first or second set of margins to the initial keep out volume before sweeping the initial keep out volume and subsequently adding the third set of margins.

58. The computer program product of claim 56, wherein the instructions to create the final keep out volume comprises the instructions to add one or more of the first, second, or third set of margins to the initial keep out volume after sweeping the initial keep out volume.

59. The computer program product of any of claims 56 to 58, wherein the instructions to create the final keep out volume comprises the instructions to add a fourth set of margins of the plurality of margins, the fourth set including an additive offset representing a minimum clearance margin between the intermediate keep out volume and an inner wall of the cargo bay.

60. The computer program product of claim 59, wherein the fourth set comprises an additive offset representing manufacturing tolerances of the cargo aircraft.

61. The computer program product of claim 59 or 60, wherein the fourth set comprises an additive offset representing structural elements configured to support the one or more representative payloads in the cargo bay.

62. The computer program product of any of claims 59 to 61, wherein the fourth set comprises an additive offset representing equipment configured to move the one or more representative payloads during at least one of a loading operation or an unloading operation.

63. The computer program product of any of claims 59 to 62, wherein the instructions to generate the space reservation volume comprises the instructions to generate a convex hull based on the final keep out volume.

64. The computer program product of any of claims 47 to 63, further comprising:
before the instructions to generate the one or more optimized payload orientations, instructions to calculate the one or more representative payloads, the instructions including:
instructions to generate 3D geometries for a plurality of sample payload shapes when a parameterized nominal payload geometry definition comprises a plurality of geometric parameters, each sample payload shape having at least one different geometric parameter; and
instructions to reduce the plurality of sample payload shapes to the one or more representative payloads using a down-selection process to remove sample payload shapes that do not expand a volume envelope of a combination of all the sample payload shapes.

65. The computer program product of claim 64, wherein the instructions to generate 3D geometries for a plurality of sample payload shapes comprises instructions to use a parametric distribution of one or more of the plurality of geometric parameters.

66. The computer program product of claim 64 or 65, wherein the parameterized nominal payload geometry comprises a parameterized nominal wind turbine geometry.

67. The computer program product of claim 66, wherein the plurality of geometric parameters include one or more of the following:
a blade twist angle;
an airfoil shape;
a blade span length;
a root diameter;

a cylindrical root length;
a root transition length;
a maximum chord length;
a location of the maximum chord length;
a thickness at the location of the maximum chord length;
a pre-bend tip deflection; or
a pre-sweep tip deflection.
68. The computer program product of any of claims 47 to 67, further comprising instructions to generate a plurality of dimensions for use in sizing a cargo bay structure to contain the space reservation volume.
69. The computer program product of any of claims 47 to 68, further comprising instructions to generate a plurality of dimensions for use in sizing a cargo aircraft fuselage structure to at least one of contain, load, or unload the space reservation volume.
70. An aircraft, comprising:
   a fuselage defining a forward end, an aft end, a cargo bay that spans a majority of a length of the fuselage from the forward end to the aft end the interior cargo bay defining an interior volume of a size and shape determined by:
      generating one or more optimized payload orientations of one or more representative payloads to be carried in the cargo bay;
      generating an initial keep out volume containing the one or more optimized payload orientations;
      creating a final keep out volume by sequentially adding a plurality of margins to the initial keep out volume; and
      generating the interior volume based on the final keep out volume, the size and shape of the interior volume being dimensioned greater than or equal to the final keep out volume such that the interior volume of the cargo bay is suitable for at least one of loading, unloading, or holding a payload represented by the one or more representative payloads in their respective optimized payload orientations.

What is claimed is:

1. A method of generating a space reservation volume for use in sizing a cargo bay of a cargo aircraft, the method comprising:
   generating, using a processor, one or more optimized payload orientations of one or more representative payloads to be carried in a cargo bay of a cargo aircraft;
   generating, using a processor, a keep out volume containing the one or more optimized payload orientations, the generating including:
      sweeping a 3D geometry of each of the one or more representative payloads in their respective one or more optimized payload orientations through at least one of a simulated loading movement along a known path or a simulated unloading movement along the known path to generate a swept 3D geometry of a volume swept through by the one or more representative payloads; and
      generating a union of the swept 3D geometries of the one or more optimized payload orientations as the keep out volume;
   and
   generating, using a processor, a space reservation volume based on the keep out volume, the space reservation volume being dimensioned greater than or equal to the keep out volume such that the space reservation volume is suitable for use in sizing interior dimensions of the cargo bay and the cargo bay being suitable for at least one of loading, unloading, or holding a payload represented by the one or more representative payloads in their respective optimized payload orientations.

2. The method of claim 1, wherein the one or more representative payloads comprises one or more wind turbine blades.

3. The method claim 1, further comprising generating one or more optimized payload orientations of two or more representative payloads by running an optimization routine configured to test a plurality of possible non-intersecting orientations of the two or more representative payloads and calculate at least one cost function for each possible non-intersecting orientation, the optimized payload orientation including a set of possible non-intersecting orientations that at least one of: (1) minimizes the one or more cost functions; or (2) minimizes a weighted average of the one or more cost functions.

4. The method of claim 3, wherein running the optimization routine to test the plurality of possible non-intersecting orientations of the two or more representative payloads comprises keeping a 3D geometry of at least one of the two or more representative payloads fixed in space and sequentially iterating a plurality of degrees of freedom of the 3D geometries of the remaining two or more representative payloads and, for each iteration, calculating the at least one cost function that includes at least a minimum clearance between the two or more representative payloads.

5. The method of claim 1, further comprising, sequentially adding a plurality of margins to the keep out volume and/or the 3D geometries of the one or more representative payloads before generating the space reservation.

6. The method of claim 5, wherein a first set of margins comprises at least one or more of:
   an additive offset for payload shape uncertainty;
   an additive offset for payload manufacturing tolerances;
   an additive offset for payload flexibility; or
   an additive offset for thermal deformation.

7. The method of claim 5, wherein the plurality of margins comprises a second set of margins based on 3D geometries of one or more fixtures configured to hold the one or more representative payloads in the one or more optimized payload orientations, the set including an additive offset for the one or more fixtures.

8. The method of claim 7, wherein creating the keep out volume comprises adding one or more of the first or second set of margins to the each 3D geometry of the one or more representative payloads before sweeping the 3D geometries.

9. The method of claim 1, wherein generating the space reservation volume comprises generating a convex hull based on the keep out volume.

10. The method of claim 1, further comprising:
   before generating the one or more optimized payload orientations, calculating, using a processor, the one or more representative payloads, the calculating including:
      generating 3D geometries for a plurality of sample payload shapes when a parameterized nominal payload geometry definition comprises a plurality of geometric parameters, each sample payload shape having at least one different geometric parameter; and
      reducing the plurality of sample payload shapes to the one or more representative payloads using a down-selection process to remove sample payload shapes that do not expand a volume envelope of a combination of all the sample payload shapes.

11. The method of claim 10, wherein generating 3D geometries for a plurality of sample payload shapes comprises using a parametric distribution of one or more of the plurality of geometric parameters.

12. The method of claim 10, wherein the parameterized nominal payload geometry comprises a parameterized nominal wind turbine geometry.

13. The method of claim 12, wherein the plurality of geometric parameters include one or more of the following:
- a blade twist angle;
- an airfoil shape;
- a blade span length;
- a root diameter;
- a cylindrical root length;
- a root transition length;
- a maximum chord length;
- a location of the maximum chord length;
- a thickness at the location of the maximum chord length;
- a pre-bend tip deflection; or
- a pre-sweep tip deflection.

14. A computer system, comprising:
a modeling module, configured to calculate one or more representative payloads to be carried in a cargo bay of a cargo aircraft, the modeling module being configured to:
  generate 3D geometries for a plurality of sample payload shapes based on a parameterized nominal payload geometry nominal wind turbine geometry definition comprising a plurality of geometric parameters, each sample payload shape having at least one different geometric parameter; and
  reduce the plurality of sample payload shapes to the one or more representative payloads using a down-selection process to remove sample payload shapes that do not expand a volume envelope of a combination of all the sample payload shapes;
an optimization module configured to generate one or more optimized payload orientations of the one or more representative payloads;
a generating module configured to generate a keep out volume containing the one or more optimized payload orientations; and
a designing module configured to generate a space reservation volume based on the keep out volume, the space reservation volume being dimensioned greater than or equal to the keep out volume such that the space reservation volume is suitable for use in sizing interior dimensions of the cargo bay and the cargo bay being suitable for at least one of loading, unloading, or holding a payload represented by the one or more representative payloads in their respective optimized payload orientations.

15. The computer system of claim 14, wherein the generating module is further configured to generate the keep out volume by generating a union of 3D geometries of the one or more optimized payload orientations.

16. The computer system of claim 14, wherein the generating module is further configured to generate keep out volume by:
sweeping a 3D geometry of each of the one or more representative payloads in their respective one or more optimized payload orientations through at least one of a simulated loading movement along a known path or a simulated unloading movement along the known path to generate a swept 3D geometry of a volume swept through by the one or more representative payloads; and
generating a union of the swept 3D geometries of the one or more optimized payload orientations.

17. The computer system of claim 16, wherein the known path comprises a bend based on at least a predetermined kink angle of the aircraft.

18. The computer system of claim 14, wherein the optimization module is further configured to generate one or more optimized payload orientations of two or more representative payloads by running an optimization routine configured to test a plurality of possible non-intersecting orientations of the two or more representative payloads and calculate at least one cost function for each possible non-intersecting orientation, the optimized payload orientation including a set of possible non-intersecting orientations that at least one of: (1) minimizes the one or more cost functions; or (2) minimizes a weighted average of the one or more cost functions.

19. The computer system of claim 14, further comprising a margining module configured to sequentially add a plurality of margins to the keep out volume before generating the space reservation.

20. The computer system of claim 19, wherein a first set of the plurality of margins comprises at least one or more of:
- an additive offset for payload shape uncertainty;
- an additive offset for payload manufacturing tolerances;
- an additive offset for payload flexibility; or
- an additive offset for thermal deformation.

21. The computer system of claim 19, wherein the margining module is further configured to margin the keep out volume by sweeping by sweeping each of the one or more representative payloads in their one or more optimized payload orientations through at least one of a simulated loading movement or a simulated unloading movement to generate a second set of margins of the plurality of margins based on at least one of the loading or unloading sweeps, the second set including an additive offset representing the volume swept through by each of the one or more representative payloads during the at least one of the simulated loading movement or the simulated unloading movement.

22. The computer system of claim 21, wherein the margining module is further configured to margin the keep out volume by adding one or more of the first set of margins to each of the each of the one or more representative payloads before sweeping the each of the one or more representative payloads and subsequently adding the second set of margins.

23. The computer system of claim 14, wherein the designing module is further configured to the create space reservation volume by generating a convex hull based on the keep out volume.

24. The computer system of claim 14,
wherein the optimization module is configured to determine optimal orientations of each sample payload shape from the modeling module, and
wherein the modeling module is configured to reduce the plurality of sample payload shapes based on the optimal orientations.

25. The computer system of claim 14, wherein the parameterized nominal payload geometry comprises a parameterized nominal wind turbine geometry.

26. A computer program product, comprising a tangible, non-transient computer usable medium having computer readable program code thereon, the computer readable program code comprising program code configured to:

generate one or more optimized payload orientations of one or more representative payloads to be carried in a cargo bay of a cargo aircraft;

generate a keep out volume containing the one or more optimized payload orientations by:

sweeping a 3D geometry of each of the one or more representative payloads in their respective one or more optimized payload orientations through at least one of a simulated loading movement along a known path or a simulated unloading movement along the known path to generate a swept 3D geometry of a volume swept through by the one or more representative payloads, and generating a union of the swept 3D geometries of the one or more optimized payload orientation;

and generate a space reservation volume based on the keep out volume, the space reservation volume being dimensioned greater than or equal to the keep out volume such that the space reservation volume is suitable for use in sizing interior dimensions of the cargo bay and the cargo bay being suitable for at least one of loading, unloading, or holding a payload represented by the one or more representative payloads in their respective optimized payload orientations.

27. The computer program product of claim 26, wherein the known path comprises a bend based on at least the fuselage kink angle of the aircraft.

28. An aircraft, comprising:

a fuselage defining a forward end, an aft end, a cargo bay that spans a majority of a length of the fuselage from the forward end to the aft end the interior cargo bay defining an interior volume of a size and shape determined by:

generating one or more optimized payload orientations of one or more representative payloads to be carried in the cargo bay;

generating a keep out volume containing the one or more optimized payload orientations by:

sweeping a 3D geometry of each of the one or more representative payloads in their respective one or more optimized payload orientations through at least one of a simulated loading movement along a known path or a simulated unloading movement along the known path to generate a swept 3D geometry of a volume swept through by the one or more representative payloads, and generating a union of the swept 3D geometries of the one or more optimized payload orientations;

and generating the interior volume based on the keep out volume, the size and shape of the interior volume being dimensioned greater than or equal to the keep out volume such that the interior volume of the cargo bay is suitable for at least one of loading, unloading, or holding a payload represented by the one or more representative payloads in their respective optimized payload orientations.

29. The aircraft of claim 28, wherein the fuselage defines a fuselage kink angle of the aft end with respect to the forward end, and the known path comprises a bend based on at least the fuselage kink angle of the aircraft.

\* \* \* \* \*